US012085007B2

(12) United States Patent
Will

(10) Patent No.: US 12,085,007 B2
(45) Date of Patent: Sep. 10, 2024

(54) HEAT MANAGEMENT SYSTEM AND HEAT MANAGEMENT METHOD OF AN INTERNAL COMBUSTION ENGINE

(71) Applicant: Ino8 Pty Ltd., Bellbrae (AU)

(72) Inventor: Frank Will, Jan Juc (AU)

(73) Assignee: Ino8 Pty Ltd., Victoria (AU)

( * ) Notice: Subject to any disclaimer, the term of this patent is extended or adjusted under 35 U.S.C. 154(b) by 107 days.

(21) Appl. No.: 16/319,463

(22) PCT Filed: Jul. 13, 2017

(86) PCT No.: PCT/EP2017/067709
§ 371 (c)(1),
(2) Date: Jan. 21, 2019

(87) PCT Pub. No.: WO2018/015266
PCT Pub. Date: Jan. 25, 2018

(65) Prior Publication Data
US 2023/0383688 A1 Nov. 30, 2023

(30) Foreign Application Priority Data

Jul. 20, 2016 (DE) .......................... 102016113394.9

(51) Int. Cl.
| | | |
|---|---|---|
| F01P 3/02 | (2006.01) | |
| F01P 3/18 | (2006.01) | |
| F01P 3/20 | (2006.01) | |
| F01P 7/16 | (2006.01) | |
| F01P 11/14 | (2006.01) | |
| F02D 41/14 | (2006.01) | |
| F02P 19/02 | (2006.01) | |
| F16H 57/04 | (2010.01) | |
| F01P 7/14 | (2006.01) | |

(52) U.S. Cl.
CPC .................. *F01P 3/02* (2013.01); *F01P 3/18* (2013.01); *F01P 3/20* (2013.01); *F01P 7/16* (2013.01); *F01P 11/14* (2013.01); *F02D 41/14* (2013.01); *F02P 19/02* (2013.01); *F16H 57/0415* (2013.01); *F16H 57/0483* (2013.01); *F01P 2003/024* (2013.01); *F01P 2007/146* (2013.01); *F01P 2025/33* (2013.01)

(58) Field of Classification Search
CPC ........ F01P 3/02; F01P 3/18; F01P 3/20; F01P 7/16; F01P 11/14; F01P 2003/024; F01P 2007/146; F02D 41/14; F02P 19/02; F16H 57/0415; F16H 57/0483
USPC ......... 123/41.01, 41.02, 41.05, 41.08, 41.15, 123/41.72, 41.82 R
See application file for complete search history.

(56) References Cited

U.S. PATENT DOCUMENTS

| | | | |
|---|---|---|---|
| 4,509,481 A | 4/1985 | Nagumo et al. | |
| 6,789,512 B2 | 9/2004 | Duvinage et al. | |
| 8,746,187 B2 * | 6/2014 | Nogawa .................... | F02F 1/40 |
| | | | 123/41.82 R |
| 8,893,669 B2 * | 11/2014 | Mehring ................... | F01P 3/02 |
| | | | 123/196 R |
| 8,997,483 B2 * | 4/2015 | Zahdeh ..................... | F02F 1/36 |
| | | | 123/41.82 R |
| 9,341,105 B2 | 5/2016 | Jentz et al. | |
| 10,001,038 B2 | 6/2018 | Will | |
| 10,012,131 B2 | 7/2018 | Selinger et al. | |
| 2013/0047940 A1 * | 2/2013 | Quix ....................... | F01P 7/165 |
| | | | 123/41.82 R |
| 2013/0167786 A1 * | 7/2013 | Mehring ................... | F01P 3/02 |
| | | | 123/41.82 R |
| 2013/0247848 A1 * | 9/2013 | Takahashi ................. | F01P 3/02 |
| | | | 123/41.82 R |
| 2015/0176471 A1 * | 6/2015 | Hutchins ................. | F01P 7/165 |
| | | | 123/41.82 R |
| 2016/0377022 A1 * | 12/2016 | Tofukuji ................... | F02F 1/10 |
| | | | 123/41.82 R |

FOREIGN PATENT DOCUMENTS

| | | |
|---|---|---|
| DE | 10045613 | 4/2002 |
| DE | 10155339 | 5/2003 |
| DE | 102013205124 A1 | 10/2013 |
| DE | 102013016961 A1 | 7/2014 |
| DE | 102014015638 A1 | 4/2016 |
| GB | 2128318 | 4/1984 |
| WO | 2014128308 A1 | 8/2014 |

* cited by examiner

*Primary Examiner* — Hai H Huynh
(74) *Attorney, Agent, or Firm* — Ruggiero McAllister & McMahon LLC

(57) ABSTRACT

The invention relates to a thermal management method for operating a thermal management system (100, 102) of an internal combustion engine (10). The thermal management system (100, 102) comprises at least one fluid chamber (12) which is arranged at least partially around a cylinder head (74) of a cylinder (70) of the internal combustion engine (10) and has at least one inlet line (14) and at least one outlet line (16), the fluid chamber (12) being connected to at least one coolant pumping device (20) for pumping a coolant, and to at least one heat sink. According to the invention, a cylinder head temperature sensor and/or a fluid chamber temperature sensor (58) is provided, a volume flow of the coolant delivery device (20) being controllable depending on an engine speed and/or a fluid chamber temperature and/or an engine load, in particular by actuation of at least the first valve (18). According to the thermal management method, when the temperature in the fluid chamber (12) rises, in particular after a warm-up phase and when the engine speed remains constant or drops, the volume flow of the coolant through the heat sink is at least temporarily increased, and when the engine speed remains constant or increases by no more than 100 rpm, with engine load being reduced, in particular by at least 30%, the volume flow of the coolant through the heat sink is not reduced, and in particular is not reduced after at least one minute following the load change, and more particularly is not reduced when a fluid chamber (12) temperature is in the 60 to 100° C. range.

19 Claims, 25 Drawing Sheets

HEAT MANAGEMENT SYSTEM AND HEAT MANAGEMENT METHOD OF AN INTERNAL COMBUSTION ENGINE

The invention relates to a thermal management system and a method for thermal management of an internal combustion engine, particularly for driving a motor vehicle according to the independent claims.

STATE OF THE ART

A cyclical heating and cooling of internal combustion engines, particularly in the field of motor vehicles, preferably cars is known from the prior art. The cooling system of conventional internal combustion engines is controlled by a thermostat, so that the cooling capacity is increased on exceeding a temperature limit, to avoid possible component overheating or coolant evaporation and to minimize nitrogen oxide emissions (NOx) and is reduced on falling below a further lower temperature limit, to minimize friction, fuel consumption and wear. This has the disadvantage that at low engine loads, parts of the engine are cooled too much and at high engine loads, other parts of the engine are not cooled enough.

The engine load is the ratio of current torque to max, torque at the same speed, wherein the respective torques can however be affected by other factors. Similarly, the torque, or just the negative pressure in the intake pipe (in gasoline engine), or the pressure difference between the negative pressure in the intake pipe and the ambient pressure can be considered.

Recently, reports are piling up, in which nitrogen oxide emissions (NOx) are significantly higher in real driving conditions than in standardized certification tests. According to a report for the Federal Ministry of Transport and Digital Infrastructure, in which test results from 52 diesel cars were published, this might be because many vehicle manufacturers are adapting the efficiency of their emissions control system to driving and environmental conditions, which may correspond to a shutdown device. The manufacturers justify the admissibility mainly with measures for engine protection or for the safe operation of the vehicle. What is interesting about the report is that NOx emissions averaged 2.6 times the certification results for all vehicles, when the same certification test cycle was started with a warm engine instead of with a cold engine. Even in the group of vehicles with inconspicuous exhaust emissions, this difference is on average 2.2 times. Since the devices for reducing the exhaust emissions must first be brought to the optimum operating temperature in a cold start, one would rather expect the opposite, as is usual in gasoline engines. However, this expected behaviour that NOx emissions were lower in test with warm-start test than with cold-start, was seen in only 4 out of 27 vehicles of this group and in only 5 vehicles out of the entire group of 52 tested vehicles. One of the main reasons for higher NOx emissions in warm start are the significantly higher engine temperatures, which are deliberately highly regulated in the test cycles, particularly by coolant thermostats.

Investigations by Kleinschmidt, W., Hebel, D.: *Transient heat transfer in internal combustion engines—Theory, Simulation and Comparison with Test results*", Concluding Report KI600/1-2, German Research Foundation, 1995, have shown that at low engine loads up to about 50% of the full load, an increase in the combustion chamber temperature, e.g. by insulating the piston, the fuel consumption can be reduced by about 5%, wherein the same insulation measure at higher engine loads would result in significantly higher fuel consumption and reduced power. Therefore, measures are appropriate, which regulate the cooling capacity depending on the engine load and do not regulate by a thermostat depending on the temperature.

NOx emissions essentially occur at the highest temperatures in the combustion chamber, usually latest up to 20 degrees crank angle after the top dead centre of the piston in the cylinder. In this time span, shortly after the top dead centre, the surface of the combustion chamber is largely formed by the cylinder head and piston, the effect of the cylinder surface is negligible during this time span. Increasing the maximum temperature of the cylinder head is generally known to result in increased NOx emissions. Coolant thermostats, particularly electronically controlled ones, reduce the coolant flow rate through the radiator, when the coolant temperature is below a threshold, typically between 80 and 110° C. This is meant to warm up the engine quicker after a cold start to reduce the fuel consumption to enable heating the interior quicker, and to minimize the condensation of water in the crankcase to reduce wear. But this also increases the temperature of the cylinder head, which usually leads to increasing the NOx emissions, especially in warm engine in stop-and-go city traffic with frequent short acceleration phases, in a warm start, e. g. after switching off the engine before a traffic light or in modern vehicles with start-stop systems, and in longer highway driving, all normal driving operations that do not occur in the statutory test procedure.

In the generic DE 10 2013 205 124 A1, a thermal management method for operating a thermal management system of an internal combustion engine in a cold start phase is described, in which at least one fluid chamber provided with an inlet and an outlet line disposed in the cylinder head of the engine. By a coolant delivery device, which is a water pump, the fluid chamber is connected to a radiator as heat sink. A bypass coolant circuit is provided, so that a reduced coolant flow is provided at engine cold run for accelerating the engine warm-up. Thus, there is described a thermal management method for operating a thermal management system of an internal combustion engine in a cold start phase, wherein a conventional cooling system holistically controls the temperature of an engine block. A bypass system is envisaged to leave a small quantity of coolant in the engine block in cold start, so as to accelerate the heating. It is further taught that at increased engine speed, the pump pressure increases, however this results in a uniform increase in the coolant flow in the entire cooling system, i.e. in the engine block and in the cylinder heads. At no point, a separate cooling of cylinder heads is spoken of, also no independent fluid chamber with good flow characteristic in the cylinder head or below a cylinder piston is proposed, the coolant flow of which is increased or reduced dynamically and independent of any other cooling system in the engine block depending on the engine speed and the engine load.

DE 100 45 613 A1 relates to a thermal management method of engine cooling, wherein the coolant temperature is regulated depending on the load and/or speed.

A method for controlling a coolant pump or a control valve of a cooling system of an internal combustion engine of a motor vehicle is taught by DE 10 2014 015 638 A1, which depends on the engine load or temperature difference of the heat exchanger of the cooling system.

In addition, DE 10 2013 016 961 A1 relates to a coolant control method for an internal combustion engine, in which the supply of cooling fluid into a coolant chamber after an engine start is stopped until the engine operating point or engine temperature is reached.

A generic cooling method is also mentioned in DE 101 55 339 A1.

Based on the state of the art, it is sought to reduce the exhaust emissions, particularly NOx emissions, and simultaneously the fuel consumption sustainably in everyday use of internal combustion engines, without using unauthorized shutdown devices.

The improvement of the exhaust performance of an internal combustion engine is achieved by the thermal management method and the thermal management device according to the independent claims. Advantageous embodiments of the invention are the subject matter of the dependent claims.

DISCLOSURE OF THE INVENTION

According to the invention, a thermal management method for operating a thermal management system of an internal combustion engine, comprising: at least one fluid chamber with at least one inlet line and at least one outlet line, disposed at least partially within or around a cylinder head or below a cylinder piston of a cylinder of the internal combustion engine, wherein the fluid chamber is connected to at least one coolant delivery device for supplying a coolant and is connected to at least one heat sink, wherein the heat sink is particularly ambient air or a radiator.

It is proposed that with increasing temperature of the fluid chamber, particularly after a warm-up phase at constant or decreasing engine speed, the coolant flow rate through the heat sink is at least temporarily increased; and at constant engine speed or at engine speed increasing at maximum 100 revolutions per minute, and with reducing engine load, particularly by at least 30%, the coolant flow rate through the heat sink is not reduced, particularly not reduced after at least one minute after the load change, and particularly not reduced within a temperature range of 60° C. to 100° C. of the fluid chamber.

By the proposed dynamic cooling capacity control depending on the engine load, engine speed and current fluid chamber temperature, the formation of harmful exhaust gases can be effectively reduced. Through targeted changes in cooling capacity and regulated and selective temperature control, partially depending on the engine condition such as cold start, warm phase, depending on the crank angle, a significant reduction in pollutant emissions can be achieved. Temperature peaks can be avoided, especially in the critical regions of the combustion chamber, in which harmful NOx compounds form.

It is thus proposed that a coolant flow can pass through the fluid chamber disposed around the cylinder head or cylinder piston in a controllable manner, separate or independent of another cooling system of the internal combustion engine, wherein
- with increasing temperature of the fluid chamber, after a warm-up phase at a constant or decreasing engine speed, the coolant flow rate through the heat sink is at least temporarily increased, and
- at constant engine speed or at engine speed increasing at maximum 100 revolutions per minute and by reducing the engine load, the coolant flow rate through the heat sink is not reduced after at least one minute after the load change and within a temperature range of 60° C. to 100° C. of the fluid chamber.

By the proposed dynamic cooling capacity control of the cylinder region depending on the engine load and engine speed and the current fluid chamber temperature, the formation of harmful exhaust gases can be effectively reduced. Through targeted cooling capacity changes and regulated and selective temperature control of the fluid chamber in the temperature range between 60° C. to 100° C., partially depending on the engine condition such as cold start, warm phase, depending on the crank angle, a significant reduction of pollutant emissions can be achieved. Temperature peaks can be avoided, especially in the critical regions of the combustion chamber, in which harmful NOx compounds form.

According to the invention, the cooling of the cylinder head is not reduced after the warm-run, wherein the coolant flow rate passing through the radiator and the cylinder head is not lowered, at least not at constant speed. In a situation, when the engine load is reduced, the coolant flow rate through the fluid chamber in the cylinder region remains within a minute, at least as high as 1 minute before the load was reduced. This has the advantage that the exhaust aftertreatment system is still heated quickly after a cold start as before and is cooled to maximum after the first opening of the thermostatic valve to the radiator of the cylinder head. During load change, therefore, a constant temperature control of the cylinder chamber is achieved while avoiding temperature peaks, whereby NOx emissions can be reduced.

Thus, a highly dynamic cooling method of the cylinder head region is proposed, to reduce temperature peaks and to reduce the formation of NOx, whereby particularly urban exhaust gas and nitric oxide problems can be solved or mitigated.

Furthermore, it is conceivable that a largely normal thermostat is used in which the hysteresis during closing process is much more pronounced than the usual 4 to 6° C. This means that the thermostat opens normally after reaching the opening temperature and reduces the flow rate, but the reduction of the flow rate is only initiated in the proposed embodiment, when the coolant temperature is again lower by more than 10, 20 or even 40° C. than the first opening temperature of the thermostat. Also conceivable is a time-dependent hysteresis, e.g. that the thermostat again begins to close only after at least 10 or 20 minutes, instead of a few seconds. Thus, a control characteristic can be achieved, e.g. by deliberately increasing the friction of the moving thermostatic components. This can be rather easily chosen by the skillful selection of tolerances and material pairings. While warming up, the housing of the wax thermostatic element heats up quicker than the thrust pin inside, especially when the housing is made of a material with a larger thermal expansion coefficient. This results in a great load cycle and the thermostat opens easily. While cooling, it behaves opposite, the housing cools down quicker and contracts, so that the thrust pin clamps and is released only after a certain temperature compensation.

Furthermore, the housing can be placed in a bypass with the thermostatic element, particularly a wax thermostatic element, which is opened during a cold start, but is closed after opening the flow rate through the radiator, so that a temperature reduction of the inflowing coolant by thermal insulation, the thermostatic body (filled with wax) is heated much later.

It is also conceivable to use a pressure-dependent valve instead of a thermostat, through which the flow rate increases only when it causes e.g. the formation of vapor bubbles locally, and the valve remains open thereafter. The vapor bubble formation cannot be detected by detecting the temperature, since during liquid to gaseous phase change, the temperature remains constant. By opening the valve, only during vapor bubbles formation, which is to be expected mainly at higher engine loads, the warm start is shortened, which reduces the fuel consumption, by the continuous opening after the first opening, NOx emissions are minimized during real driving. The valve should then be closed again only when the engine has cooled sufficiently, e.g. at ambient temperature or a comparable temperature, e.g. below 40° C. Since the method is only applied while the coolant in the radiator is still cold, on opening the valve, the engine temperature is quickly reduced, so that local overheating can be avoided during vapor bubble formation.

It is conceivable to provide the method according to the invention in existing motor vehicle engines possibly by a minor modification of the thermostat.

It is also conceivable that a thermostat can be completely dispensed with by separate cooling circuits for cylinder head and cylinder block in the cylinder head circuit. This could even increase the engine power during warm-run, since the volumetric efficiency increases. The volumetric efficiency refers to the ratio of the charge mass actually present in the cylinder after completion of the charge change as compared to the theoretically possible charge mass. This increases the driving safety, since many turbocharged engines in the warm-up can be easily stalled (remain standstill) otherwise when starting up, due to increased friction of the crankshaft, piston and turbocharger. In order to achieve quick heating of the passenger compartment in winter, the coolant flow rate through the radiator can be interrupted during warm-run and instead be passed through the heat exchanger, until the interior is warm enough and/or a higher cooling capacity is required for the cylinder head.

Another variant is that the coolant flow rate from the cylinder head to the radiator is increased after the operating temperature of the exhaust aftertreatment system is reached, or after lapse of a certain time after the start of the engine. This can even happen independently from other parameters such as the current cylinder head temperature, coolant temperature in the cylinder head, engine load, and/or engine speed.

In a liquid-cooled engine, the fluid chamber is usually in a cylinder head, in air cooling, the fluid chamber is disposed around the cylinder head.

This principle is also advantageously applicable during the piston spray cooling, in which engine oil is sprayed on the underside of the piston. Most car engines have several cylinders arranged in an engine block. The cylinder head is not part of the cylinder but of the lid (or head), which closes the cylinder from above, and along with the piston and cylinder, forms the combustion chamber. Thus, the fluid chamber is disposed around at least one of the end faces of the combustion chamber, particularly disposed in a cylinder head and/or under a piston. With decreasing speed, the flow rate can only be increased by a control intervention, e.g. opening a thermostat valve or by a controllable pump/fan. During piston cooling, the fluid chamber is thus formed of the gas chamber of the crankcase, which is in communication with the underside of the piston crown, which is also at least partially filled with oil.

For temperature control, a number of systems are known, such as characteristic diagram controlled electric thermostats, electrically controllable combination valves, variable electric water pumps, etc. All these systems are very complex and very expensive, they require electrical actuators which are connected to the on-board electrical network, they need energy for operation which increases the fuel consumption; they need a control device with software algorithms. Since the systems are important for safe operation and for compliance with the exhaust gas emission limits, they must be extensively diagnosed at the same time according to the on-board diagnostic (OBD) requirement. Another disadvantage of these systems is that the detection of the coolant temperature or the detection of a different similar component temperature is a prerequisite for their function. Another important requirement of these systems is the use of a coolant, which largely consists of water, so that moderate flow cross-sections are possible and the energy input for adjusting the valves remains manageable. For use in low-cost vehicles such as scooters, mopeds, etc., which even use air-cooled engines, these systems are much too expensive and therefore not suitable.

In an advantageous advancement of the method, it is proposed that with increasing engine load, the coolant flow rate through a second lower fluid chamber region at least partially disposed within or around at least one cylinder, is increased; and with decreasing engine load, the coolant flow rate through the lower fluid chamber region is reduced; wherein particularly the temperature in the lower fluid chamber region of the cylinder is at least 30° C. higher than the temperature in the fluid chamber of the cylinder head. This proposed advancement can also be implemented independent of the abovementioned features according to the invention, in a fluid chamber of a cylinder to achieve an advantageous effect.

Dividing the fluid chamber into an upper fluid chamber region for cooling the cylinder head, and a lower fluid chamber region for cooling the cylinder wall, enables the adjustment of different temperature ranges in both these engine regions. The temperature control of both sections can fulfil different functions. An increased cooling capacity in the upper fluid chamber region and a reduced cooling capacity in the lower fluid chamber region affects favourably on reducing NOx values, for which a lower temperature of the cylinder head is decisive, particularly in the region of the outlet valves having particularly high temperatures. By contrast, an increased temperature in the cylinder wall lowers the piston friction and reduces the wall heat loss and consequently reduces the fuel consumption. Furthermore, the formation of particulates, hydrocarbons (HC), and carbon monoxide (CO) emissions can be reduced by better afterburning. The temperature distribution in the combustion chamber can be controlled favourably in terms of a compensation of temperature peaks. A temperature characteristic curve during a power stroke can be flattened and peak temperatures can be lowered. The thermal variation and resulting material stresses are thereby reduced and the longevity of the engine is thereby increased.

This then concerns the cooling of the cylinder, particularly of the cylinder jacket for optimizing the performance, NOx emissions and fuel consumption at high engine loads and for reducing fuel consumption and emissions of particulate matter, carbon monoxide (CO) and hydrocarbons, especially in partial load operation.

However, if the cooling medium flow rate is influenced only by the load adjustment, then particularly using simple air-cooled engines without complex engine control is also possible, e.g. the valve for varying the coolant flow rate can be actuated quite easily by coupling by Bowden cable to a throttle valve, throttle slide valve, throttle grip or accelerator pedal. Another advantage of this simple effect of the cooling system is that retrofitting is possible very easily, e.g. by an additional Bowden cable, which is coupled to accelerator pedal, throttle grip or throttle unit. Here, the first valve can be installed, e.g. in front of the mechanical thermostat, so that the radiator is opened only at certain engine loads. This is particularly useful in combination with the conversion to a high-temperature coolant, wherein much higher coolant temperatures are significantly advantageous at low engine loads. In combination with a high-temperature coolant, therefore, the temperature difference between the lower fluid chamber region of the cylinder and the upper fluid chamber region of the cylinder head can be increased normally from maximum 20° C. to over 30° C. and up to 100° C. In previous engines, the temperature differential between the cylinder head and cylinder block is usually limited to about 20° C.; firstly, because further increase in the coolant temperature in the cylinder block due to the risk of film boiling and the required safety distances e.g. for operation in the mountains with lower ambient pressure or for operation at high outside temperatures would be too risky; secondly, because further coolant temperature reduction in the cylinder head would slow down heating of the exhaust aftertreatment systems.

Another advantage of this increased temperature difference is that it can increase the engine power. By increasing the temperature in the lower Fluid chamber region, the cooling capacity required for the cylinder is reduced. This surplus cooling capacity can also be used for further cooling of the cylinder head. Since the surfaces of the cylinder head including intake passages in contact with the intake air, are larger than the surface of the cylinder forming the combustion chamber, the volumetric efficiency and thus the engine power can be increased.

Dependence on accelerator pedal acceleration: In highly dynamic processes, particularly quick acceleration processes, temperature peaks briefly occur in some components such as cylinder head or cylinder block. To avoid this, the accelerator pedal acceleration can be used as indicator, since it indicates the driver's desire for quick and strong vehicle acceleration. By integrating this signal, stronger cooling can be initiated early and thus temperature peaks can be avoided in highly loaded components. In an advantageous advancement, the flow rate through the fluid chamber will be increased to more than 90% of the flow rate possible at the respective speed as soon as the accelerator pedal acceleration exceeds a predetermined limiting value. This proposed advancement can also be implemented independent of the abovementioned features according to the invention in the fluid chamber of a cylinder to achieve an advantageous effect.

Cyclic variation of flow rate: Same as the combustion chamber insulation has a different effect on the fuel consumption according to different engine operating points, such combustion chamber insulation also has a different effect on the wall heat loss, the combustion efficiency, and NOx emissions during different phases of a work cycle. Therefore, it makes sense to maximize the wall heat transfer during phases of high local and temporal thermal load to reduce NOx emissions and to make the combustion process as efficient as possible. A further advantage of such maximum cooling, particularly through the combustion centre or in the region of top dead centre is that the local material loads are minimized. Once the combustion is largely completed during the power stroke, or at least after overshooting the combustion centre, it is again useful to reduce wall heat transfer to reduce wall heat loss. This also minimizes piston friction and reduces the formation of particulates as they are more completely burned by higher temperatures in the expansion phase. During full-load operation, the highest possible wall heat loss is again useful during the intake stroke, so that the volumetric efficiency can be maximized, and thus maximum engine power is achieved. Similarly, during compression, at least until the combustion starts, a low wall heat loss is useful to achieve high pressure and temperature at the start of combustion in the combustion chamber, which is normally achieved by a high compression ratio. These requirements are met by increasing and reducing at least the fluid flow rate around the combustion chamber during the working cycle according to the invention.

In an advantageous advancement of the method, it is proposed that the coolant flow rate through the fluid chamber, particularly through a lower fluid chamber region in the cylinder block is increased and reduced during the working cycle, preferably during the power stroke of the cylinder, particularly by alternate passage of the fluid chamber with hot exhaust gas and colder liquid coolant, wherein preferably the colder liquid coolant flow rate is increased at the combustion start, and is reduced after at least 40° crank angle after the combustion start. This proposed advancement can also be implemented independent of the abovementioned features according to the invention in the fluid chamber of a cylinder to achieve an advantageous effect.

A dynamic cooling capacity variation in the power stroke enables an adjustment of the thermal conditions to the current combustion process and can thereby achieve a homogenization of the thermal conditions. This reduces thermally caused mechanical stress and increases the longevity of the engine. Furthermore, the exhaust gas emissions can be controlled better.

It can also be possible, e.g. to use inertia forces in the crank mechanism, e.g. these are highest at the piston's top dead centre (TDC) and can operate a valve to start oil cooling. Or the combustion chamber pressure can open a corresponding valve. This concerns not just the cylinder, but entire combustion chamber, particularly piston surface, which can be easily cooled from below.

In an advantageous advancement of the method, it is proposed that for warming-up, a first valve for controlling the coolant flow rate through at least one partial region of the fluid chamber, particularly through an upper or a lower fluid chamber region by at least one partial opening, the coolant introduced is introduced in the fluid chamber, as soon as the engine load decreases, particularly falls below an operating point-dependent engine load and the inflowing coolant temperature is higher than one of the fluid chamber temperatures, and/or that the first valve is at least partially closed as soon as the inflowing coolant temperature is lower than one of the fluid chamber temperatures, and that for cooling, the first valve is at least partially opened as soon as the engine load increases, particularly above an operating point-dependent engine load, and the inflowing coolant temperature is lower than one of the fluid chamber temperatures and/or that the first valve is at least partially closed as soon as the inflowing coolant temperature is higher than the fluid chamber temperature. This proposed advancement can also be implemented independent of the abovementioned features according to the invention in the fluid chamber of a cylinder to achieve an advantageous effect.

A valve control for realizing an adaptive cooling capacity control in different fluid chamber regions is technically easy to implement. Thereby, the cylinder jacket can be heated quicker than the cylinder head to reduce friction and to lower NOx levels.

By such an application according to the invention, the combustion chamber parts, e.g. cylinder head, cylinder or even piston can be heated or cooled, as needed.

Furthermore, it is conceivable to arrange the first valve parallel to the thermostat, when the thermostat is simultaneously replaced by a higher opening temperature and without leakage flow.

In the engine cooling system, at least a low leakage flow rate is mostly required for proper functioning of the thermostat. Even such a small leakage coolant flow rate is disadvantageous for the warm-up, since the cooling jacket heat transfer then passes from free convection to forced convection, so that the following disadvantages occur:

Higher heat transfer coefficient from cylinder pipe to water jacket

Higher heat transfer coefficient from the water jacket to the outer part of cylinder and thus also to ambient air.

Heat dissipation through leakage flow rate

It is also conceivable that in a cooling circuit bypass, e.g. bypass for the heat exchanger is connected to the radiator inlet by means of a valve and a line and this valve is opened on exceeding a certain accelerator pedal position, so that at least a part of the coolant volume flows through the radiator even without opening the thermostat. It is particularly advantageous for minimizing NOx emissions, when this valve is configured as 3/2-way valve, so that starting from a high engine load, the entire coolant volume flows through the radiator.

At high accelerations, particularly at high engine temperatures, often there is high increase in NOx emissions, firstly because the valve for regulating the exhaust gas recirculation rate (EGR) reacts much slower than the injector, which directly increases the engine load, and secondly increased exhaust gas amount must flow first from the exhaust control valve to the cylinder and because at a subsequent load jump, increases only slowly due to exhaust back pressure, wherein EGR rate can even reduce briefly. By recognizing the accelerator pedal acceleration, the following engine load can be estimated in advance and EGR valve can also be opened earlier according to the dead times calculated or determined in test bench trials than in stationary operation with same engine load. In a turbocharged engine, the turbo-lag—a delayed engine load increase with accelerator pedal acceleration—is much higher than with warm engine due to increased bearing friction. Therefore, with cold engine, the exhaust gas pressure before the turbocharger increases quicker than the intake pressure after the turbocharger. As a result, EGR rate also increases much quicker with such load jump than with the warm engine. As a result, NOx emissions in load jumps with the warm engine are higher than with the cold engine. With quick load decrease, the demand on EGR rate generally increases. At low engine loads in stationary operation, the exhaust gas temperature is lower than at higher engine loads. With quick load reduction, it continues for some time until the colder exhaust gas is returned to the engine. Therefore, even with these dynamic conditions, there is increased NOx formation.

In an advantageous advancement of the method, it is proposed that at least one exhaust gas valve is opened or closed for recirculating exhaust gas into the combustion chamber on increasing or reducing the engine load by a predeterminable difference more than at a stationary operating point, at which the engine load corresponds to the respective instantaneous engine load during the load change, wherein preferably the difference is proportional to the speed or acceleration of the load change and/or changes with the oil temperature and/or with the coolant temperature and/or with the exhaust gas temperature, and that preferably the heat dissipation of the exhaust gas recirculation cooler from the exhaust gas to the coolant, is increased. As a result, NOx emissions are reduced in real dynamic driving without additional components or costs. This proposed advancement can also be implemented independent of the abovementioned features according to the invention to achieve an advantageous effect.

In this advancement, by an exhaust gas recirculation cooler, a dynamic heat dissipation to the coolant is proposed, which can be controlled via an exhaust gas valve. Thus, exhaust gas heat can advantageously be used for adjusting the coolant temperature, which improves the energy efficiency of the dynamic cooling control.

In an advantageous advancement of the method, it is proposed that with the exhaust gas flow through at least one controllable exhaust gas valve of the internal combustion engine in the direction of the combustion chamber of the cylinder at constant position of the engine load-setting unit and at a speed of 50% of the rated speed of the maximum opening cross-section of the exhaust gas valve, is within a tolerance of maximum 20% of the maximum opening cross-section during a respective working cycle, and at increased speed, is maintained above the engine speed of at least 50% of the rated speed and particularly corresponds to a maximum possible opening cross-section of the exhaust gas valve and/or at constant speed and increased engine load, is maintained within a load range of, particularly between 50% to 75% of the maximum engine load of the respective speed within a tolerance of maximum 20% of the maximum opening cross-section, and particularly corresponds to the maximum possible opening cross-section of the exhaust gas valve. The controllable exhaust gas valve can also be, for example, an outlet valve, via which exhaust gas also returns to the combustion chamber in a valve overlap, which is referred to as so-called internal EGR. This proposed advancement can also be implemented independent of the abovementioned features according to the invention to achieve an advantageous effect.

The background is the statutory position that shut-off devices can be banned in the most cases, with a few exceptions. By publishing EGR characteristic diagrams, it is known that even in some of the most modern car engines, the exhaust gas recirculation rate is reduced with increasing speeds and/or increasing engine loads. This characteristic is achieved by controlling, e.g. the opening cross-section of EGR valves and/or the reduction of the exhaust gas back-pressure by opening of throttle valves in the exhaust gas and/or intake system. Such operating strategies are controversial and could possibly be interpreted as inadmissible. For truck engines, the situation is different, since AGR rates mostly increase with increasing speed, since the test cycle for trucks has particularly high engine loads and high speeds, which is not the case with cars so far. It is thus advantageous for cars to keep the position of EGR valve/s and in case of diesel engines, constant in the exhaust gas and/or intake system, when the speeds and/or engine loads exceed the speeds and/or engine loads achieved during the certification tests.

It is also conceivable to use these methods in an internal exhaust gas recirculation. This refers to a return flow of exhaust gas by pulsation in the combustion chamber, e.g. during the valve overlap phase, when inlet and outlet valve/s are opened simultaneously, whereby the residual gas in the combustion chamber is increased. This residual gas or the exhaust gas returned into the combustion chamber can also be varied by adjusting the timing of exhaust and/or inlet valves by the engine management in the most modern engines with variable valve control. The main objective of such variable valve controls is the simultaneous increase in maximum power and torque, without the usual conflict of objectives between these two characteristics. Similar to external EGR, during the internal EGR also the valve overlap between intake and exhaust gas valves should be kept constant, or particularly should not be reduced, when the engine speeds and/or engine loads exceed the engine speeds and/or engine loads achieved during a certification test.

In liquid cooled engines, it may happen that the wrong coolant is filled, particularly a coolant with too much water or even water without antifreeze agent. As a result, the coolant can freeze at low ambient temperatures in winter, which in most cases leads to a major engine failure, e.g. by crack initiation in cylinder head and/or cylinder block. Likewise, the boiling temperature is lowered by too high proportion of water, whereby coolant evaporation occurs, especially in the summer, during trailer operation with steep uphill driving at slower speed. As a result, the pressure in the cooling system rises abruptly, whereby cooling water hoses can burst, or seals can be permanently damaged. At the best, there is only loss of cooling water through a pressure relief valve. This in turn involves a high risk of injury when the radiator cap is opened, since escaping steam can cause burns. In addition, an excessively high-water proportion results in increased corrosion and reduces the coolant's lubricating properties, whereby particularly the water pump's lifespan is significantly reduced.

In an advantageous advancement of the method, it is proposed that the coolant characteristics are diagnosed, particularly the dissipation constant is diagnosed, and that an engine diagnostic indicator is activated as soon as the measured coolant characteristic deviates by a minimum amount from a predetermined threshold value, wherein the threshold value varies depending on the coolant temperature, and that preferably marginal changes in the measured characteristics are stored and the threshold value is adapted to the changes, and that particularly the threshold value is not adapted when the change in the measured characteristic occurs between switching off and starting the engine, particularly when the time between switching off and starting the engine is longer than 30 seconds.

The dissipation constant (dispersal constant) indicates the power required to heat a thermistor (NTC, thermistor) 1 degree from its ambient temperature, so it is easy to measure with a thermistor such as a thermistor with negative temperature coefficient. Since the dissipation constant depends on the heat transfer coefficient, thermal conductivity and specific heat capacity of the coolant, it is particularly useful to diagnose the dissipation constant with the switched off engine, especially also because the engine should be shut off for filling the coolant.

The dissipation constant of water differs significantly from conventional antifreeze agents such as ethylene glycol, propylene glycol and glycerine, so that an excessive amount of water would alter the dissipation constant of the coolant. When this activates the engine diagnostic indicator, the driver is alerted to visit the workshop. Obviously, it is also conceivable to display in the cockpit, a separate notification of the measured water concentration or the calculated antifreeze-safe temperature. While using a high-temperature coolant operated with significantly higher temperatures than conventional 50/50 water/glycol mixtures, obviously even the maximum coolant temperature should be limited in impermissibly high-water content, e.g. by known measures like increasing the coolant flow rate through the radiator, switching on cooling fans or even restricting the maximum engine power by engine control.

The measurement of the dissipation constant is obviously only one example of determining the water concentration in coolant. It is also conceivable to measure other physical or chemical properties thereof, such as the thermal conductivity, specific heat capacity, thermal expansion coefficient, viscosity, etc. Likewise, an increased water concentration in coolant can be diagnosed by measuring the coolant pressure, since coolant then boils earlier, whereby the pressure increases quickly. This can occur e.g. by storing a table with the reference pressure depending on coolant temperature, and possibly also with the coolant level and other parameters such as engine speed and on exceeding the corresponding limits, an error function is diagnosed and displayed. To completely avoid the risk of spraying of hot coolant on opening the radiator cap, one lock could also be provided in this, only to be opened below a certain coolant pressure. It would also be conceivable to automatically switch off the engine when the pressure drops by opening the radiator cap. This can prevent that a wrong coolant would be filled with running engine and thus could be diagnosed bad. The preferred continuous coolant diagnosis prevents the engine from freezing in winter, overheating in summer, preventing corrosion and protecting the water pump. This proposed advancement for the diagnosis of the coolant properties can also be implemented independent of the abovementioned features according to the invention to achieve an advantageous effect.

In an advantageous advancement of the method, it is proposed that with a positive change in the engine load, the power of at least one radiator fan and/or electric motor load of the power generator, particularly the alternator, is reduced at least for a limited time and is particularly switched off. Thus, the maximum engine load during acceleration can be briefly reduced, whereby the maximum combustion chamber temperature and NOx emissions are also reduced. Since this radiator fan and/or power generator shutdown occurs only for a short time, for few seconds, the coolant temperature is change only marginally and damped by the heat capacity of the entire system. Likewise, the battery charging level is only marginally affected. This proposed advancement can also be implemented independent of the abovementioned features according to the invention to achieve an advantageous effect.

In a secondary aspect, a thermal management system of an internal combustion engine for performing one of the aforementioned thermal management methods is proposed. The heat management system comprises at least one fluid chamber disposed at least partially around the cylinder of the internal combustion engine, having at least one inlet line and at least one outlet line, wherein the fluid chamber is connected to at least one coolant delivery device for supplying a coolant and connected to at least one heat sink, wherein the heat sink is particularly ambient air or an air-cooled radiator. It is proposed that the coolant flow rate supplied by the coolant delivery device can be changed by a throttle device, particularly independent of the engine speed, wherein the throttle device particularly consists of at least one first valve. The first valve is coupled with an engine load-setting unit for adjusting the engine load, and the first valve can be controlled by the engine load control unit such that the fluid flow rate through the fluid chamber is increased, when the engine load is increased, and is reduced when the engine load is decreased. In particular, a cylinder head temperature sensor, and/or a fluid chamber temperature sensor is included. The flow rate of the coolant delivery device can be controlled depending on the engine speed, and/or fluid chamber temperature and/or engine load, particularly by operating at least the first valve for controlling the coolant flow rate through at least one of the fluid chambers. This proposed advancement can also be implemented independent of the abovementioned inventive features to achieve an advantageous effect.

Deceleration cut-off: Preferably, the shutdown of combustion during coasting is a known means for reducing fuel consumption in engines with electronically controlled injection.

In an advantageous advancement of the system is proposed that the engine load-setting unit, particularly an accelerator pedal or throttle grip, is equipped and mechanically configured for controlling the fuel supply of the internal combustion engine, particularly configured without an electrically controlled injection valve, and is equipped to automatically switch off the fuel supply, when the engine load control unit has a minimum load position, particularly when it is closed, and the vehicle is decelerated during a coasting mode, wherein the negative pressure in the intake pipe in the coasting mode is greater than the negative pressure in a coasting-free idling mode, or the pressure difference between the air intake pipe and the reference pressure, particularly ambient pressure, is greater than in the coasting-free idling. This proposed advancement of overrun fuel cut-off can also be implemented independent of the abovementioned features according to the invention to achieve an advantageous effect.

In many low-cost carburettor vehicles with a single carburettor (i.e., without engine control that can control fuel quantity) manufactured in large numbers in developing or emerging countries, such as the India, Indonesia, etc., continue to burn fuel during coasting. In NEDC test, this accounts for about 2-3% of the fuel consumption, in Indian test cycle for two and three-wheelers (IDC) even more than 5% compared to engines in which fuel supply is switched off during coasting.

In simpler low-cost engines with mechanical carburetion e.g. by means of carburettor, deceleration fuel cut-off was not possible until now. During coasting, the negative pressure in the intake manifold with closed throttle device is significantly higher than during idling. By coupling the load setting device position to the negative pressure in the intake manifold, the fuel supply can be switched off during coasting without stopping the engine when idling.

Such a fuel cut-off also causes the reduction of exhaust emissions, particularly HC and CO, since no fuel is supplied and burned during coasting, and NOx emissions reduced, since the combustion chamber and particularly exhaust gas valves are cooled down by air pumped through during coasting, so that the maximum combustion temperatures are reduced at the start of subsequent acceleration phases. Heat loss during idling, since cooling by fuel evaporation is avoided.

Uncontrolled exhaust gas recirculation EGR: The exhaust gas recirculation into the combustion chamber is another well-known measure for reducing fuel consumption and NOx emissions. NOx emissions are reduced by reducing the maximum combustion temperature and the fuel consumption is reduced by dethrottling, whereby in petrol engine, fuel consumption is reduced by about 2-3% and more, depending on cycle and maximum possible EGR rate.

However, the exhaust gas recirculation system costs are usually very high, particularly due to the control valves required, which are also very vulnerable. Therefore, the use of exhaust gas recirculation systems is avoided, if possible. The proposed solution considerably reduces the exhaust gas recirculation cost, to enable its economical use even in very simple single-cylinder engines with carburettors.

In an advantageous advancement of the system, it is proposed that the engine load control unit is in mechanical operative engagement with a throttle device, particularly connected to a throttle valve or throttle slide valve, and the throttle device is in operative engagement with an exhaust gas valve, wherein the exhaust gas valve is at least partially closed on opening the throttle device, and the first side of exhaust gas valve is connected to an exhaust gas recirculation line of the internal combustion engine and conducts exhaust gas, and the second side of exhaust gas valve is connected via a line or opening to an intake pipe of the internal combustion engine after and/or before the throttle device, and in case of the throttle slide valve above the throttle slide valve, at least one exhaust gas opening connected to the exhaust gas recirculation line of the internal combustion engine is present, which is at least partially closed on opening the throttle slide valve and conducts exhaust gas in a chamber above the throttle slide valve, and preferably a connection line connected to intake pipe of the internal combustion engine is present downstream and/or upstream the throttle slide valve and/or the exhaust gas valve.

The opening on the second side of the exhaust gas valve could be a hole in the throttle slide valve, which extends from top to bottom and is present in many throttle slide valves, e.g. a side slot made to guide via a locking pin.

The space above the throttle slide valve is flooded with exhaust gas, as shown in FIG. 10. A part of this exhaust gas will flow down alone through the slide valve recess into the intake duct. Many throttle slide valves also have an additional hole downwards, through which the throttle cable is suspended. In case of a throttle slide valve, the exhaust gas valve is made, e.g. of the upper edge of the throttle slide valve and the opening for the exhaust gas duct, which is in the carburettor housing. This proposed advancement of an exhaust gas recirculation can also be implemented independent of the abovementioned inventive features to achieve an advantageous effect.

External exhaust gas recirculation (EGR) systems typically require a valve controlled by the engine control. Thus, this is not possible without engine control. With the proposed solution, it is possible to realize an external exhaust gas recirculation even without engine control.

EGR valves are quite complex and expensive, particularly by the required actuator, mostly a vacuum actuator in combination with a controller that regulates the connection to engine's negative pressure. Furthermore, mostly a sensor is still required for determining the actual EGR valve position, particularly also for fault diagnosis within the scope of statutory on-board diagnostic (OBD) requirement. EGR valve significantly determines the cost of an EGR system. Therefore, EGR is often dispensed with in gasoline engines because of high costs. The solution according to the invention enables an EGR valve even without additional expensive actuators and sensors, when EGR valve is actuated by operating the throttle valve (analogous to solution 3.), e.g. the valve can be placed on the same drive shaft or connected thereto via a transmission, or even via connection to the accelerator pedal/throttle grip etc.

By the proposed solution, NOx emissions and fuel consumption and $CO_2$ emissions are reduced at minimal cost.

Split block cooling jacket: In modern engines, often the cylinder block is operated at higher coolant temperature than the cylinder head to reduce piston friction and wall heat loss. This has the disadvantage that susceptibility to knocking may increase, and at low piston speeds, mixed friction occurs more in the region around the top dead centre, which is disadvantageous for fuel consumption, wear, and operational stability. Furthermore, this generates temperature stresses between cylinder head and cylinder block, which must be absorbed by the cylinder head gasket with high technical effort.

In an advantageous advancement of the system, it is proposed that the fluid chamber is divided into an upper fluid chamber region and a lower fluid chamber region, wherein preferably the upper fluid chamber region is configured as cylinder head fluid chamber which is fluidically separated from the lower fluid chamber region, which is particularly configured as cylinder block fluid chamber, is fluidically separated, particularly fluidically separated by a cylinder head gasket, so that the coolant flow rate through one of two fluid chambers, particularly the cylinder block fluid chamber can be adjusted independent of the flow rate of other fluid chamber, particularly the cylinder head fluid chamber, and preferably has at least one separate inlet and/or outlet, wherein the cylinder block fluid chamber can be temporarily filled with gas, particularly can be filled by pumping a coolant with gas, and wherein preferably cooling circuits of cylinder block fluid chamber and cylinder head fluid chamber are structurally kept separated and are respectively filled with different coolants, wherein preferably the coolant in the cylinder block fluid chamber has a higher boiling temperature than in the cylinder head fluid chamber, and wherein further preferably, the cylinder block fluid chamber comprises at least two fluid chamber regions with an upper cylinder block fluid chamber having a height which is only a part of the cylinder stroke, particularly less than 50% of the cylinder stroke, and is preferably connected to the cylinder head fluid chamber, and a lower cylinder block fluid chamber, in which at least a part of the lower cylinder block fluid chamber is disposed in the direction of the piston stroke below the upper cylinder block fluid chamber, and that particularly the temperature of the lower fluid chamber is at least 40° C. higher than the temperature of the fluid chamber. This proposed advancement can also be implemented independent of the abovementioned features according to the invention in a fluid chamber of a cylinder to achieve an advantageous effect.

By dividing the cooling jacket of the cylinder block into upper and lower regions, the upper region can be operated at higher coolant temperature than in the lower region, e.g. with the coolant temperature of the cylinder head cooling jacket. This reduces the knocking tendency and prevents mixed friction of the piston in the region of the top dead centre. Moreover, the temperature stresses between cylinder head and cylinder block are significantly reduced. Furthermore, lower portion of the cooling jacket of engine block can be operated with a further increased coolant temperature, e.g. by increasing pressure or by using a high-temperature coolant. As a result, the piston friction and wall heat loss are reduced in the lower portion of piston stroke.

In principle, there are at least three different variants:
1. Separation of block and head cooling jacket, wherein only the block is also temporarily filled with gas.
2. Separation of head, upper and lower block cooling jacket, i.e. 3 different cooling jackets.
3. Separation of block and head cooling jacket, as in 1., with the difference that the upper block cooling jacket is connected to the head cooling jacket, or the head cooling jacket thus also includes a certain upper portion of the block cooling jacket, the separation is then not through the head gasket.

High-temperature coolant: One of the biggest limitations of conventional cooling systems is the coolant, which consists of a mixture of water and maximum 70% of antifreeze additive such as glycol. These coolants usually boil at 110° C. with one bar ambient pressure, or at 125° C. with one bar overpressure, i.e. 2 bar total pressure. Therefore, the maximum engine operating temperature is restricted to values below these limits or remains significantly lower than this due to safety margins.

In an advantageous advancement of the system, it is proposed that at ambient pressure of one bar, the coolant in the fluid chamber, particularly in the lower fluid chamber regions, has a boiling temperature of above 130° C. and a freezing temperature of −30° C. or lower, and preferably has a specific heat capacity of greater than 2.4 kJ/(kg-K), wherein preferably the coolant contains less than 30% water and particularly comprises at least 94% propylene glycol, or particularly consists of up to at least 80% ethylene glycol, propylene glycol, glycerine or any mixture of these substances or is oil or air, and wherein particularly at least one fluid chamber temperature sensor is included for detecting the coolant temperature in the fluid chamber, particularly in the lower fluid chamber region, and preferably the first valve is disposed to reduce the coolant flow rate through at least one of the fluid chambers, when after exceeding the temperature limit 120° C., the fluid chamber temperature again falls below this temperature limit. In particular, the coolant known under the trade name G13 with a mixture of mainly glycerine and ethylene glycol or with trade name Evans Waterless Coolant containing 94% to 96% propylene glycol can be used as coolant. This proposed advancement can also be implemented independent of the abovementioned features according to the invention to achieve an advantageous effect.

A coolant with significantly higher boiling temperature enables temperature control over much wider range, so that in partial load condition, significant fuel consumption improvements as in insulated pistons can be realized by higher coolant temperature. In particular, the combination of engine load-controlled manipulation of the coolant flow rate with high-temperature coolant enables further fuel saving advantages with minimal effort, so that even low-cost and small engines with air or oil-cooling can be operated economically by reducing fuel consumption. For example, air-cooled engines with temperature control typically operated with similar low coolant temperatures below 100° C. to maintain air at full load within the allowable component temperatures, particularly for pistons, cylinder head and cylinder block, due to the lower specific heat capacity and lower thermal conductivity of the cooling medium. The same applies to engines with oil-cooling. The increase in the cooling medium temperature to above 130° C. is of particular significance here, since the operation at temperatures above 130° C. is possible only with fluids without significant water content, such as air, oil, or propylene glycol, as otherwise water would evaporate and produce a large overpressure, which exceeds the limits of conventional cooling system components.

By such high-temperature coolant in conjunction with increased coolant temperatures, thus the fuel consumption and exhaust gas emissions can be reduced at the lowest costs, the engine power increased, the risk of engine overheating, particularly by local film boiling, can be reduced. By film boiling, extremely high peak temperatures occur locally in high water-containing coolants, which build-up particularly very quickly, since the heat transfer coefficient abruptly drops during transition from nucleate boiling to film boiling, precisely at instant when the combustion chamber temperatures rise quickest. This leads to strong thermal shock conditions, wherein combination of resulting thermal stresses and reduced component strengths (quasi by soaking) quickly result in crack formation. Such crack formation occurs much often, for example in air-cooled engines. Also, the maximum pressure of the cooling system can be reduced by a high-temperature coolant, whereby the load on hoses and gaskets, particularly water pumps, decreases. This is also the main reason why the maximum coolant pressure and maximum coolant temperature are rated lower in most Japanese cars than in most cars of European manufacturers, wherein it should be noted that in the breakdown statistics, most Japanese manufacturers lead with few failures.

The risk of corrosion and cavitation, particularly in the water pump, is also minimized to the cooler outlet area and floating cylinder liners by reducing the water proportion. Furthermore, by a higher coolant temperature, the cooling capacity delivered by the radiator is increased, whereby it is possible to reduce the radiator size and also to save weight. By using heat accumulator, their storage capacity is also increased dramatically, e.g. the temperature difference of typical Japanese car with a coolant temperature of 85° C. and environment of 25° C. is only 600C, this is doubled to 120° C., by increasing the coolant temperature to 145° C.

In particular, in trucks in which the cold start for the exhaust gas emissions is not as significant as for cars, because of significantly longer operating life per ride, it may be advantageous that the coolant temperature in the cylinder block and particularly in the cylinder head exceeds a limiting temperature of 135° C., particularly at part load as well as at full load, wherein the coolant particularly contains no water or contains at least less than 3%. Such high coolant temperature can be achieved particularly by reducing the coolant flow rate flowing through the engine.

This has the advantage that particularly the fuel consumption and particle emissions are reduced, which may cause significantly higher health costs per unit weight than e.g. NOx emissions.

Therefore, it is also advantageous to convert existing vehicles, in which the thermostat is replaced with a thermostat with a higher opening temperature of at least above 120° C. and the coolant is replaced by a coolant with less than 20% water content.

In engines with a permanently open bypass circuit that does not pass through the thermostat, another thermostat with a higher opening temperature of at least above 120° C. can be installed to increase the coolant temperature still quicker.

In order not to reduce the heating power of the passenger compartment here, it makes sense to implement additional thermostat used in the bypass circuit to use a thermostat with parallelly disposed thermostatic bypass valve, wherein the thermostatic bypass valve is particularly connected to a unit for adjusting the passenger compartment temperature or the heating requirement. For this purpose, the thermostatic bypass valve can be opened when a desired heat output is adjusted by the unit for adjusting the passenger compartment temperature or the heating requirement.

In an advantageous advancement of the system, it is proposed that the fluid chamber, particularly the lower fluid chamber region is connected to a surge tank having a liquid side which is at least partially filled with a first liquid coolant fluid and a gas side which is filled with a second gaseous coolant fluid, wherein the gas side of the surge tank and the fluid side of the surge tank are respectively connected to the fluid chamber via a connecting line, wherein with decreasing engine load, particularly on falling below a predetermined engine load, particularly an operating point-dependent engine load and/or on falling below an engine temperature, the first coolant fluid is at least partially displaced from the fluid chamber into the surge tank, so that the second coolant fluid from the surge tank is at least partially displaced into the fluid chamber and wherein preferably the second coolant fluid has oxygen content of less than 20%. This proposed advancement can also be implemented independent of the abovementioned features according to the invention to achieve an advantageous effect.

A disadvantage of conventional liquid cooling is that during warm-up, the engine is over-cooled for several reasons:
 a. Conventional coolants have high specific heat capacity, so that a large part of the heat dissipated through the combustion chamber walls is used for heating the coolant.
 b. The thermal conductivity of coolant is high, so that the wall heat is conducted quickly from the cylinder wall to the outer wall of the water jacket.
 c. The coefficient of heat transfer from the coolant to the outer wall is very high.

The emptying of the coolant accelerates the heating of the cylinder wall for several reasons:
 d. The gas, e.g. air has only about one-tenth of the thermal conductivity of coolant, thus it has insulating effect between the cylinder wall and the outer side of the cooling jacket.
 e. Air has only about 0.3 per thousand of the volume specific heat capacity of coolant, so it is heated much quicker than coolant.

In normal engines, the surge tank of a cooling system is filled with air. This has the disadvantage that this air is dissolved in the coolant and leads to corrosion, even leads to pitting in the worst case. If oxygen content in gas region of the surge tank is reduced, e.g. by using nitrogen, a corresponding corrosion is avoided.

Thus, the advantages are quicker engine heating that leads to reduction of fuel consumption and exhaust gas emissions with minimal effort.

By using an electric coolant pump that can be operated in both directions, an additional electric coolant pump and a third shut-off valve and an additional connecting line can be dispensed with, which reduces the costs and complexity.

In an advantageous advancement of the system, it is proposed that the liquid side of surge tank is connected via a second valve, and via a fluid delivery device and preferably to an inlet line valve, to an inlet line of the fluid chamber, particularly of the lower fluid chamber region, wherein preferably the inlet line valve and the second valve are configured as a single 3/2-way valve, and wherein further preferably at least the coolant delivery device and/or the second fluid delivery devices is a bidirectional pump, particularly an electric pump, wherein with decreasing engine load, particularly on falling below a predetermined operating point-dependent engine load and/or on falling below an engine temperature, the second valve is at least partially opened, and the inlet line valve is at least partially closed for controlling the coolant flow rate through the fluid chamber and the first coolant fluid is pumped from the fluid chamber into the surge tank until the fluid chamber is at least partially filled with the second coolant fluid, and that on increasing the engine load, particularly on exceeding a predetermined operating point-dependent engine load, the second valve is at least partially closed and the inlet line valve is at least partially opened. This proposed advancement can also be implemented independent of the abovementioned features according to the invention to achieve an advantageous effect.

By using this additional fluid delivery device, which is particularly operated electrically, the first coolant fluid can also be evacuated from or returned to the fluid chamber, irrespective of the type and operation of the first coolant delivery device. In particular, by closing the inlet line valve, it is even possible to evacuate the first coolant fluid from the fluid chamber while the first coolant delivery device is mechanically driven. When the fluid chamber is sufficiently filled with the gaseous second coolant, the third valve should be closed, so that the additional fluid delivery device can be shut-off and consumes no power. When the first valve is closed after evacuation, which occurs particularly with stopped engine, thus even without the second valve and without the inlet line valve, it can be ensured that the fluid chamber remains filled with the gaseous second coolant, even while the first coolant delivery device is mechanically driven.

The adequate emptying of the fluid chamber can be determined by, e.g. after lapse of a predetermined minimum duration, or by determining the drive power, particularly the absorbed current, since the power consumption of the additional fluid delivery device drops when the gaseous second cooling medium fluid reaches the additional fluid delivery device.

In an advantageous advancement of the system, it is proposed that in the connecting line between the gas side and the outlet line of the fluid chamber, particularly the lower fluid chamber region, a third valve is disposed, through which the fluid flow of the second coolant fluid is opened on pumping the first coolant fluid from the fluid chamber into the surge tank and/or on filling the fluid chamber with the first fluid and/or that after filling the fluid chamber with the first coolant fluid, the third valve is at least partially closed, particularly closed after a time lag.

By connecting the cooling jacket to the pressure surge tank, which can be regulated by a shut-off valve, the venting of the cooling jacket is possible much quicker than in a conventional cooling system, where air is returned into the pressure surge tank only through a parallel bypass and through some restrictions. Thereby, the possibility of localized material overheating due to lack of cooling due to air bubbles is avoided.

It is of particular advantage that at least during the venting of the fluid chamber, or the filling of the fluid chamber with the first coolant fluid, the total coolant flow or at least 50% of the total coolant flow is conducted through the pressure surge tank or a gas bubble separator. In a normal venting of the cooling system, a relative overpressure prevails in the vent lines, by which the gas bubbles are pressed together and can be vented only with difficulty. In the proposed arrangement, a relative negative pressure is generated by the suction effect of the fluid delivery device in the vent lines, which enlarges the gas bubbles and easily sucks away from the fluid chamber, similar to vacuum filling of the cooling system, e.g. in the vehicle production.

In the separate emptying and filling of different fluid chambers, it is advantageous if the fluid chamber of the cylinder head is first filled and only then the fluid chamber of the cylinder block is filled, because the cylinder head is more difficult to vent and the venting may continue longer, and since the cylinder head warms up quicker and is more thermally loaded than the cylinder block.

A disadvantage of the method with stagnant coolant is that stagnant coolant leads to unequal distribution of temperature level and leads to high local material loads, particularly of the cylinder head gasket and the surfaces of the cylinder head and cylinder block in contact therewith.

Such an unequal distribution of temperature level can be avoided, if fluid chamber is filled with gas and the inlet line and after filling, the inlet line and outlet line of the fluid chamber are interconnected, e.g. via an additional circulation valve. The thermosiphon effect creates a circulation of gas present in the fluid chamber. Furthermore, this circulation can be increased, if the coolant delivery device is disposed between the inlet line and the outlet line of the fluid chamber, which can also supply gas.

Dynamic cooling jacket insulation: It is known to provide an insulating layer on the cooling jacket, wherein the insulating layer is particularly in close contact with the inner cylinder wall. This has the disadvantage that at high engine load, the cooling effect is reduced and on evacuating the cooling liquid, the insulating layer shows, by its high specific heat capacity, a much higher thermal mass to be heated than air and it has a higher thermal conductivity than air. Therefore, on filling with a hot coolant, the coolant is insulated from the cylinder wall and the coolant heat loss is dissipated to the outer surface.

In an advantageous advancement of the system, it is proposed that at least partial regions of the surface of the fluid chamber, particularly the lower fluid chamber region differentiated and outwardly directed by the coolant with respect to a cylinder wall of the cylinder, is provided with an inner insulating layer, wherein the insulating layer at least partially abuts an outwardly directed surface of the fluid chamber, and is preferably configured in several parts, wherein preferably the insulating layer is preloaded towards the outwardly directed surface of the fluid chamber, such that the insulating layer has a larger radius with respect to the centreline of the cylinder than the outwardly directed surface of the fluid chamber, or that the insulating layer is spaced inwardly with respect to the cylinder wall by dotted spacers, and that the insulating layer preferably comprises two materials with different coefficients of thermal expansion, particularly a bimetallic support, wherein the coefficient of thermal expansion of the material disposed outside is greater than the coefficient of thermal expansion of the material located inside, so that on heating, the insulating layer curves inwardly at least at the end regions and reduces the contact area with the surface of the fluid chamber directed outward, so that the heat transfer coefficient is increased outwards, and that particularly adjacent insulating layers overlap at end regions. This proposed advancement can also be implemented independent of the abovementioned features according to the invention to achieve an advantageous effect.

By the proposed solution, the outer surface of the cooling jacket or the fluid chamber is insulated in a cold start, so that the fluid chamber is warmed up quicker. At high loads and coolant temperatures, the insulating layer moves away from the outer surface of the fluid chamber, whereby a better cooling is achieved.

Heat accumulator integration: The use of conventional heat accumulators has the disadvantage that the largest part of the stored heat is lost to the outer surfaces of the cooling jacket during discharge. Therefore, these heat accumulators must be particularly large and heavy to be able to store enough heat, so that significant savings in fuel consumption can be achieved. As a result, these heat accumulators are very expensive and mostly uneconomical. Furthermore, on evacuating the coolant from the water jacket, starting from certain engine loads, a higher cylinder wall temperature can be achieved than through a heat accumulator, whereby with a combination of heat accumulator and coolant evacuation, the required size of the heat accumulator can be reduced considerably, whereby an economic use is enabled.

In an advantageous advancement of the system, it is proposed that at least one coolant heat accumulator, preferably a surge tank is included, which is connected to the fluid chamber, particularly connected to the lower fluid chamber region, and connected to an oil heat exchanger, wherein on a cold start, hot coolant can be supplied from the coolant heat accumulator via the oil heat exchanger, particularly when the coolant is not passed through the fluid chamber, and that particularly in a warm operating state, hot coolant can be supplied from the fluid chamber into the coolant heat accumulator. This proposed advancement can also be implemented independent of the abovementioned features according to the invention to achieve an advantageous effect.

When the coolant is evacuated, a heat accumulator makes no sense for heating the engine, because the cylinder head should be kept cold for lower NOx emissions. Therefore, a heat accumulator is very useful for quick warming of oil, particularly in combination with an inner insulating means.

Whereas, if the method of coolant evacuation is not used, an advantageous embodiment is to supply during cold start, the warm coolant stored in a heat accumulator only into the fluid chamber disposed around the cylinder, and at least temporarily close the flow again after filling the fluid chamber with warm coolant. As a result, the required volume of the heat accumulator can be reduced significantly.

Conventional expansion vessels have a much smaller cooling water volume than heat accumulator, so that no significant improvements in consumption can be achieved by insulating the heat accumulator. By moving the air cushion from the expansion vessel into the engine cooling jacket after switching off the engine, the heat accumulator volume of an expansion vessel could be approximately doubled without requiring additional installation space. The disadvantage is that this quickly leads to corrosion of the water jacket, since this then comes into contact with air from inside in conjunction with water from the coolant. This corrosion is avoided by using a water-free coolant and by replacing air in the expansion tank with an inert gas such as nitrogen. When such a highly insulated surge tank is used only for heating engine oil, which is thermally separated from the crankcase, particularly by internal insulation, the size of a normal expansion tank is quite sufficient to ensure a significant reduction in fuel consumption.

In an advantageous advancement of the system, it is proposed that a surge tank of the cooling system is configured as a highly insulated heat accumulator and is filled with coolant and gas, wherein an outlet of the surge tank is disposed below and an inlet is integrated particularly in a closure cap of the surge tank, and horizontally disposed partition walls are disposed particularly in the inner space of the surge tank below the threshold level, which alternatively open a flow opening on one side—from the bottom to the top, so that a labyrinthine coolant flow channel is defined from the surface downwards.

The connection lines of heat accumulators can lead to large heat losses due to heat conduction and particularly due to the coolant flow by the thermosiphon effect. When a heat accumulator requires a cap to replenish liquid, additional heat losses occur. Another problem of the heat accumulators is internal short circuits, which means that a small partial flow of the storage fluid flows past the majority of the storage fluid. As a result, the cold storage medium is not completely displaced by hot storage fluid while charging and likewise the hot storage medium is not sufficiently displaced by colder one while discharging.

By integrating the inlet into the closure cap, a possible source of loss is avoided. Here, the use of the inlet has the advantage that this is filled with air or gas and therefore has a very low thermal conductivity. Furthermore, a return flow of the storage fluid—thus the thermosiphon effect—is prevented by the gas bubbles contained therein. Internal short circuits can be prevented by partition walls, which increases the effectiveness of heat accumulators.

Two different coolants: The cooling jacket of a cylinder head is usually much more complex than the cooling jacket of a cylinder block by the intake and exhaust gas ducts passing the cylinder head, spark plug or glow plug, injection valve, etc. Therefore, the venting of the cooling jacket of a cylinder head is much more difficult than that of a cylinder block and typically continues much longer. Therefore, it is advantageous in a cyclic emptying of the cooling jacket to empty only the cooling jacket of the cylinder head and not that of the cylinder head. In addition, the cylinder head is thermally much more heavily loaded than the cylinder block, so that damage by overheating is possible much easier than in the cylinder block, inter alia, since the hot exhaust gas ducts pass through the cylinder head, the cylinder head remains completely in contact with hot working gas during the complete power stroke, wherein the cylinder surface is still completely covered by the piston at the end of the power stroke at the top dead centre and remains completely in contact with the working gas only at the very end of the power stroke. Another problem is the coolant with high boiling temperature, such as oils are combustible. In case of a leakage, such as through a defective connection hose, oil could then run on hot engine parts like the exhaust and catch fire. With the separation of the head and block coolant circuit, wherein particularly different coolants are used, the cylinder block coolant circuit can be completely housed within the engine and coupled to the colder coolant circuit of the cylinder head through a heat exchanger. This avoids the problems described above and particularly the risk of leakage of a flammable coolant is minimized.

In an advantageous advancement of the system, it is proposed that in a web between combustion chambers of adjacent cylinders, at least one first coolant passage opening is disposed for coolant exchange between the each of pressure- and counterpressure side of the piston facing side in the cylinder block and/or cylinder head, and/or a second coolant passage opening is disposed in the middle between two adjacent outlet valves of the cylinder in the plane through the centrelines of both outlet valves, wherein the flow velocity in at least one of the coolant through-openings is increased by reducing at least one flow cross-section of the cylinder head fluid chamber and/or the cylinder block fluid chamber in the direction parallel to the coolant passage opening, wherein preferably the coolant passage opening is at least 10% of the minimum total cross section of the cylinder head fluid chamber in a plane through the centrelines of both outlet valves. This proposed advancement can also be implemented independent of the abovementioned features according to the invention to achieve an advantageous effect.

Gusset flow control: The web between two adjacent cylinders is the highest thermally loaded region of an engine block. Recently, holes—through which the coolant flows—are introduced in this bridge for reducing the temperature in this gusset. In the cylinder head, slots are also partially sawn into this web region for the same reason. Although the temperature in this region is lowered, the region still remains the most heavily loaded region of an engine block as before, because firstly the area of these web-cooling openings available for heat exchange with the coolant is very small and secondly the flow velocity is very low due to the high pressure loss of the small openings as compared to the remaining flow-through regions of the water jacket. Due to the low flow velocity, the heat transfer coefficient is lower than in the other regions. Through targeted throttling of the other regions of the water jacket, the flow velocity in the region of the web-cooling opening is significantly increased, and this reduces the temperature load. Thereby, the susceptibility to knocking is reduced and a high-temperature coolant with lower specific heat capacity can be used even in engines with high peak power. With normal coolant, which particularly includes more than 30% water, such an increase in the flow velocity in the gusset by throttling of the opposite side would not be possible, since this would significantly increase the pressure loss, so that at high engine load, vapor bubbles would form because of the low boiling temperature of water, whereby the coolant would be irreversibly damaged and there would be local material overheating with film boiling.

Gearbox connection: After a cold start of the engine, the transmission is heated up much slower than the engine. In automatic transmissions, heat exchangers are used for cooling the transmission oil at high loads. During warm-up operation, thus the transmission can also be heated quicker. However, most manual transmissions have no oil pump, so that a quick warm-up by means of engine coolant is not possible.

In an advantageous advancement of the system, it is proposed that on the transmission oil sump of a transmission connected to the internal combustion engine and/or on the rear axle differential, an external transmission oil heat exchanger—integrated in the cooling circuit of the internal combustion engine—is disposed in the oil circuit, which is preferably disposed in the cooling circuit between the internal combustion engine and the radiator, wherein a radiator bypass line with a radiator bypass valve for bypassing the radiator, is disposed in the coolant circuit downstream the transmission oil heat exchanger, so that the transmission oil heat exchanger can be at least partially operated without radiator flow, wherein the transmission is preferably configured as gearbox without oil pump and preferably the transmission oil heat exchanger has an outer insulation, and wherein preferably then outer housing of the transmission oil heat exchanger is made of plastic and wherein further preferably, the transmission oil heat exchanger is glued to the transmission. This proposed advancement can also be implemented independent of the abovementioned features according to the invention to achieve an advantageous effect.

By attaching a heat exchanger from outside to the oil sump of the transmission, a manual transmission can also be heated quickly. Furthermore, the entire transmission also acts thereby as a radiator at full load, whereby the main radiator can be dimensioned smaller. In addition, a subsequent mounting is also easily possible by gluing. With the outer insulation of the heat exchanger, the heating effect is further improved, just as by making the outer half of the heat exchanger of plastic. By such a mounting method, the transmission of simple two-wheelers can also be warmed up quickly, in the case of an engine with air cooling e.g. by passing the heated air from the engine to the transmission, or even by directing hot exhaust gas from the exhaust to the transmission. Similar to the attachment to a manual transmission, obviously a heat exchanger can also be attached from outside to the oil sump of a differential transmission e.g. of a rear axle.

In an advantageous advancement of the system, it is proposed that the combustion chamber of the cylinder comprises an expansion chamber separate from the combustion chamber, which is connected to the combustion chamber at least via an expansion chamber valve, particularly a pressure relief valve, wherein the expansion chamber valve is opened when the combustion chamber pressure is increased and is closed when the combustion chamber pressure is reduced, and wherein preferably the expansion chamber is disposed in a piston and further preferably the expansion chamber has a second expansion chamber valve, wherein the second expansion chamber valve can be opened by inertia, particularly after at least 90° crank angle after the top dead centre, wherein further preferably, an insulating layer is disposed below the expansion chamber in the piston. Obviously, it is also conceivable that the second expansion chamber valve is also a simple pressure relief valve, which is opened when the pressure in the expansion chamber is greater by a minimum amount than the pressure in the combustion chamber. This proposed advancement can also be implemented independent of the abovementioned features according to the invention to achieve an advantageous effect.

By opening an expansion chamber, pressure and temperature in the combustion chamber are reduced and this reduces NOx formation and increases wall heat loss. After falling below the opening pressure; e.g. 50 bar, the first expansion chamber valve is closed and the pressure in the expansion chamber is temporarily stored. Later, after opening the second expansion chamber valve, the stored pressure energy is delivered to the combustion chamber for increasing the effective work. The expansion chamber below the piston simultaneously constitutes an insulating layer, which reduces the wall heat discharge of the piston. By an insulating layer below the piston, the heat loss of the expansion chamber can be additionally reduced.

Advantageously, a high-temperature phase change material can be integrated in the piston crown, the phase change material is preferably insulated with an insulating layer on the underside of the piston and wherein the melting temperature of the phase change material is preferably above 110° C. and particularly consists of lithium or a mixture of lithium and sodium or a different mixture of at least one alkali metal with another metal. As previously described, the piston insulation usually has more disadvantages than advantages. By integrating a phase change material in the piston crown, these disadvantages can be avoided. During load change and during compression, the piston temperature is usually relatively low, so that the phase change material assumes a solid state of matter. At the beginning of the combustion phase, the piston temperature increases very sharply without phase change material, whereby the wall heat loss increases dramatically. With integrated phase change material, the phase change material melts first, whereby the piston temperature remains more or less constant until the phase change material has melted. The phase change material thus briefly stores a part of the otherwise los wall heat. After completion of the combustion in the expansion phase, the temperature in the combustion chamber again falls well below the melting temperature of the phase change material. Thereby, the energy stored in the phase change material is again dissipated to the combustion chamber and used. This increases the efficiency of the work process and reduces fuel consumption. By insulating the piston below the layer with the phase change material, losing too much of the heat stored in the phase change material is avoided. Furthermore, the tendency to knock is reduced, whereby further efficiency increases are possible. This proposed advancement can also be implemented independent of the abovementioned features according to the invention to achieve an advantageous effect.

Sodium cooling in the piston centre: Advantageously, at least one chamber can be disposed below the piston centre, which is at least partially filled with a coolant, wherein preferably the coolant consists of sodium, wherein the total cross-sectional area of all these chambers is at least more than 40% of the cross-sectional area of the cylinder. This proposed advancement can also be implemented independent of the abovementioned features according to the invention to achieve an advantageous effect.

The piston temperature reduction in the area behind the piston rings by a ring channel partially filled with sodium outside the piston, is known in diesel engines to prevent coking of the engine oil in the piston ring grooves, since such coking increases the wear of piston rings and significantly contributes to the aging of oil. However, most of the wall heat losses occur in the piston centre, where the insulating layer is the smallest through air to the flame front, and where the piston temperatures are also highest locally. By arranging a chamber partially filled with a coolant such as sodium under the highest thermally loaded piston centre, the coolant is thrown upwards to the piston crown at the top dead centre, wherein the coolant absorbs the wall heat. The coolant throw produces a flow velocity that enhances the heat transfer process by convection. This reduces the piston temperature as well as the dynamic change in the piston temperature. As a result, the wall heat losses are reduced. After the end of the combustion, the coolant is thrown off the piston crown downwards. This results in a strong insulation effect, so that the wall heat loss is significantly reduced even in the second half of the power stroke. Furthermore, this reduces the susceptibility to knocking.

In an advantageous advancement of the system, it is proposed that at least one heat source disposed in the combustion chamber—particularly a glow plug, is included, and that on a cold start, the heat source is switched on particularly at an engine temperature below 30° C. and remains at least temporarily switched on for longer than at least 5 minutes and remains switched on particularly at a coolant temperature from above 80° C. and that further on a warm start, the heat source is switched on particularly at a coolant temperature from above 80° C., wherein preferably the heat source is respectively switched on and switched off at least once within a combustion cycle, wherein particularly the heat source is switched on particularly in the power stroke and is switched off after the power stroke. This proposed advancement can also be implemented independent of the abovementioned features according to the invention to achieve an advantageous effect.

The advantageous advancement proposes that the glow plug is not switched off after a time or after exceeding a coolant temperature, since that could be considered as switch-off device according to the statutes. A shut-down could occur in situations that would otherwise lead to damaging the glow plug, e.g. on exceeding a maximum allowable temperature of the glow plug itself. However, the prior art is that the glow power is automatically reduced shortly after the cold start, for avoiding an overheating of the glow plug, but still continues to work with this reduced heating power up to 3 minutes. In modern diesel engines, the compression ratio is reduced for reducing NOx emissions. As a result, the cold start capability is deteriorated, during warm-up, there is increased formation of particles and the smoothness is deteriorated. For avoiding these problems, glow plugs are used, which are provided with a voltage until a certain time has elapsed, typically of 3 minutes or until reaching a certain coolant temperature of typically approx. 70° C., so that a temperature of up to over 1000° C. can be adjusted at the tip of the glow plug. The disadvantage with this is that the positive effect of the glow plugs in the warm start is not used for reducing emissions. However, it is known that diesel engines in the warm-start test can cause more than twice as high NOx emissions than in the cold-start test (Weiss et al., 'A complimentary emissions test for light duty vehicles: Assessing the technical feasibility of candidate procedures'), JRC Scientific and Policy Report EUR 25572 EN, 2013). At first glance, increasing the combustion chamber temperature for reducing NOx seems contradictory, since higher combustion chamber temperatures favour NOx formation. However, a similar contradiction also applies for reducing the compression ratio, which can be expected to increase the fuel consumption. However, the fuel consumption of modern diesel engines has been reduced simultaneously with reduced compression ratio, e.g. by intelligent tuning of the injection processes. By a skillful adjustment of the injection process in combination with the activation of glow plugs in the warm start can reduce both particulate emissions and NOx formation, since NOx emissions depend primarily on the maximum combustion chamber temperature, and not on the average combustion chamber temperature during the power stroke. The maximum combustion chamber temperature can be reduced, when the combustion is initially delayed, e.g. by a delayed start of injection or by reducing the injection quantity before reaching the maximum combustion chamber temperature. Without activation of the glow plug, this would significantly slow down the combustion process and increase the fuel consumption and particulate emissions. The high temperature of the glow plug, which is mostly higher than the average combustion chamber temperature during the power stroke at the low engine loads prevailing in exhaust gas tests, therefore accelerates the combustion process, so that it must not result in an increase in fuel consumption and particulate emissions.

It is particularly advantageous, when the glow plugs are activated cyclically, and e.g. switched on only during the power stroke. This reduces NOx emissions and avoids the energy requirement for operating the glow plugs in the remainder of the work cycle, whereby the fuel consumption is also reduced. This proposed advancement can also be implemented independent of the abovementioned features according to the invention to achieve an advantageous effect.

In an advantageous advancement of the system, it is proposed that an outer wall of the highly insulated oil heat accumulator is at least partially configured by a part of an oil sump, particularly the oil sump itself, and the outer wall of the highly insulated oil heat accumulator is at least partially made of plastic. This proposed advancement can also be implemented independent of the abovementioned inventive features to achieve an advantageous effect.

Highly insulated heat accumulators are quite expensive to manufacture, so that the additional costs are redeemed only after quite a long period of operation. The main components consist of the outer housing, inner housing, and connection pipes and inner guide walls or the like. By integrating the outer housing with the oil sump, the production costs can be significantly reduced.

In an advantageous advancement of the system, it is proposed that the fluid chamber is configured as a crankcase chamber separated from a piston respect to the combustion chamber of the cylinder, and preferably the coolant is engine oil, and further preferably the first valve is a pressure relief valve for controlling the coolant flow through the fluid chamber, wherein the opening and closing of the pressure relief valve is done by controlling the oil pressure, particularly by controlling the oil pump.

Thus, a controlled piston spray cooling is proposed: In highly loaded turbocharged engines, mostly the piston spray cooling is used, in which the engine oil is sprayed on the piston via spray nozzles which are disposed, e.g. in the connecting rod or in the oil gallery, and optionally also sprayed on the cylinder bore. These piston spray nozzles are either permanently open, e.g. when it concerns simple holes in the connecting rod, or these are controlled by a pressure relief valve, so that the nozzles are opened only starting from a certain engine speed. This has the disadvantage that the pistons are cooled too much at low engine load and an optimized control is not possible depending on the oil temperature of the spray oil supplied. In multi-cylinder engines, it is difficult to control the opening of each individual piston nozzle. Either one valve per cylinder is required which is expensive and difficult to accommodate, or a separate distribution line is required, e.g. as additional oil gallery which is drilled in the crankcase or mounted as additional distribution pipe. Such solutions are known, however this only cuts off the oil flow rate through the cooling nozzles for reducing the fuel consumption, e.g. during the operating conditions that prevail during an exhaust gas test, e.g. at engine loads maximum up to 70% and at speeds maximum up to 50% of the maximum engine speed. The shutting off of the piston spray nozzles has the disadvantage that this can increase NOx emissions. The increase in oil flow rate through the oil spray nozzles with hot oil which is hotter than the crankcase or the piston, is not known until now and therefore inventive. By increasing the oil flow rate through the oil spray nozzles with hot oil, the wall heat loss in the piston is reduced particularly in the warm-up, just as the emissions of HC, CO and particles are reduced. This proposed advancement can also be implemented independent of the abovementioned features according to the invention to achieve an advantageous effect.

By controlling the opening of the nozzles by varying the oil pressure, the oil spray nozzles can still be mounted in the existing oil gallery as before. Furthermore, regulated oil pumps are already very widespread anyway, so that the control valve required for controlling the oil pressure can already be present. Therefore, only a new control strategy is required, the structural changes can be kept within limits.

Water injection is known as a means for increasing the engine power and reducing NOx emissions. The disadvantage is that a large water reserve must be carried in the vehicle and by water injection, a portion of the intake air is displaced, whereby the volumetric efficiency is lower than in the same reduced intake air temperature, however without water injection. It is known to recover the required water from the condenser of the air conditioning. However, this requires the energy-intensive operation of an air conditioner. Of course, such water injection systems are very complex and expensive, since in addition to the tank, a delivery pump, injection valves and lines are needed, all of which must all be constructed frost-proof.

In an advantageous advancement of the system, it is proposed that an exhaust gas recirculation cooler and a tapping point of the exhaust gas recirculation in the exhaust gas passage of the cylinder head, are disposed above the lower edge of at least one exhaust gas outlet valve of the combustion chamber, wherein at least a part of the exhaust gas passage of the exhaust gas recirculation tapping point and the exhaust gas recirculation line between the tapping point in the exhaust gas duct passage of the cylinder head and the exhaust gas recirculation cooler, have a slope in the direction of the exhaust gas outlet valve, so that coolant condensate can return from the exhaust gas recirculation cooler to the exhaust gas outlet valve, and that preferably the exhaust gas recirculation cooler is operated by coolant lines with a coolant at a temperature of at least temporarily below 70° C. for promoting the formation of the coolant condensate in the exhaust gas recirculation cooler, and that particularly the amount of coolant condensate supplied to the combustion chamber during the valve overlap phase can be adjusted by controlling the temperature of the coolant flowing through the coolant lines of the exhaust gas recirculation cooler (260). This proposed advancement can also be implemented independent of the abovementioned features according to the invention to achieve an advantageous effect.

The exhaust gas outlet valve usually consists of a valve actuator, a shaft and optionally a sodium filling. The cylinder head also houses the exhaust gas outlet valve.

Exhaust gas recirculation coolers are introduced particularly in diesel engines for reducing NOx emissions. These exhaust gas recirculation coolers have the disadvantage that they can be easily polluted, e.g. by deposition of soot particles and/or soot. Therefore, they are often shut-off depending on the operating point, e.g. when the coolant is below a certain limiting temperature. This is referred to as a so-called thermal window, wherein some vehicle manufacturers already switch-off the AGR cooler at ambient temperatures below 10° C. or even below 17° C. to protect the engine. At the usual temperatures in Germany, this can lead to NOx reduction by AGR cooler being shut-off for more days than being active.

The exhaust gas valves are one of the hottest components of a combustion chamber in warmed-up engine and are essentially responsible for generating NOx emissions. Therefore, for improved cooling in some engines, e.g. sodium is added into the shaft, which reduces the formation of NOx emissions. However, this is complex and often insufficient to reduce NOx. These disadvantages can be avoided by disposing an exhaust gas recirculation cooler above the lower edge of an exhaust gas valve. As a result, condensation water, which is formed in the exhaust gas recirculation cooler, passes to exhaust gas valve. Thereby, the outlet valve is cooled by evaporation of the condensed water, particularly during the intake stroke, compression stroke and power stroke. Due to the slope of the exhaust gas ducts of the exhaust gas recirculation cooler, sooting of the exhaust gas recirculation cooler is avoided, since the soot particles are washed off with the condensate from the walls of the exhaust gas recirculation cooler, particularly when the exhaust gas ducts of the exhaust gas recirculation cooler are configured with maximum slopes vertically.

During the valve overlap phase, there is usually a brief backflow of exhaust gas into the combustion chamber. In this phase, thus water flowing down from the exhaust gas recirculation cooler can also be sucked into the combustion chamber. Thus, a similar effect as in a water injection can be achieved, however without any additional effort, since exhaust gas recirculation coolers are already standard in many engines. By the cyclic backflow of the condensed water in the direction of the outlet valve, the water concentration continuously rises there. For avoiding an excessive water concentration, it may prove useful to at least temporarily increase the coolant temperature in the exhaust gas recirculation cooler, so as to restrict the amount of water entering the combustion chamber during the valve overlap.

By the described means, it is thus possible to reduce NOx emissions and to increase engine power with minimum expenditure, without additional water injection valves, pumps, tank and lines, etc.

When the exhaust gas is removed after a catalytic converter, where it is already cleaner and can pollute EGR cooler less, it is also conceivable to collect the condensed water after EGR cooler and supply it to a storage tank, so that at least no air conditioning system must be operated for obtaining water to be injected into the intake manifold or into the combustion chamber. If the mounting of an EGR cooler over the outlet duct is structurally difficult to accommodate, obviously the solution with a storage tank can be resorted to and to inject water by means of pumps and injectors directly into the exhaust gas duct, preferably on one or more exhaust gas valves. As a result, the volumetric efficiency and thus engine power can also be further increased as compared to the water injection into the intake manifold or combustion chamber and NOx emissions are reduced. A solution without AGR cooler is also possible, in which the condensed water is collected at the end of the exhaust, particularly during warm-up and supplied to a water tank. If this amount of water is not sufficient, particularly at the end of the exhaust, an exhaust gas heat exchanger can be used, which is cooled by coolant, so that water in the exhaust condenses. Even without an exhaust gas heat exchanger, water in the exhaust gas can be condensed, when at least a partial exhaust gas flow is taken from the exhaust and is cooled via other tubes coming in contact with cool air, e.g. which can also communicate with parts of the body.

In exhaust gas valves filled with sodium, the cavity is limited in length, so that the valve stem region that moves across the valve stem gasket, is not hollow, since otherwise the sealing lip of the valve stem gasket would become too hot and would be damaged.

Furthermore, the application of sodium cooled valves on the intake side of diesel engines is not known, because the intake valves are much colder than the exhaust gas valves. For reducing NOx emissions, however, the cooling of the inlet valves by a cavity partially filled with sodium makes sense, particularly in diesel engines, particularly in truck engines, marine engines, etc., which are often operated at full load or maximum torque or maximum power. Since sodium melts only at approx. 97° C., the problem with low engine loads is that the sodium in the intake valve stem does not melt completely and therefore cannot be used for heat exchange with the cylinder head valve guide.

This problem is solved, when the inlet valves, and optionally also the outlet valves in the hollow shaft region are partly filled with potassium or a mixture of sodium and potassium or another mixture of an alkali metal with at least another metal, instead of sodium. Potassium has a lower melting point at about 63° C. than sodium. By mixing potassium and sodium, the melting temperature can even be lowered down to −11° C. Thereby, the cooling effect by the shaker effect, in which the liquid metal filling in the valve stem between the valve disc and the upper end of the valve which is in contact with the valve stem guide, is flung back and forth and thus dissipates heat from the valve disc to the valve guide. This proposed advancement can also be implemented independent of the abovementioned features according to the invention to achieve an advantageous effect.

By this measure, NOx emissions can be further reduced. Furthermore, this can also guide the valve stem cavity, up to the region of the valve stem gasket without damaging the sealing lip of the valve stem gasket.

The same applies to the cooling of the outlet valve with condensed water, thereby likewise the valve stem cavity can be guided up to the region of the valve stem gasket, whereby the cooling is improved.

Exhaust gas duct in liner: Exhaust gas heat exchangers are known for quick heating, which transfers otherwise lost exhaust gas heat to the coolant, engine oil or gear oil. These exhaust gas heat exchangers are very complex and expensive and difficult to accommodate. Because of the aggressiveness of the exhaust gas and the high thermal load, these exhaust gas heat exchangers are also quite susceptible to corrosion, such that a short lifespan is expected as compared to other components such as cylinder block. When an adjustable exhaust gas duct is integrated in the cylinder liner, these disadvantages are eliminated, so that the advantages of quick warming up can be realized economically even in smaller vehicles such as two-wheelers, particularly scooters. This proposed advancement can also be implemented independent of the abovementioned features according to the invention to achieve an advantageous effect.

In an advantageous advancement of the thermal management system, the internal combustion engine may comprise at least one controllable exhaust gas throttle valve, and the opening cross-section of the exhaust gas throttle valve at constant position of the engine load-setting unit at a speed of 50% of the rated speed of the minimum opening cross-section of the exhaust gas throttle valve is maintained within a tolerance of maximum 20% of the minimum opening cross-section at increasing speed above the engine speed of at least 50% of the rated speed, and/or at a constant speed and increasing engine load within a load range between 50% to 75% of the maximum engine load, the respective speed is maintained within a tolerance of maximum 20% of the minimum opening cross-section. This proposed advancement can also be implemented independent of the abovementioned features according to the invention to achieve an advantageous effect.

NOx emissions are reduced by the appropriate configuration and the risk that the exhaust gas throttle valve could be interpreted as a shut-off device, is minimized. Further advantageous embodiments can be as follows:

Maximum load determination: At the same engine load, the engine power and thus the component temperatures also increase with increasing engine speed, so that the transition from the consumption saving effect to the increase in consumption is shifted towards lower engine loads. In cold start, this transition is shifted to larger engine loads. The determination of a maximum load can be advantageous, wherein a temperature reduction occurs on exceeding this maximum load and a temperature increase occurs on falling short of this maximum load. This maximum load is varied as a function of the engine speed and/or engine temperature and/or temperature difference of the cooling liquid temperature and the partially gas-filled fluid chamber temperature, particularly it is advantageous that the maximum load is reduced with increasing engine speed and/or is increased with decreasing engine temperature and the maximum load of at least one critical maximum temperature is a function of at least one of the system components. Such maximum loads can be defined for various components, particularly for cylinder head, cylinder and piston.

Heat accumulator integration: Advantageously, at least one heat accumulator can be integrated with at least a fourth shut-off valve, wherein the hot coolant is conducted from the heat accumulator into the engine by opening the fourth shut-off valve, as soon as the engine is operated and a temperature limit 1 of the engine is exceeded, and the supply of the hot coolant from the heat accumulator to the engine is interrupted by closing the fourth shut-off valve, as soon as a temperature limit 2 of the engine (or the engine outlet temperature of the coolant) (or temperature difference with respect to the outlet temperature of the heat accumulator) is exceeded.

Oil cooler control: The use of oil coolers for heating engine of oil has the disadvantage that engine oil is cooled by the coolant as soon as the engine oil is hotter than the coolant. As a result, the friction cannot be optimally reduced, and particularly the heat loss in the piston is increased. The control of an oil bypass in the oil cooler allows an optimization of the oil temperature, particularly even depending on the respective engine operating point, such as the engine load, speed and temperature. As long as the catalytic converter is not yet at operating temperature, usually the engine speed is raised in idling, so that larger exhaust heat flow results. In this operating condition, it makes sense not to warm up the engine oil yet, and to continue to store available heat in the heat accumulator, until the catalytic converter is at operating temperature.

Advantageously, an oil cooler can be disposed in the cooling system, particularly between the outlet duct of the fluid chamber and the first shut-off valve and/or the pressure surge tank, wherein the oil cooler is provided with a bypass, particularly on the oil side, so that on heating, hot coolant heats the engine oil and the oil bypass is opened as soon as the oil temperature is greater than the coolant temperature, and on cooling the oil, the oil bypass is closed as soon as the oil temperature is greater than the coolant temperature, and the oil bypass is open, particularly during a cold start, until the light-off temperature of the catalytic converter is reached. This proposed advancement can also be implemented independent of the abovementioned features according to the invention to achieve an advantageous effect.

Advantageously, the oil gallery can be provided with an inner insulation and/or an exhaust gas heat exchanger can be integrated.

Oil gallery interior insulation without switching a heat source: Warmed engine oil usually cools down during cold start, when it flows through the oil gallery of the cold engine block. This cooling is avoided by the inner insulation of the oil gallery. Likewise, when oil cooling is required, the heating of cooled oil is avoided, which otherwise, particularly at high engine speeds, is due to the heat generated by friction in the crankshaft bearings and which is dissipated to the crankcase.

A corresponding inner insulation is known from WO2014128308A1. However, the disadvantage here is that a heat source must be shuts off, or at least reduced in the heating effect thereof. This additional effect can be avoided while an oil cooler is disposed before the oil gallery, through which coolant is passed in particular. During cold start, the coolant is heated up much quicker than oil, since the cooling jacket is disposed much closer to the combustion chamber than oil sump and most of oil ducts. After operating for a certain time, particularly at high speeds and engine loads, the oil temperature usually rises above the cooling temperature, whereby a shutdown of the oil cooler as a heat source is not required. Another advantage of this embodiment is that the engine during disassembly, e.g. for changing the piston or bearing shells, can be easily provided with the inner insulation, without having to attach a switching mechanism for the oil cooler.

An alternative embodiment is when the oil is directed from the oil pump first into the oil gallery of the cylinder head rather than into an oil cooler, and from there into the cylinder block which is fitted with an inner insulation of the oil gallery. The cylinder head is heated up much quicker than the cylinder block, so that the oil is heated up very quickly, similar as by using an oil cooler. A shutdown of the cylinder head as heat source is not required here also, since particularly at high speeds and engine loads, oil is hotter than coolant and thus oil is cooled by the coolant. This proposed advancement can also be implemented independent of the abovementioned features according to the invention to achieve an advantageous effect.

Air gap inner insulation: Conventional inner insulations have the disadvantage that for sufficient insulating effect, the insulating layer requires a certain thickness, which is not available in the existing space. Furthermore, a large insulating layer thickness requires high material requirement and costs. A gas space between the inner insulation and the structural environment results in a significantly higher insulation effect with the same space requirement, since gases, particularly air, have a greater insulation effect than solid substances. With a lower volume specific heat capacity, even lesser energy is required for heating, and by using air as an insulating gas, the material requirement for the inner liner is minimized. This proposed advancement can also be implemented independent of the abovementioned features according to the invention to achieve an advantageous effect.

Pressure loss minimizing chamfers: Drilled lines such as oil galleries in internal combustion engines have the disadvantage that the branches form sharp edges by meeting cylindrical holes, the branches form sharp edges that cause a large pressure loss, so that a high pumping power is required. An inner insulation, e.g. which is made of plastic, and is chamfered in the region of the branches, has significantly lower pressure loss. The drag coefficient can be more than halved by such chamfers, particularly when these are configured with a radius. A typical four-cylinder engine with two camshafts has about 40 such sharp-edged branches. Therefore, the pressure loss of such system is determined more by the branches than by the line diameter. By a corresponding rounding of these branches, the pump power can thus be significantly reduced. Such insulation and reduction of the pressure loss can also be achieved by a double-walled air gap insulation, e.g. from two metal pipes, one inside the other. Advantageously, at least one fluid line, which is structurally integrated in a metallic structural environment of a housing, can be insulated inwardly by an inner insulation, wherein at least one gas space is formed between the inner insulation and the structural environment of the housing, and the gas space is sealed with respect to the coolant fluid.

Advantageously, the inner insulation can be chamfered on the inside in the region of at least one branch, wherein the cross-section of at least one branched line is reduced downstream, at least in a partial region.

Advantageously, at least one fluid line in contact with the bearing shells can be chamfered inside, wherein the cross-section of at least one fluid line is increased downstream at least in a partial region and the width of which is smaller than the width of the oil hole of the bearing shell in contact therewith.

These aforementioned advancements can also be implemented independent of the aforementioned inventive features to achieve an advantageous effect.

Advantageously, the evacuation of the cooling liquid can be achieved by changing the coolant volume during cooling, wherein an electric pump can be dispensed with.

Discharge by reducing density: The use of an electric pump for draining the coolant is associated with higher costs, so that automatic draining by the cooling liquid volume reduction during cooling is advantageous. A disadvantage of draining by means of the coolant volume reduction during cooling is that this method cannot be used during engine warming operation. Here, the coolant draining by gravity, particularly in case of oil is advantageous. This is even possible without electrically operated valves, e.g. when the valve is directly or indirectly actuated by the accelerator pedal or in case of a two-wheeler by the throttle grip.

Bearing shell adjustment: The oil hole of bearing shells, particularly for crankshafts and connecting rod bearings usually have an opening width which is smaller than the diameter of the oil feeding line. This results in a high throttle loss and the risk of cavitation on the sliding surface of the bearing shell. The large diameter of the oil feeding line is due to the requirement for a low flow resistance of the long line, and due to manufacturing reasons, since long holes with thin diameter are more difficult to manufacture with high accuracy than with large diameter, and because the drills have to be changed more often in smaller diameters. By chamfering the oil line with an opening width which is smaller than the width of the opening of the bearing shell, this pressure loss can be reduced, and the risk of cavitation is also reduced. This proposed advancement can also be implemented independent of the abovementioned features according to the invention to achieve an advantageous effect.

Advantageously, the system may include a heat accumulator having two separate chambers, wherein one chamber is filled with engine oil and the other chamber is filled with high temperature coolant, so that at least in some operating conditions, a common operating temperature of at least above 115° C. is achieved within the heat accumulator, wherein preferably the heat accumulator is integrated in the oil sump.

Combined heat accumulators: Combined heat accumulators are known for storing hot coolant and hot oil. The disadvantage of this is that the maximum operating temperature of the heat accumulator depends on the maximum operating temperature of the liquid having the lowest maximum operating temperature, in this case the coolant, which is typically limited to below 105° C. After a cooling phase overnight, this temperature in the accumulator is reduced by approx. 10° C. depending on the insulation. Based on a typical cold start temperature of 25° C., this means a maximum temperature difference of 70° C. But the engine oil could be operated at 140° C., which is also possible with a high-temperature coolant. This results in a temperature difference of 105° C. at the cold start, which means that the heat storage capacity is 50% higher with the same volume and weight, or that with the same storage capacity, the volume and weight and thus the costs are also greatly reduced. With integration in the oil sump, an additional space otherwise required is eliminated, because a large amount of oil is stored there anyway.

Advantageously, a switchable connection is made between exhaust system and engine cooling jacket, so that at least in the cold start, hot exhaust gas is passed through the emptied engine cooling jacket, and this connection is closed at least at full load.

Connection between exhaust gas and cooling jacket: Disadvantages of exhaust gas heat exchangers have already been described. When the exhaust gas is passed, at least in the cold start, directly through the cooling jacket emptied of the coolant, the expenditure and mounting space for a complex exhaust gas heat exchanger is eliminated. The exhaust gas is cooled in the cooling jacket and e.g. can be passed through the line to the surge tank, where it can then escape through the pressure relief valve.

Advantageously, the coolant is pumped only from the cooling jacket shortly before the start of the engine, wherein the immediately expected start of the engine is reported particularly by the opening of the driver's door or by other signals of the engine control.

Coolant evacuation just before start: If the coolant were to be exhausted directly after stopping the engine, the water jacket would be in contact with air for several hours each day and would no longer be protected from corrosion by the coolant. This could thus very quickly cause damages due to corrosion in the water jacket. This is avoided, when the coolant is pumped out just shortly before the engine is started.

Calculation process for determining the effectiveness of emission reducing devices: Most of the above-described measures are aimed particularly at reducing NOx emissions, fuel consumption and $CO_2$ emissions. Often, there is a conflict of objects with other vehicle attributes, particularly other limited emissions such as particle mass, particle number, HC and CO. By law, shut-off devices that reduce the effectiveness of emission reducing devices are banned with a few exceptions. However, in the relevant legislative texts, there is no reference as to how the effectiveness of emission reducing devices should be determined. In order to be able to avoid such shut-off devices already in the development process for new products, the urgent need is derived for a calculation process for determining the effectiveness of emission-reducing devices.

An often used, trivial method particularly in the media, consists of an exhaust gas component, particularly NOx emissions (e.g. measured in g/km) which is measured during real driving, to be considered in relation to the statutory limiting value or the emissions, which were determined in the certification test. If the ratio is greater than one (when the emissions measured during real driving are higher than the reference value of the statutory limiting value or the certification result), it is considered that the effectiveness of the emission reducing devices is reduced. This trivial process has two serious disadvantages. Firstly, only an exhaust gas component is considered without assessing the effect of the same emission reducing device on the other statutorily restricted exhaust gas components. Secondly, there is a linguistic problem. The effectiveness is generally considered good or advantageous when it is high. Therefore, even the value determined by calculation process, which should represent a measure of this effectiveness, must also be higher than a value for inferior or lower effectiveness.

This problem is solved in the simplest way, in which instead dividing the reference value of the statutory limiting value or the certification result by the current measured or otherwise determined value of the exhaust gas component to be considered. If the value to be assessed in terms of effectiveness is smaller than the reference value, then the effectiveness is greater than one. The lower the current value of the exhaust gas component, e.g. in real trips, the higher the effectiveness.

The other problem is solved by calculating the individual effectiveness for each statutorily restricted exhaust gas component according to the method just described and then calculating the mean value of the effectivenesses of all the individual components. This proposed advancement can also be implemented independent of the abovementioned features according to the invention to achieve an advantageous effect.

The described process makes it easy to determine, on the basis of available measured values or measured values to be generated, whether the effectiveness of emission-reducing devices is reduced by certain adjustments, particularly of the engine control, so that the adjustments can be corrected for avoiding a potential shut-off device. Therefore, the method is primarily suitable for testing vehicles on test benches, particularly exhaust gas roller test benches and real trips on the road, e.g. with the application of portable emission measurement systems (PEMS).

The process is also suitable particularly for tuning of engine control, particularly characteristic diagrams, on test benches. An application for regulating the powertrain control in vehicle operation is also conceivable. Some engines regulate e.g. by means of measuring the pressure curve in the combustion chamber, the centre of combustion, so that $CO_2$ emissions are minimized. Thus, the potential effects on the pollutant emissions, particularly NOx are not taken into account and the effectiveness of the exhaust aftertreatment is relied upon for reducing NOx emissions. Instead of or in addition to minimizing $CO_2$ emissions, it would make sense to regulate the combustion centre, such that the effectiveness of emission-reducing devices is not reduced, and particularly the effectiveness of NOx reduction is increased at least with respect to a statutory limit. In the alternative, the minimization of $CO_2$ emissions may occur. Such a process would be easily implementable in vehicles that are anyway equipped with sensors for measuring exhaust emissions, particularly NOx sensors, such as trucks.

Another option to determine the effectiveness of emission reducing devices consists of considering the health costs of each individual exhaust gas component, particularly the statutorily restricted exhaust gas components. Thus, for each exhaust gas component, first the difference of their emissions (e.g. measured in grams per kilometre) from a reference value (e.g. a statutory limit) would be generated. For example, the measured exhaust gas value to be considered could be subtracted from the statutory limit. This difference would then be multiplied to the specific health care costs (e.g. in Euro per gram) for the respective exhaust gas component and then the sum of these products for all exhaust gas components are calculated. If the sum value is positive, then it concerns a saving on health care costs. The higher the saving in health care costs, the greater the effectiveness of emission reducing devices. If, instead of a saving, a negative value for the health costs results, then the effectiveness of the emission reducing devices is effectively reduced. Since the health costs per kilometre covered are very low, it seems reasonable to multiply these by an average kilometrage to be expected during a vehicle's lifespan. The advantage of this method is that it enables to holistically consider the effects of a vehicle with an internal combustion engine on human health and the possible resulting costs, and to optimize the effectiveness of the emission reducing devices of a vehicle such that the health consequences are minimized.

Similar to the above-described first variant of this method, obviously it also makes sense to use the second variant just described for optimizing engines on test benches and for use in the vehicle. This proposed advancement can also be implemented independent of the abovementioned features according to the invention to achieve an advantageous effect.

Cylinder Shut-off: The shutting off of one or more cylinders is a known means for reducing fuel consumption, particularly by reducing wall heat losses and in gasoline engines also by reducing throttle losses. With the cylinders deactivated, the intake and exhaust gas valves are shut-off and the fuel supply is interrupted. Although the interruption of fuel supply can be very easily realized by engine control, the systems for shutting off the valves are very complex and therefore expensive. Another disadvantage is the increase in NOx emissions by the higher load of active cylinders. Purely electronic shut-off by interrupting fuel injection has the disadvantage that the deactivated cylinders pump cold air into the exhaust system. This significantly reduces the conversion of NOx emissions in three-way catalytic converters.

In an advantageous advancement of the method, it is proposed to shut-off at least one cylinder by shutting off the fuel supply in part-load operation, particularly below 75% of the full load. In gasoline engines, the exhaust gas system therefor has at least two three-way catalytic converters, wherein the first three-way catalytic converter is disposed downstream of at least one active cylinder and not downstream at least one deactivatable cylinder and the second three-way catalytic converter is disposed downstream the first three-way catalytic converter and downstream at least one deactivatable cylinder. Thus, it is advantageous when the volume difference of the two catalytic converters is less than 50%. In an advantageous embodiment, in operation with cylinder deactivation, at least one active cylinder is operated with a rich mixture having a combustion air ratio of less than 1.

In operation with cylinder deactivation, the first three-way catalytic converter can thus be operated without excess air, wherein particularly NOx is excellently reduced. In the second three-way catalytic converter, particularly CO and HC emissions are reduced by the supply of air from at least one deactivated cylinder. Thereby, the second three-way catalytic converter is maintained at operating temperature, first by the hot exhaust gases from at least one active cylinder, second by the catalytic reaction in the first catalytic converter and third by the endothermic reaction in the second catalytic converter itself.

This proposed advancement can also be implemented independent of the abovementioned features according to the invention to achieve an advantageous effect.

DRAWINGS

Further advantages result from the present description of drawings. In the drawings, embodiments of the invention are shown. The drawing, description and claims contain numerous features in combination. The person skilled in the art will also consider appropriately the features individually and combine them into further meaningful combinations.

Shown are:

FIG. 1 schematically shows a first exemplary embodiment of the thermal management system;

FIG. 2 shows a variant of the exemplary embodiment shown in FIG. 1;

FIG. 3 schematically shows another exemplary embodiment of the thermal management system;

FIGS. 4a-4c show variants of the exemplary embodiment shown in FIG. 3;

FIG. 5 schematically shows another exemplary embodiment of the thermal management system;

FIG. 6 schematically shows a piston for use in an exemplary embodiment of the thermal management system;

Figure 9:
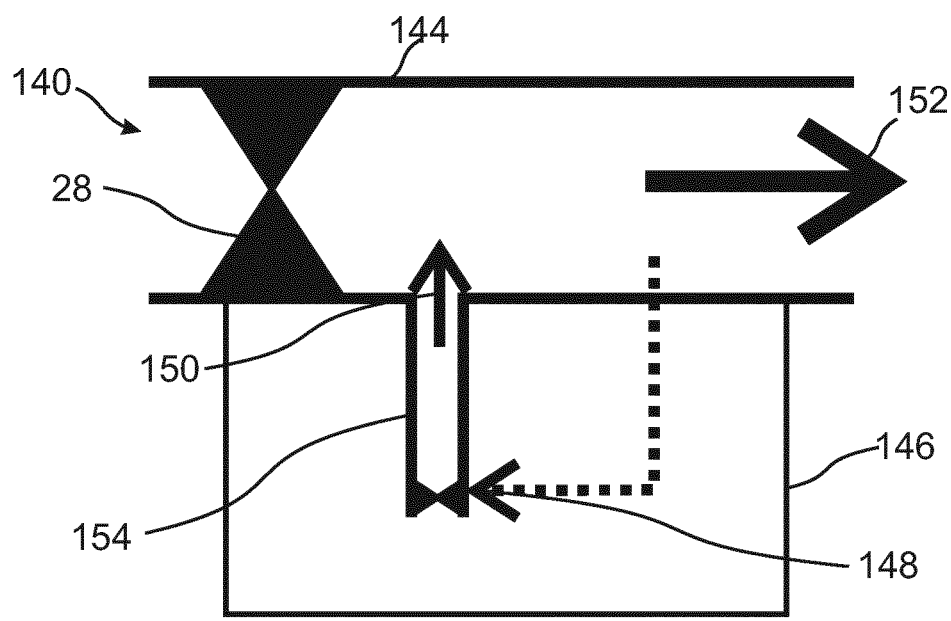
Figure 10:
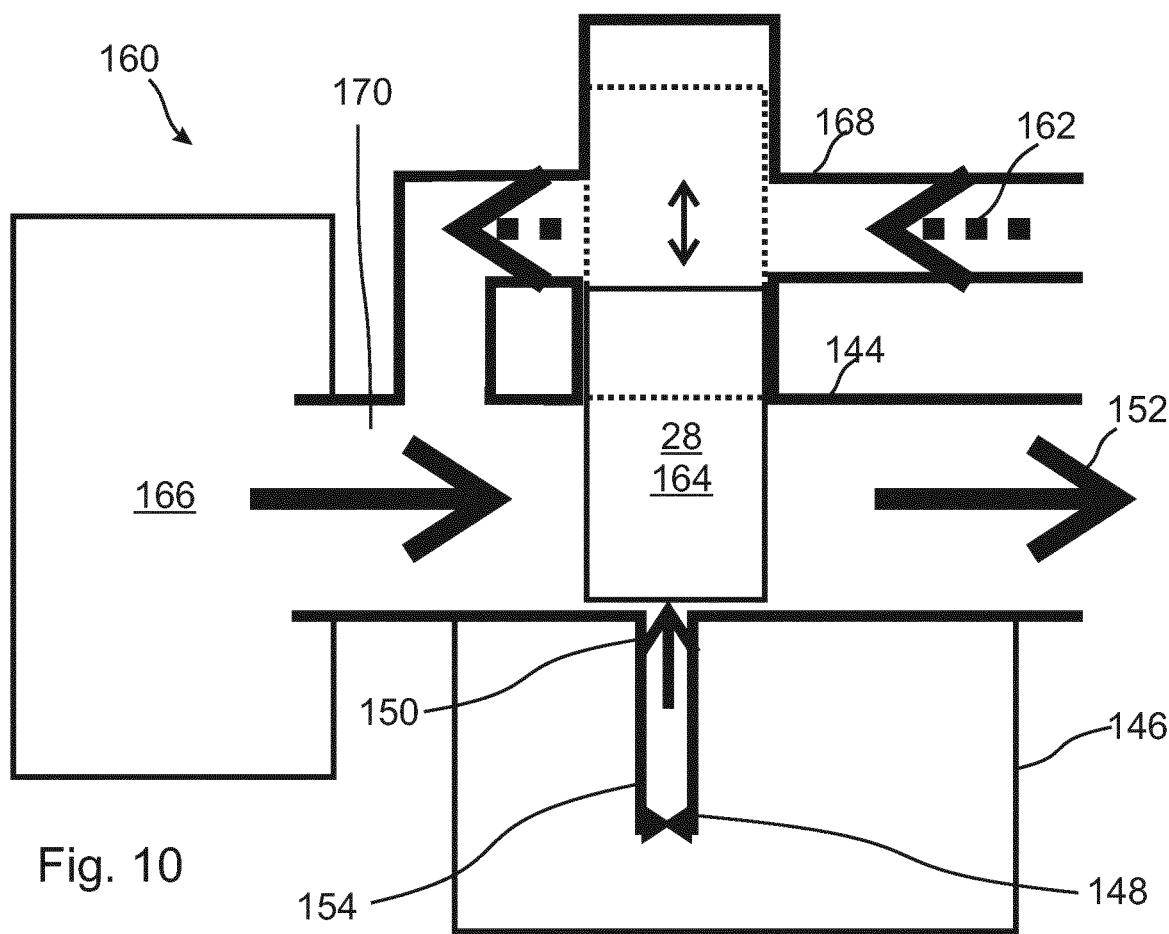
Figure 11:
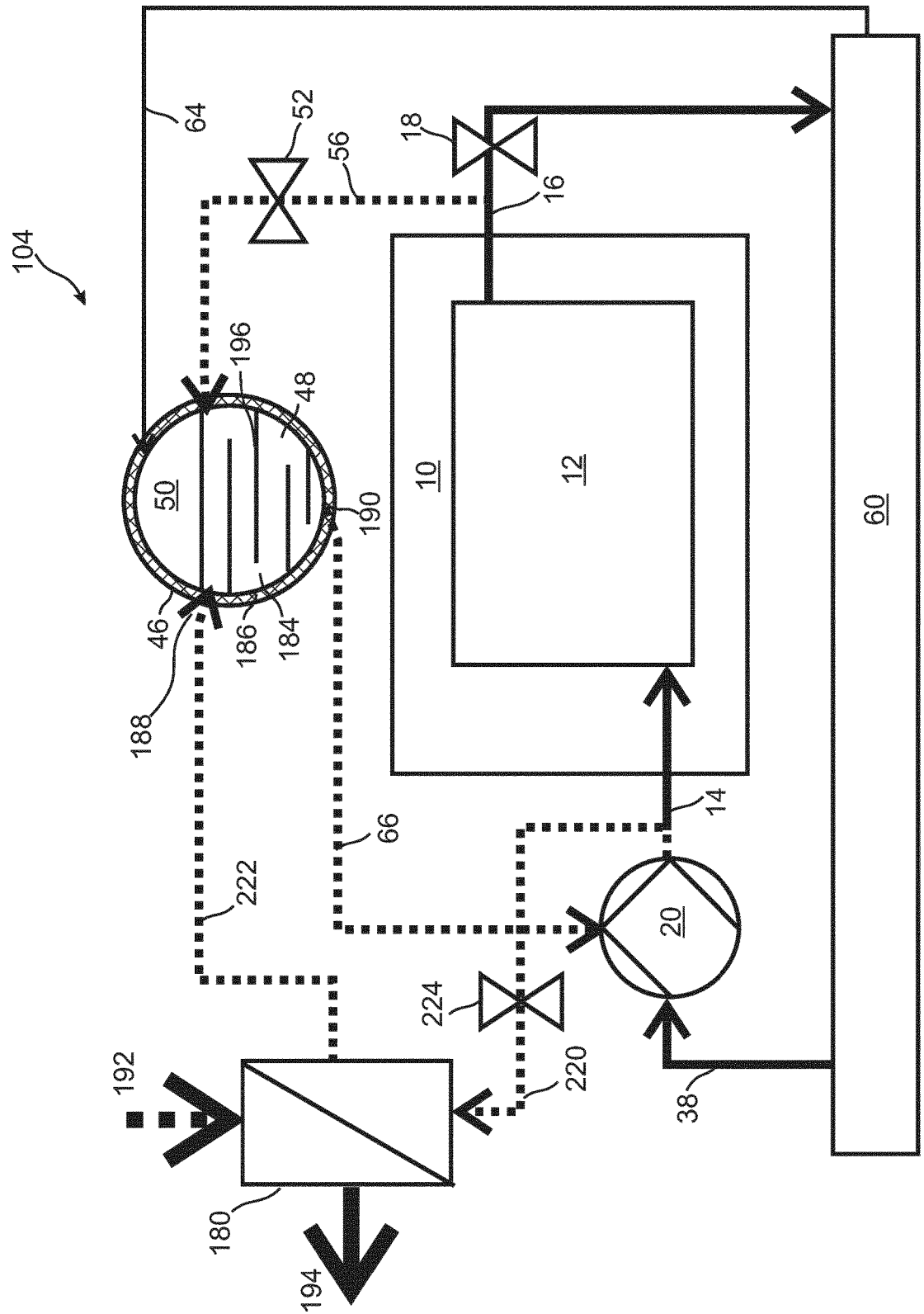
Figure 12B:
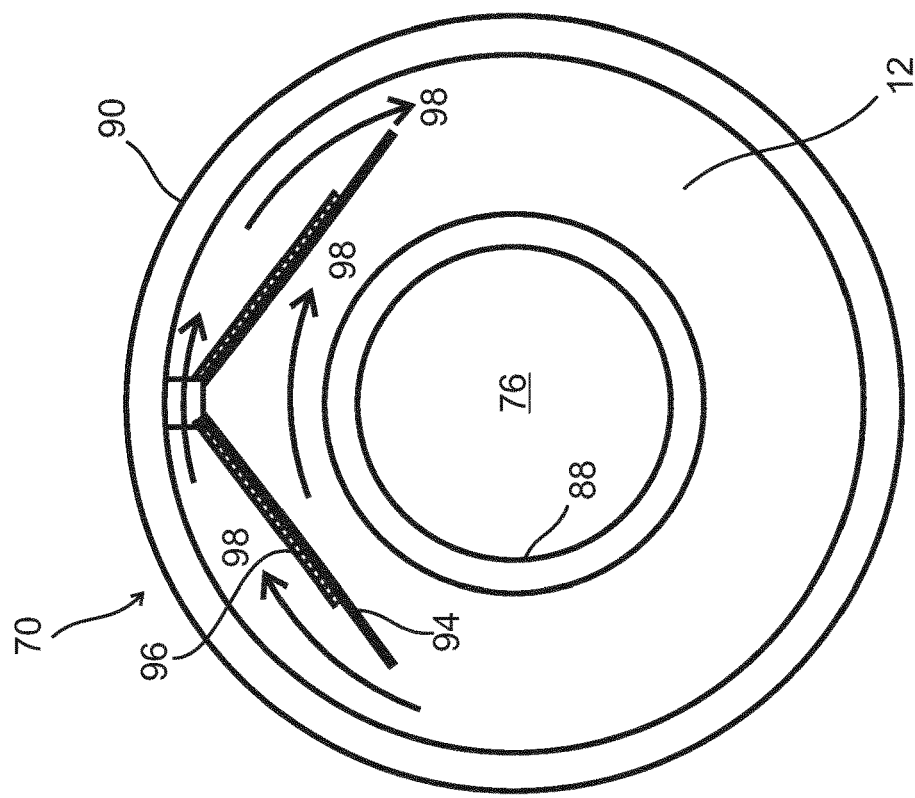
Figure 12A:
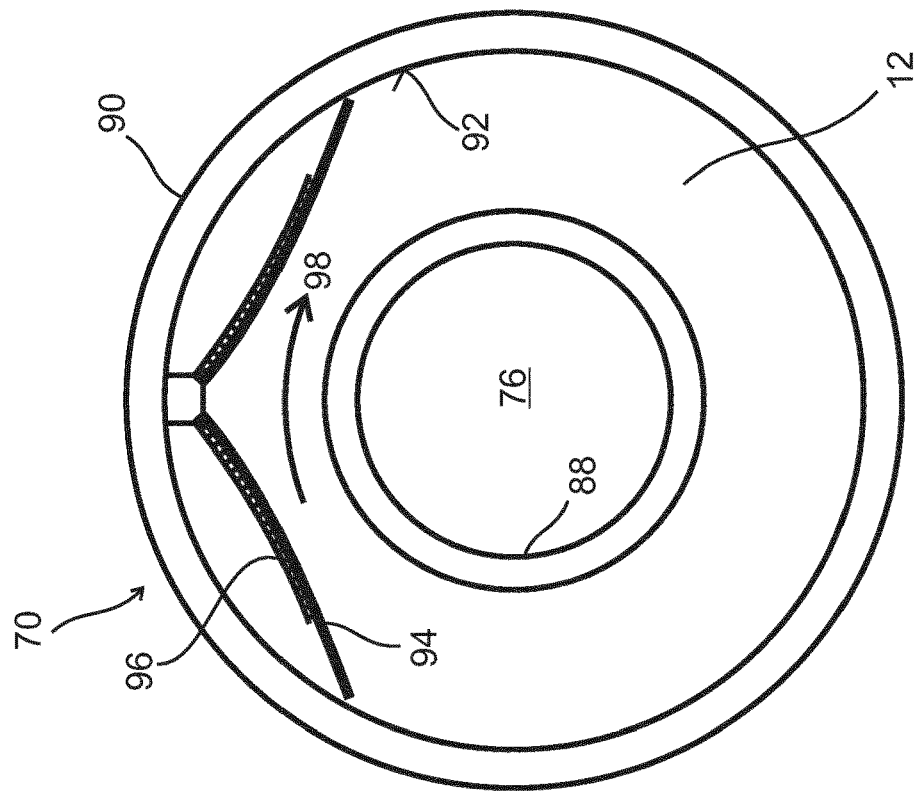
Figure 13A:
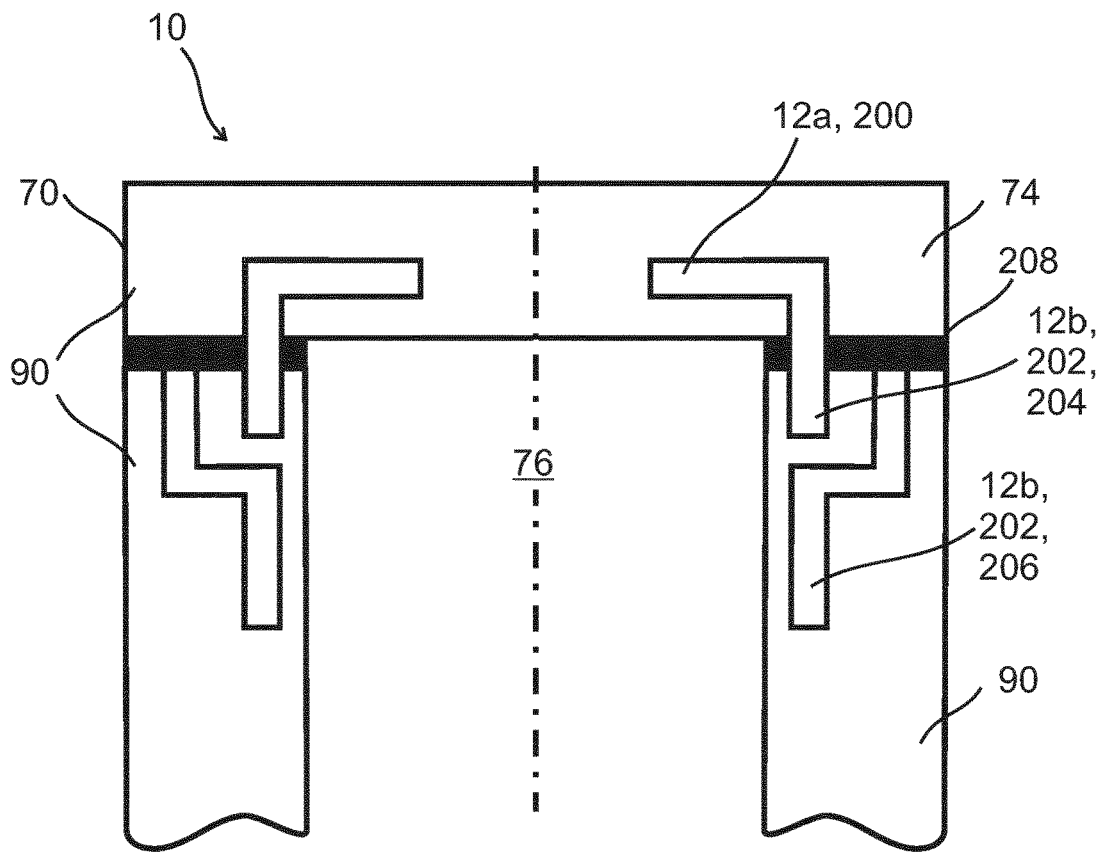
Figure 13B:
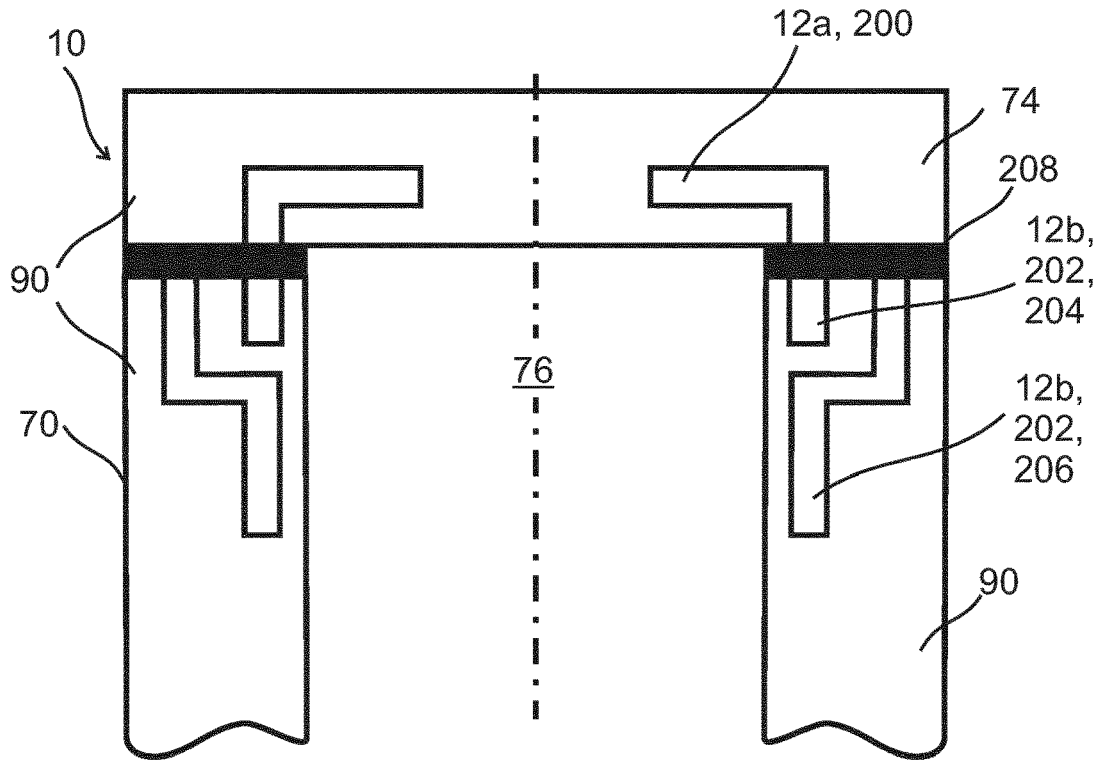
Figure 14A:
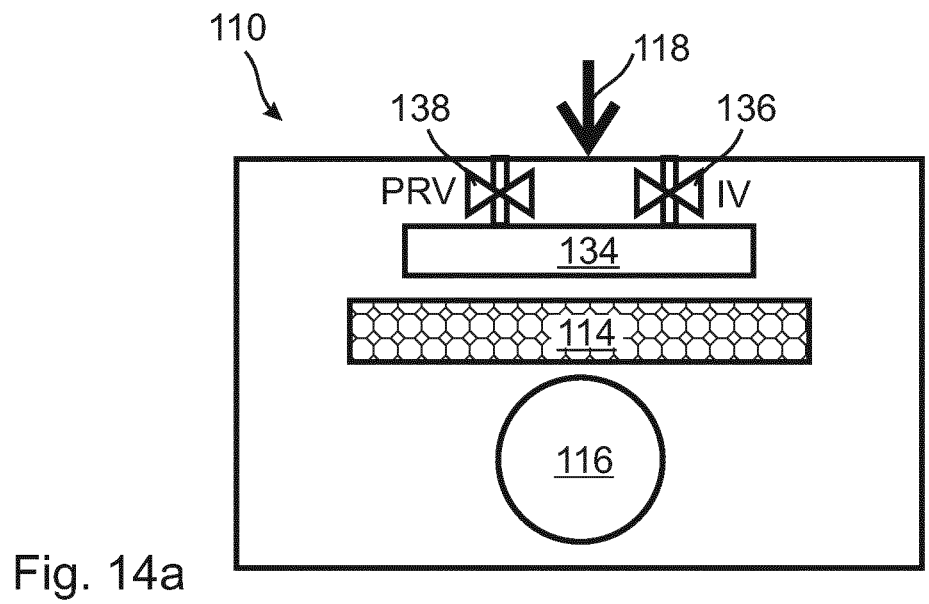
Figure 14B:
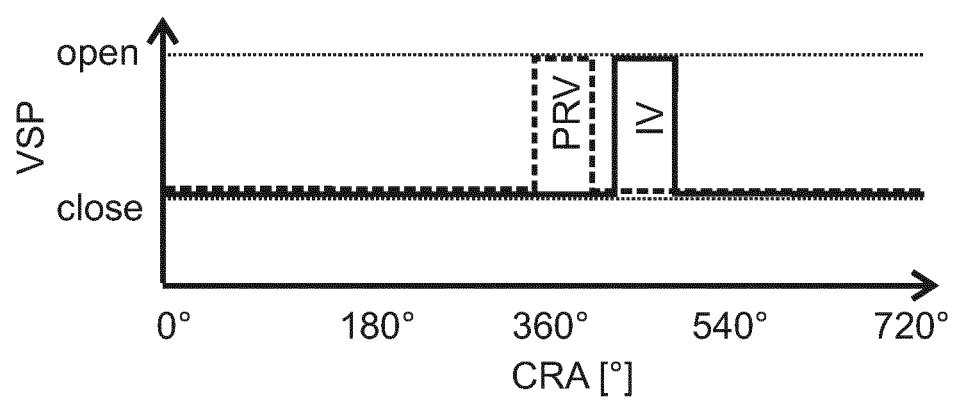
Figure 15A:
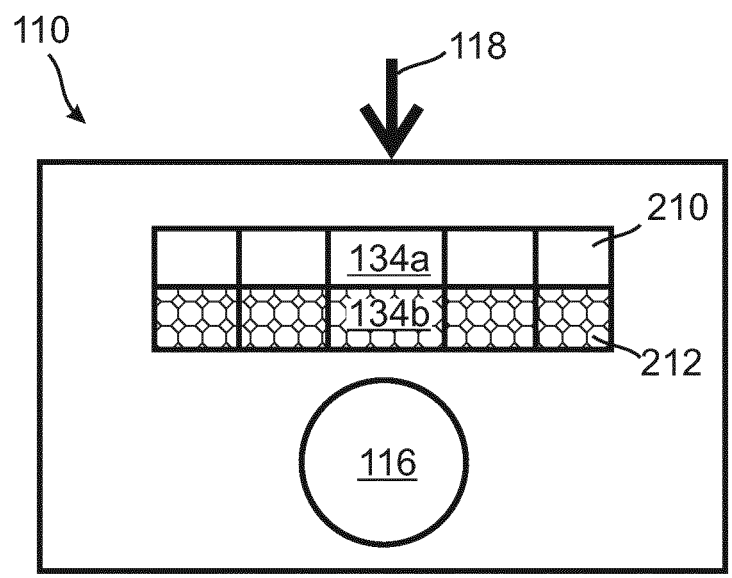
Figure 15B:
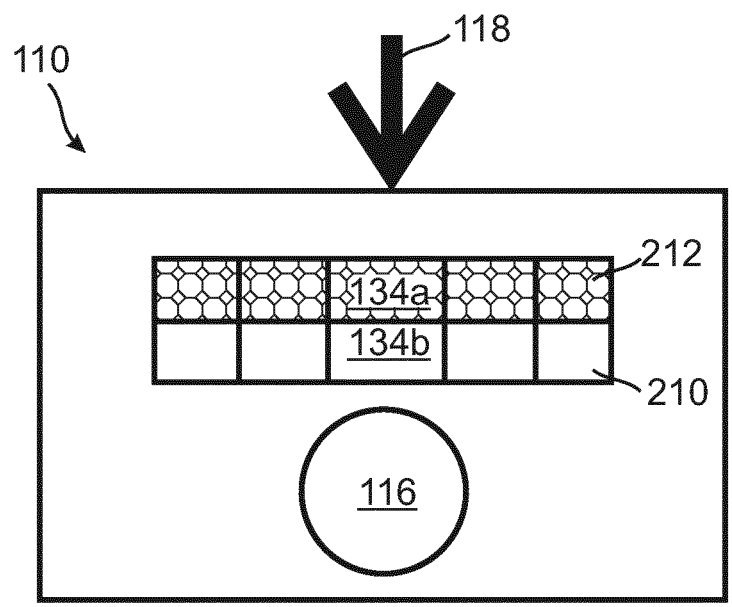
Figure 16:
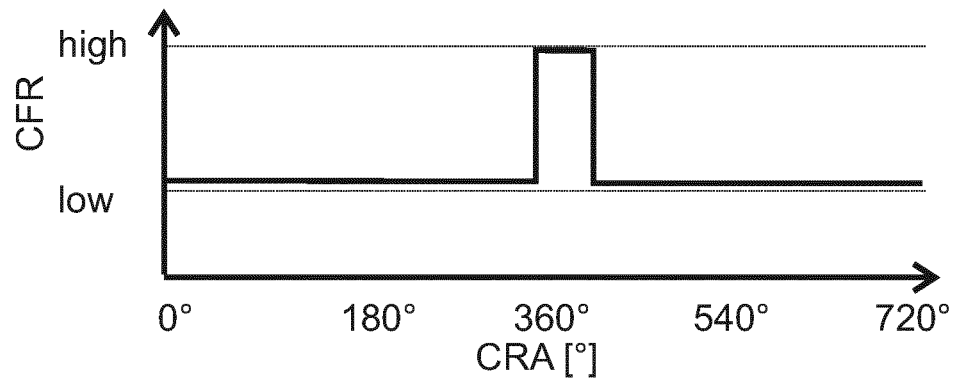
Figure 17:
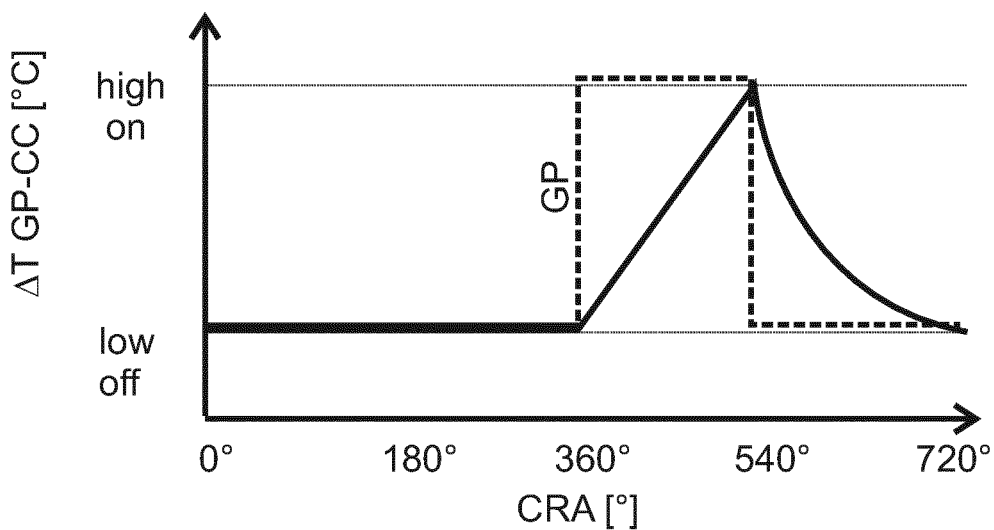
Figure 18A:
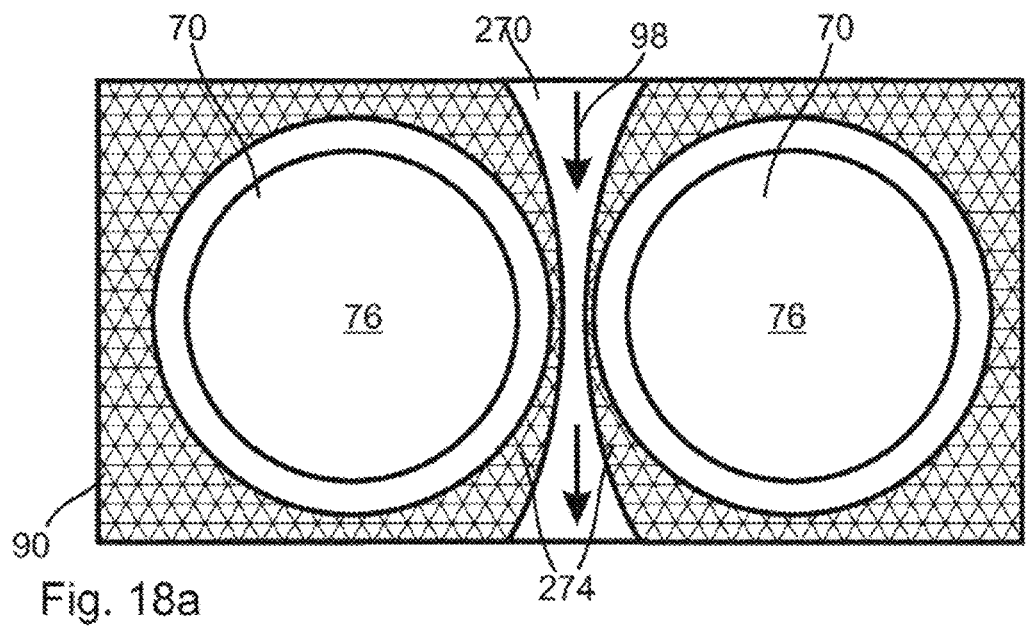
Figure 18B:
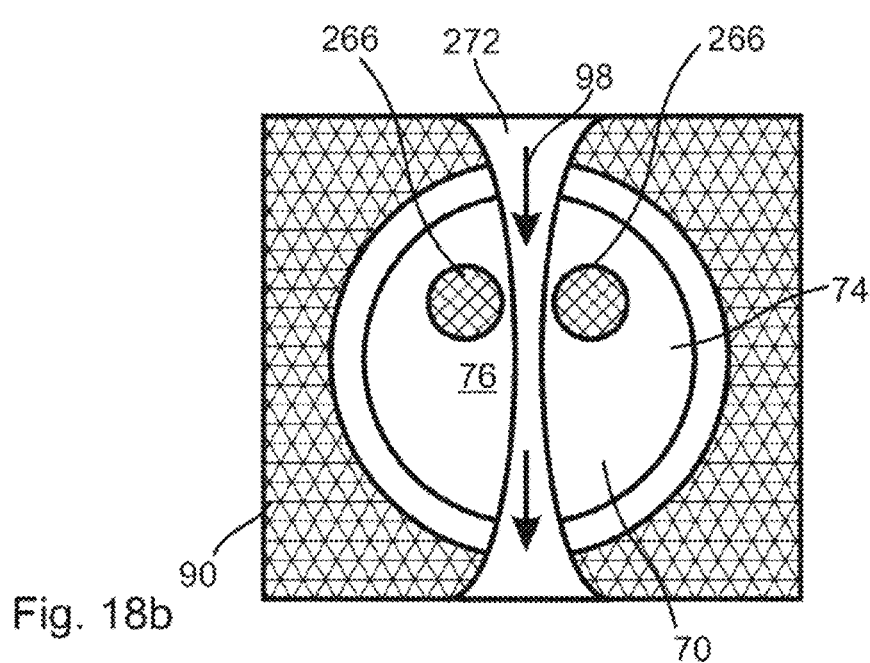
Figure 18C:
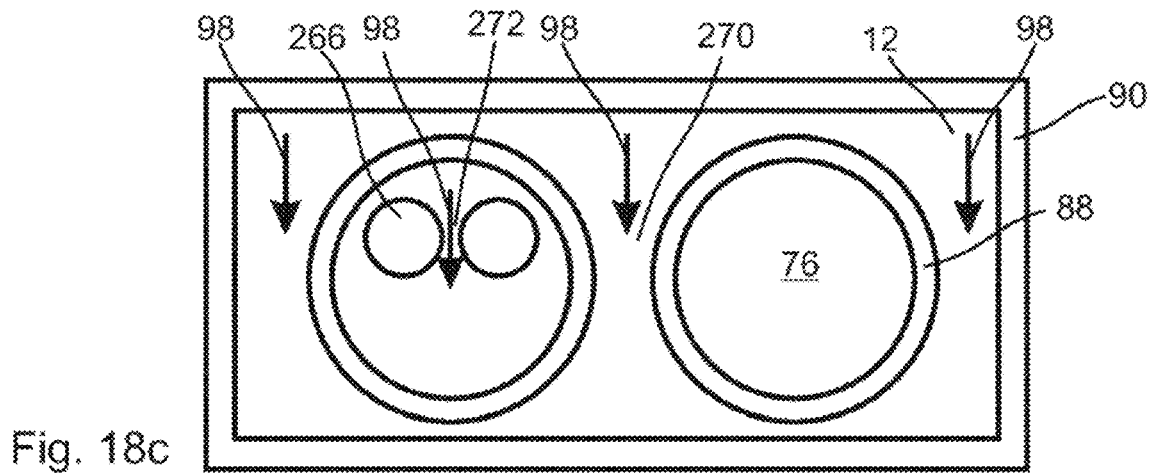
Figure 19:
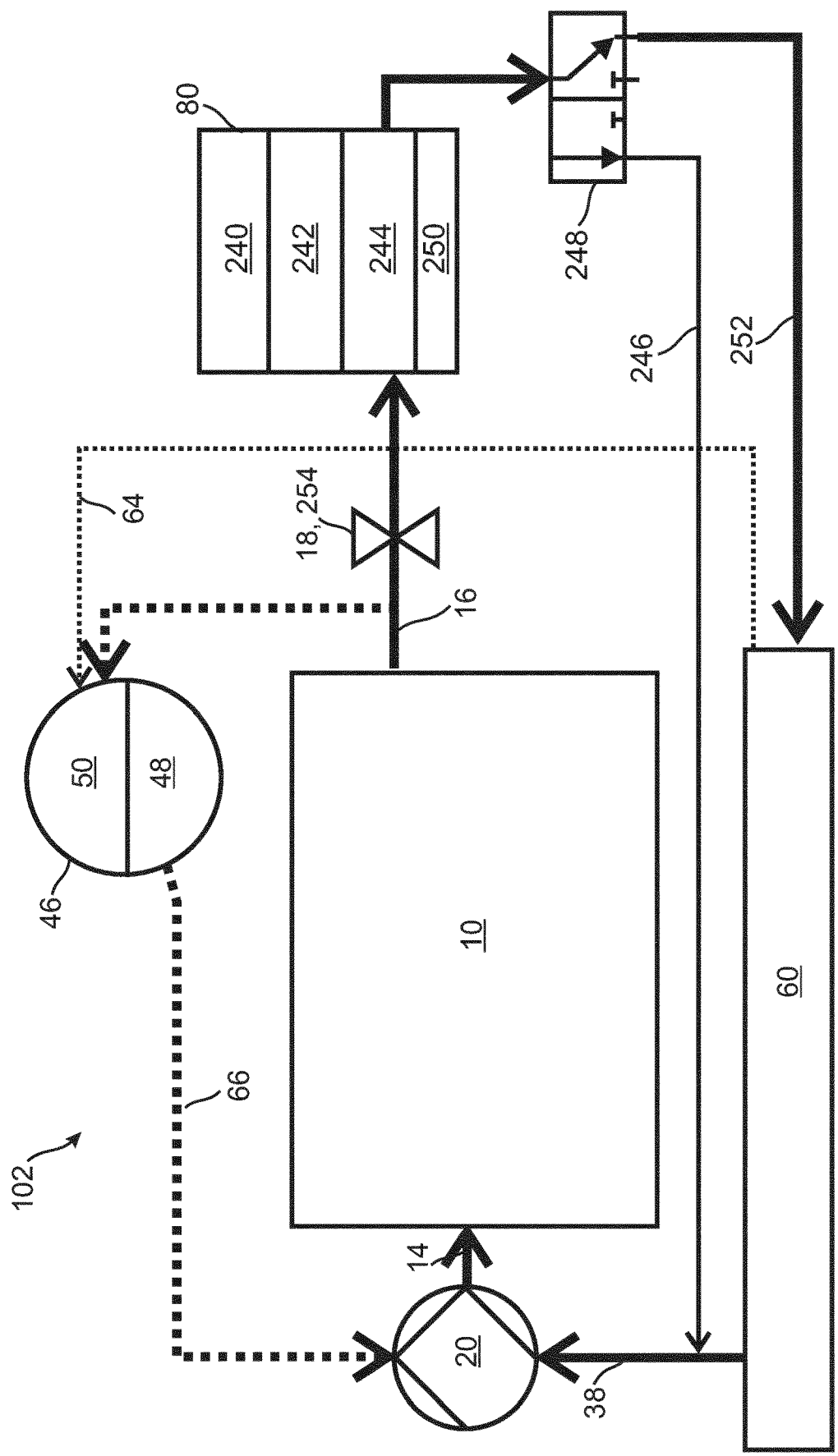
Figure 20C:
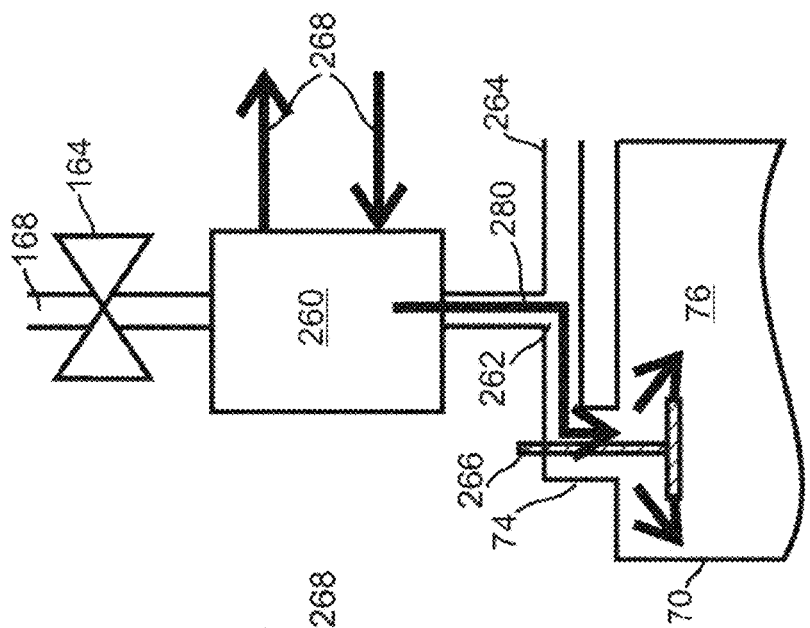
Figure 20B:
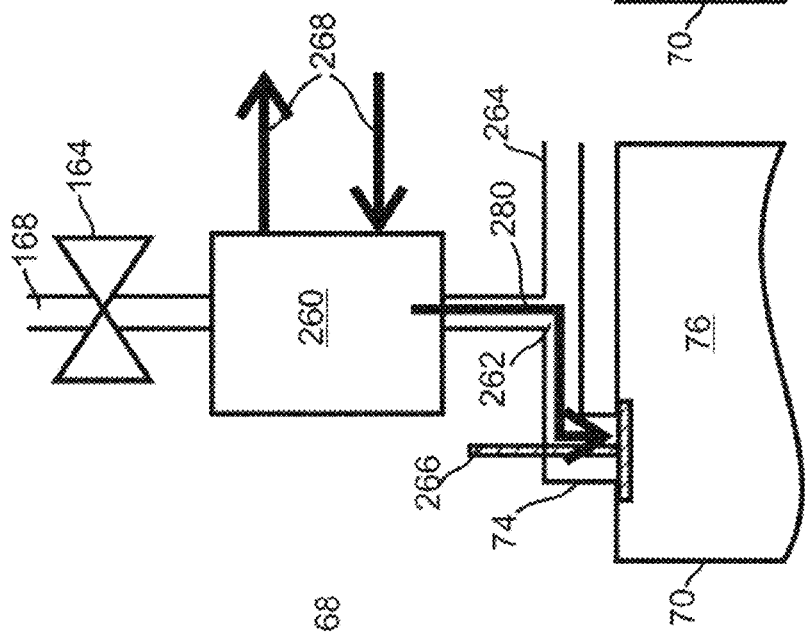
Figure 20A:
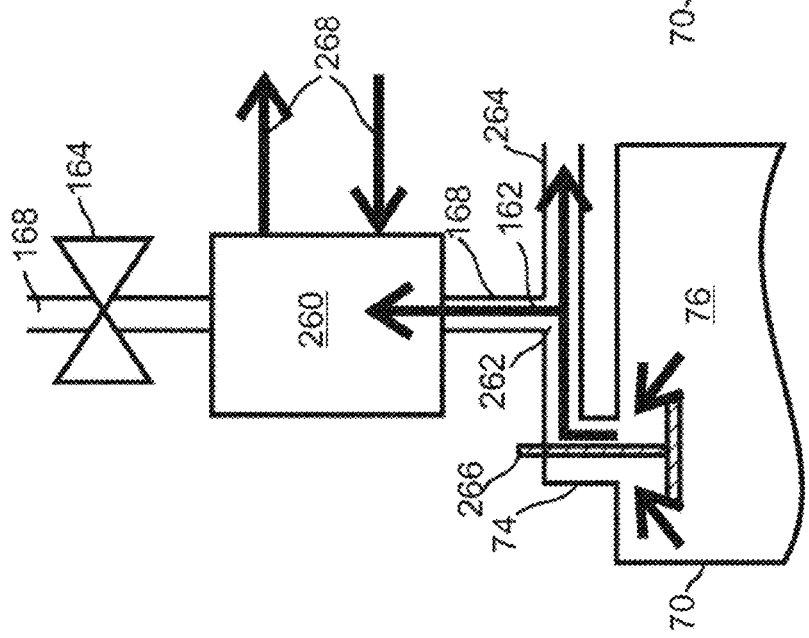
Figure 21:
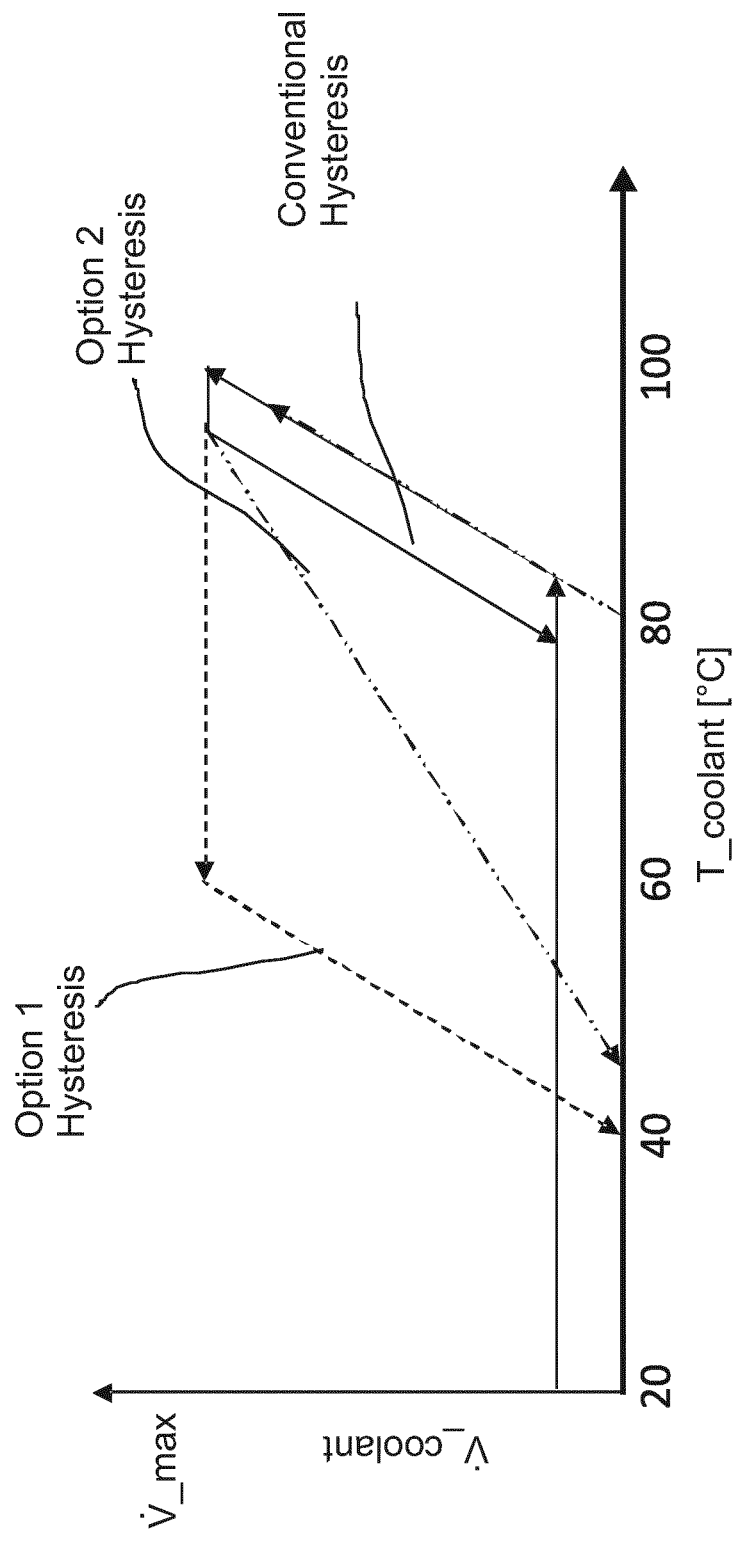
Figure 22A:
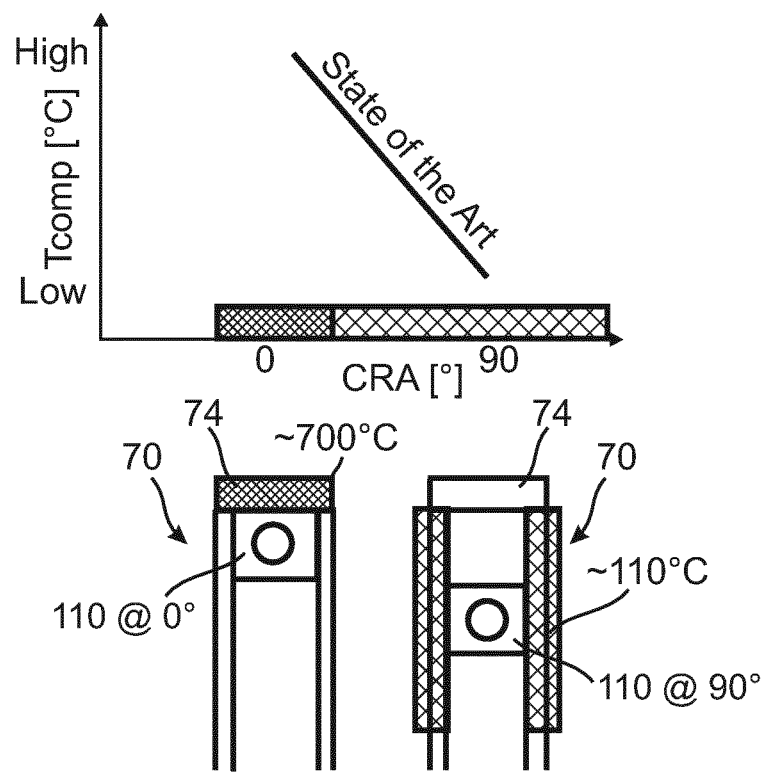
Figure 22B:
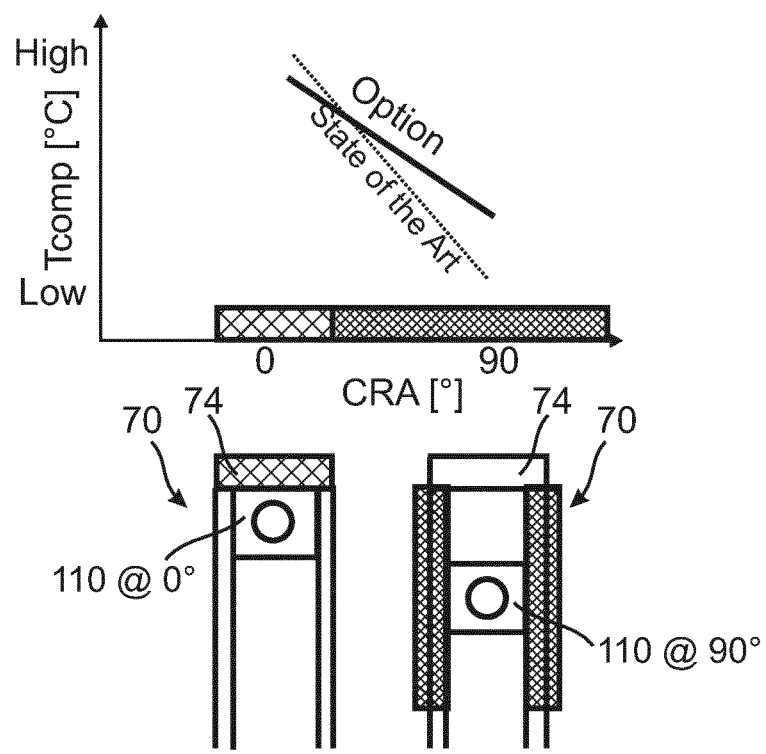
Figure 23:
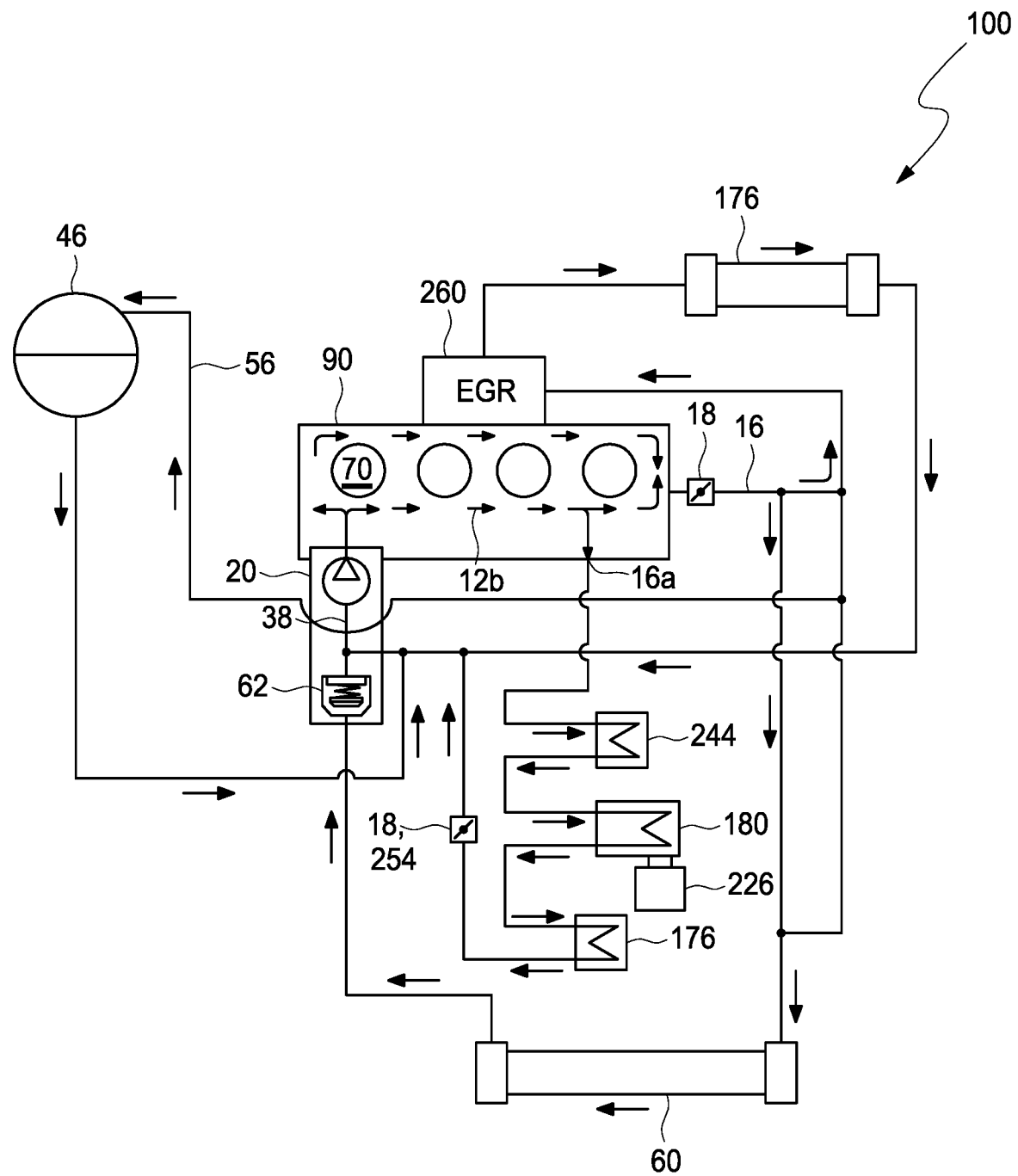
Figure 24:
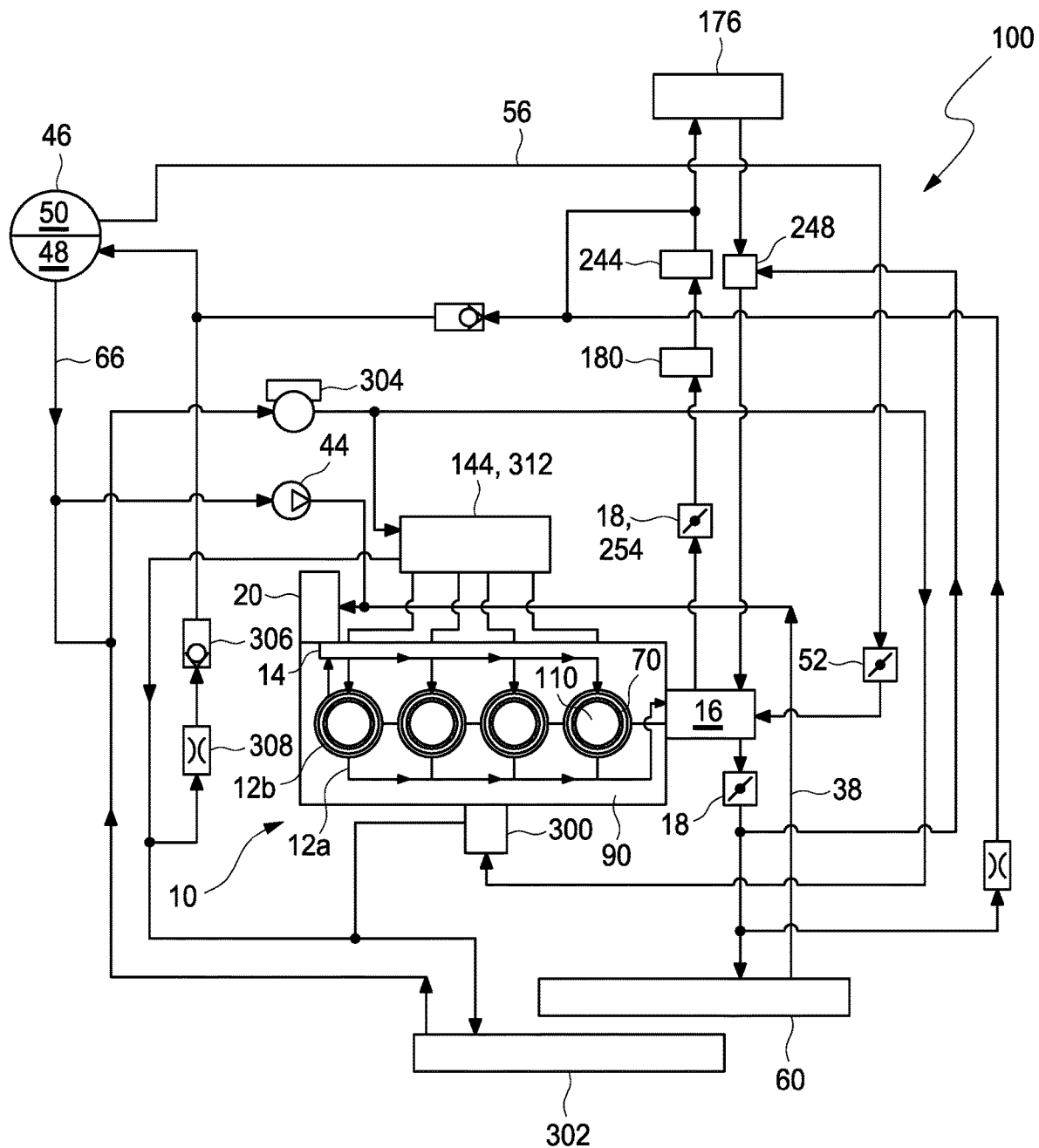

FIG. 9 schematically shows a carburettor for use in the thermal management system according to the invention;

FIG. 10 schematically shows a carburettor with exhaust gas recirculation for use in the thermal management system according to the invention;

FIG. 11 schematically shows another exemplary embodiment of the heat management system;

FIGS. 12a-12b show a cross-section through a cylinder for use in the thermal management system according to the invention;

FIGS. 13a-13b show different arrangements of multiple fluid chambers in a cylinder for the thermal management system according to the invention;

FIGS. 14a-14b schematically show a piston for use in an exemplary embodiment of the thermal management system;

FIGS. 15a-15b schematically show a piston for use in an exemplary embodiment of the thermal management system;

FIG. 16 shows a dynamic fluid flow curve as a function of the piston angle for an exemplary embodiment of the invention;

FIG. 17 shows a switching and temperature curves of a glow plug for an exemplary embodiment of the invention;

FIGS. 18a-18c show coolant passages between cylinders and through a cylinder head for an exemplary embodiment of the invention;

FIG. 19 schematically shows another exemplary embodiment of the thermal management system;

FIGS. 20a-20c schematically show another exemplary embodiment of the thermal management system for utilizing exhaust gas condensate at different instants of a work cycle;

FIG. 21 shows modified thermostat hysteresis characteristics of refrigerant flow rate as a function of coolant temperature for an exemplary embodiment of the invention;

FIGS. 22a-22b illustrate the effect of different temperature gradients in the combustion chamber as a function of the crank angle on NOx production;

FIG. 23 shows another exemplary embodiment of the thermal management system according to the invention in an internal combustion engine;

FIG. 24 shows another exemplary embodiment of the thermal management system according to the invention in an internal combustion engine.

In the figures, similar elements are numbered with the same reference numerals. The figures show merely examples and are not meant to be limiting. The exemplary embodiments illustrated in the figures and functionally associated features or individual features can be combined with each other to new exemplary embodiments and can be combined meaningfully.

The figures represent exemplary embodiments of the aforementioned schematically illustrated embodiments.

Figure 1:
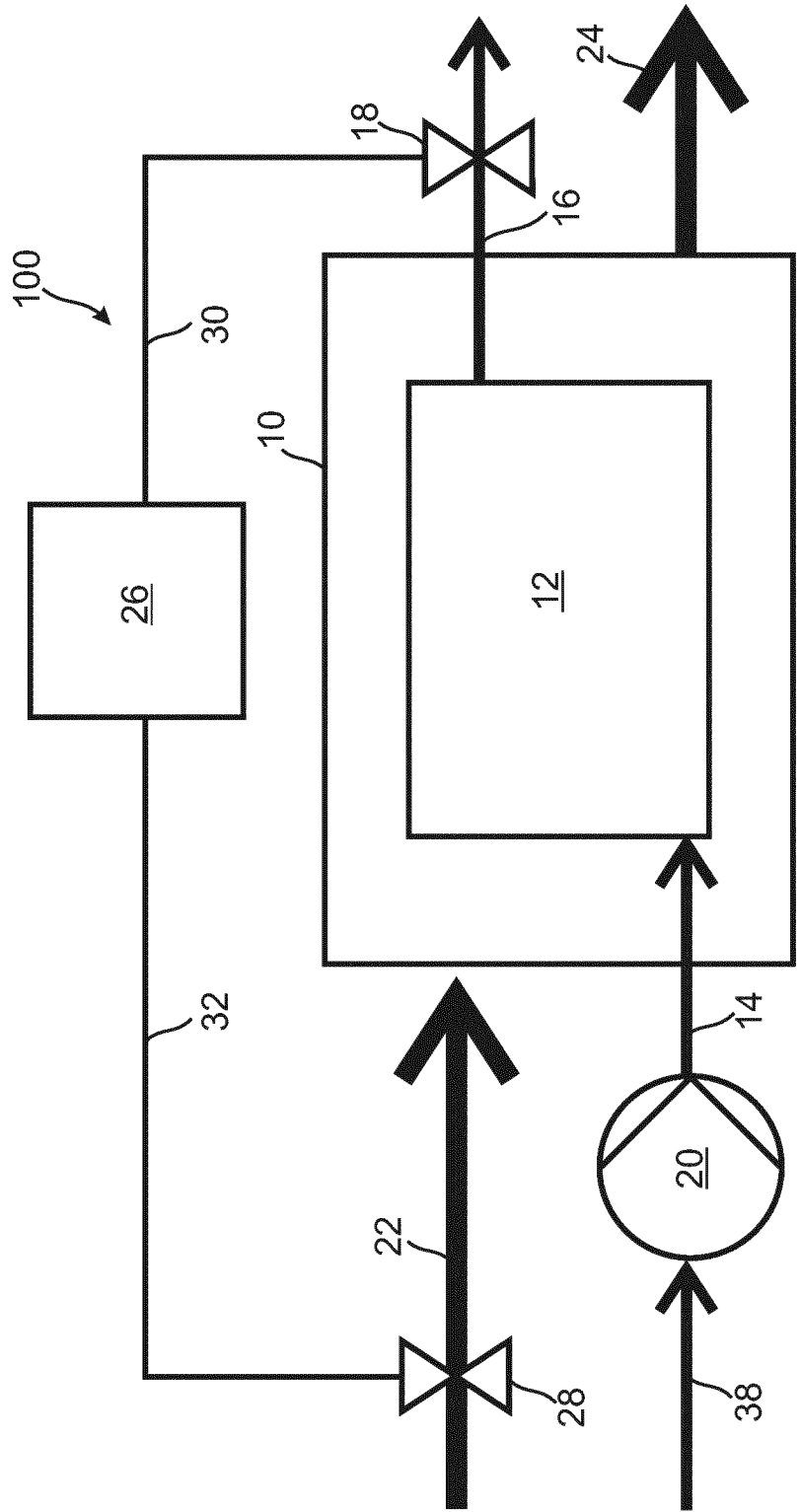

FIG. 1 shows a first exemplary embodiment of a thermal management system 100 for an internal combustion engine 10, which can include one or more cylinders.

The internal combustion engine 10 may be configured as gasoline or diesel engine, alternatively also as gas engine. Generally, main components of the internal combustion engine consist of, such as cylinder block, cylinder head, crankcase and other mechanically loaded components made of metal, particularly grey cast iron or aluminium have high thermal conductivity. For controlling the engine temperature, one or more fluid chambers 12 are provided in the internal combustion engine, through which a coolant fluid, particularly cooling air, cooling water, oil, alcohol solution or a different coolant fluid is passed. For this purpose, the coolant fluid can be supplied from a coolant reservoir, not shown, via a coolant supply 38 to an input side of a coolant delivery device 20, particularly a variable-speed coolant pump. This delivers the coolant fluid via an inlet line 14 into the fluid chamber 12. The coolant fluid has a lower temperature than the temperature of the fluid chamber 12 and is usually introduced therein at the bottom of the fluid chamber 12. Heated coolant fluid rises in the fluid chamber 12 and can be discharged from the fluid chamber 12 via an outlet conduit 16 at the top. For this purpose, a first valve 18 is provided on the outlet line 16, which can control the coolant fluid outflow from the coolant fluid chamber 12. The first valve 18 is responded by an engine load control unit 26, which can further actuate a throttle device 28 via an engine load control line 32 through which air or an air-fuel mixture can enter into the engine 10 via an intake manifold. The combustion residues and combustion gases in the internal combustion engine 10 are transported to the outside via the exhaust gas duct 24. With a rising temperature in the fluid chamber 12, the coolant flow rate through a heat sink, for example a radiator 60, can be increased temporarily, particularly in a warm-up phase with a constant or decreasing engine speed, and at constant or increasing engine speed and with reducing the engine load particularly by at least 30%, the coolant flow rate through the heat sink can be reduced. For this purpose, the coolant delivery device 20 can be provided as a speed-controlled coolant pump. The first valve 18 can be configured as binary valve or proportional valve for enabling to control the amount of coolant flow. It can thus be achieved that the coolant flow through the fluid chamber 12 can be regulated depending on different operating parameters of the internal combustion engine 10, particularly engine load and/or temperature within the fluid chamber, as a function of the engine speed.

Figure 2:
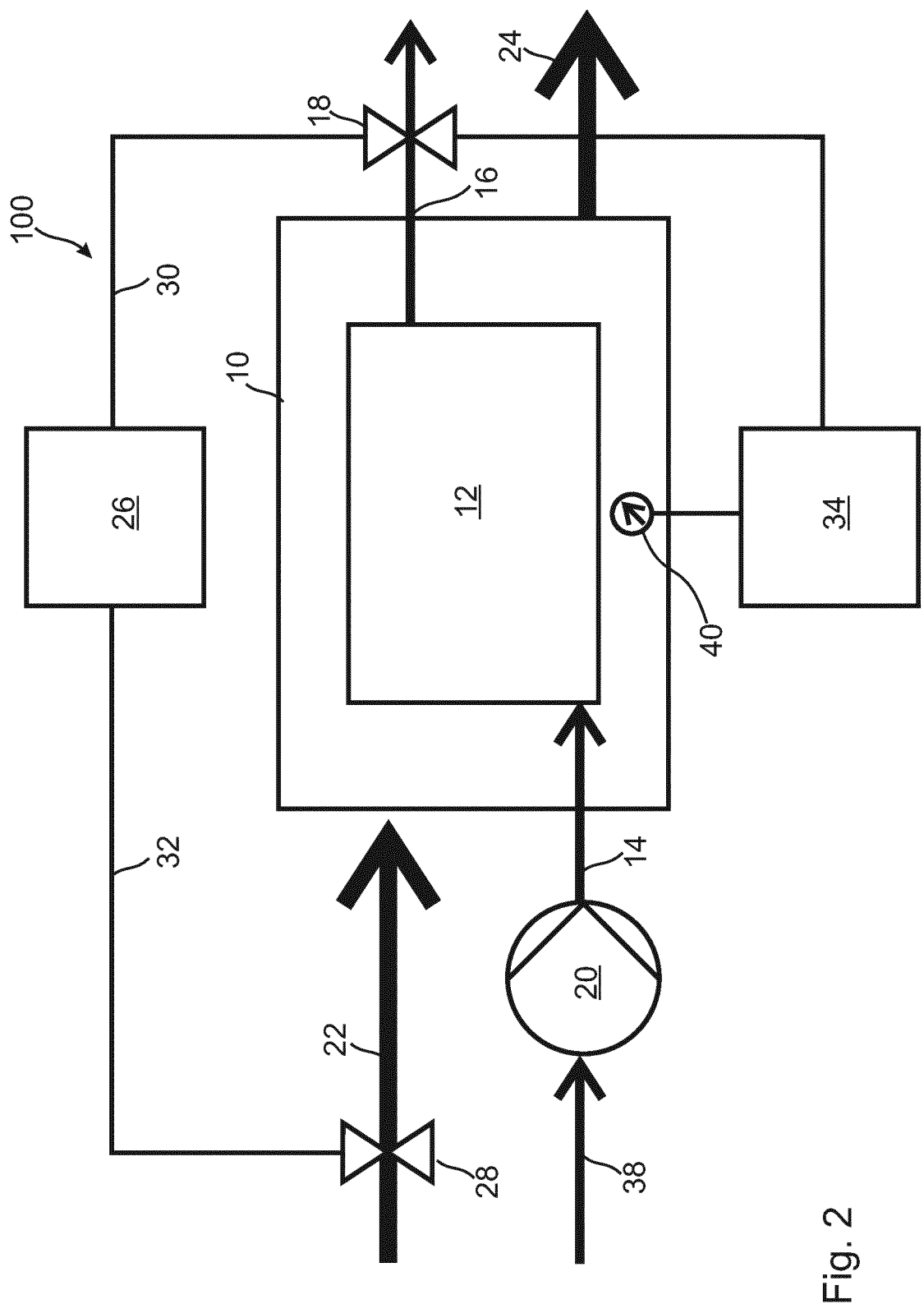

FIG. 2 shows a variant of the exemplary embodiment of the thermal management system 100 shown in FIG. 1. In addition to the basic components which are already contained in the thermal management system 100 of FIG. 1, furthermore a power stroke detection device 34 is provided which can detect the respective timing of the working cycle of a cylinder of the internal combustion engine 10. As a result, the instantaneous operating situation of the internal combustion engine 10 can be detected. For this purpose, a power stroke sensor 40 is provided inside the internal combustion engine 10, for example, to detect the rotational position of the camshaft. For this purpose, a crankshaft sensor can be used along with a camshaft sensor, wherein the crankshaft sensor provides the exact angle and the camshaft sensor indicates whether it is in the first or second part of a working cycle. By detecting the timing of the working cycle, the first valve 18 can be controlled such that the coolant flow rate through the fluid chamber 12 can be increased and reduced during the working cycle, particularly during the working cycle of a cylinder 70. Thereby, for example, hot and cold coolant fluid can alternately be flown through the fluid chamber 12, so that a high temperature variance can be achieved within the fluid chamber 12. At combustion start, particularly cold coolant can be introduced into the fluid chamber 12 and the coolant flow rate can be reduced after at least a crankshaft angle of 40°. This can be used to selectively adjust the fluid chamber temperature as a function of the power stroke, to effectively suppress critical temperature ranges which are responsible for the formation of nitrogen emissions and to provide dynamic thermal management.

Figure 3:
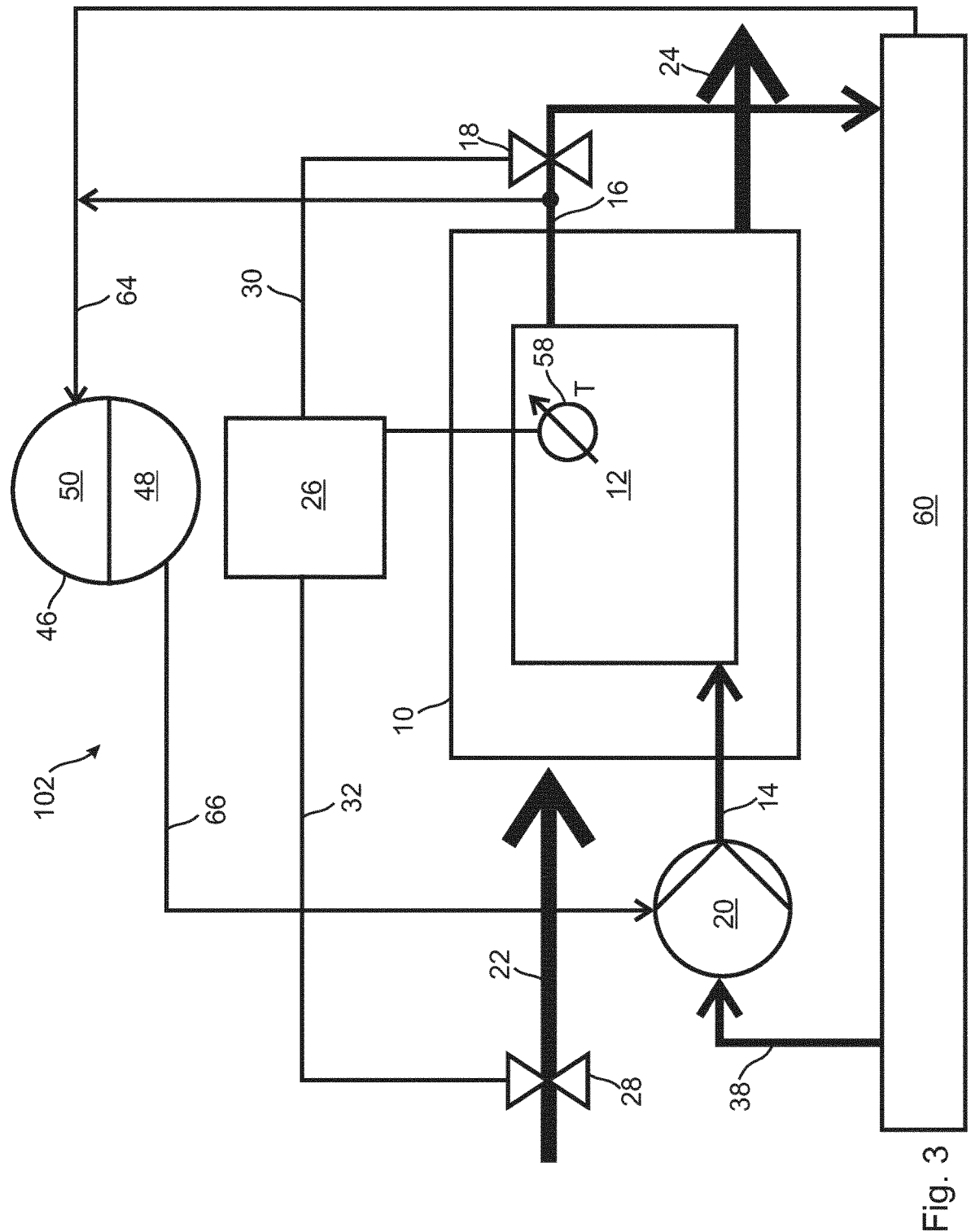

FIG. 3 shows another embodiment of the thermal management system 102 of the invention. The basic components of the thermal management system 100 already illustrated in FIG. 1, are contained in the thermal management system 102. Furthermore, a surge tank 46 of the coolant fluid is provided, which has a liquid side 48 and a gas side 50. A first coolant fluid, controlled by the first valve 18, is discharged into a radiator 60 and supplied to the coolant delivery device 20 via the coolant supply 38. From the radiator 60, gas and gaseous coolant can be discharged into the gas side 50 of the surge tank via a vent line 64, particularly at high temperatures and high pressures of the coolant fluid. This has an effect on the liquid side 48 of the surge tank, which is connected to the fluid delivery device 20 via a discharge line 66 between the surge tank and the fluid delivery device 20 and can introduce the first coolant fluid into the fluid chamber. Thus, with decreasing engine load, particularly on falling below a certain engine load, the first coolant fluid can be at least partially displaced from the fluid chamber 12 into the surge tank 46 and, for example, the second coolant fluid can be displaced from the surge tank into the fluid chamber. The second coolant fluid can have an oxygen content of less than 20%. In the thermal management system according to FIG. 3, it is thereby possible to use two different coolant fluids, firstly a first coolant fluid that can circulate in the circuit between radiator 60, fluid chamber 12 and regulated via first valve 18 by the coolant delivery device 20 and a second coolant fluid that can be displaced between surge tank 46 and fluid chamber 12. The second coolant fluid can be stored in the gas side 50 of the surge tank and, if necessary, can be introduced from the coolant delivery device 20 into the fluid chamber 12. This enables a quick temperature change and different temperature ranges can be adjusted by the first and second coolant fluids in quick succession. A fluid chamber temperature sensor 58 is provided in the fluid chamber 12, which detects the current temperature of the fluid chamber 12 and transmits it to the engine load control unit 26, so that the first valve 18, the coolant delivery device 20 and the throttle device 28 can be controlled depending on the fluid chamber temperature, to switch between different coolants and to regulate the load.

Figure 4A:
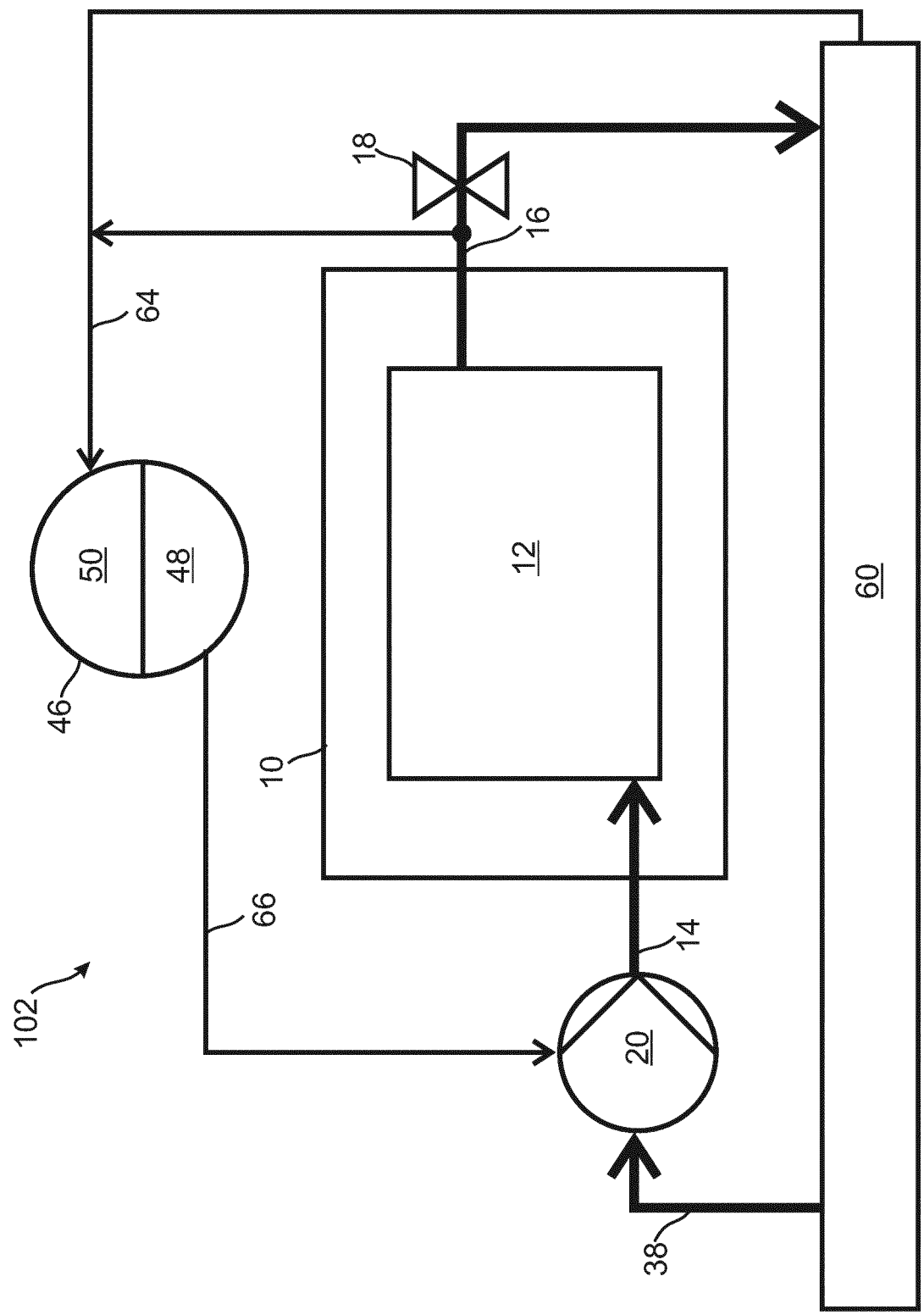
Figure 4B:
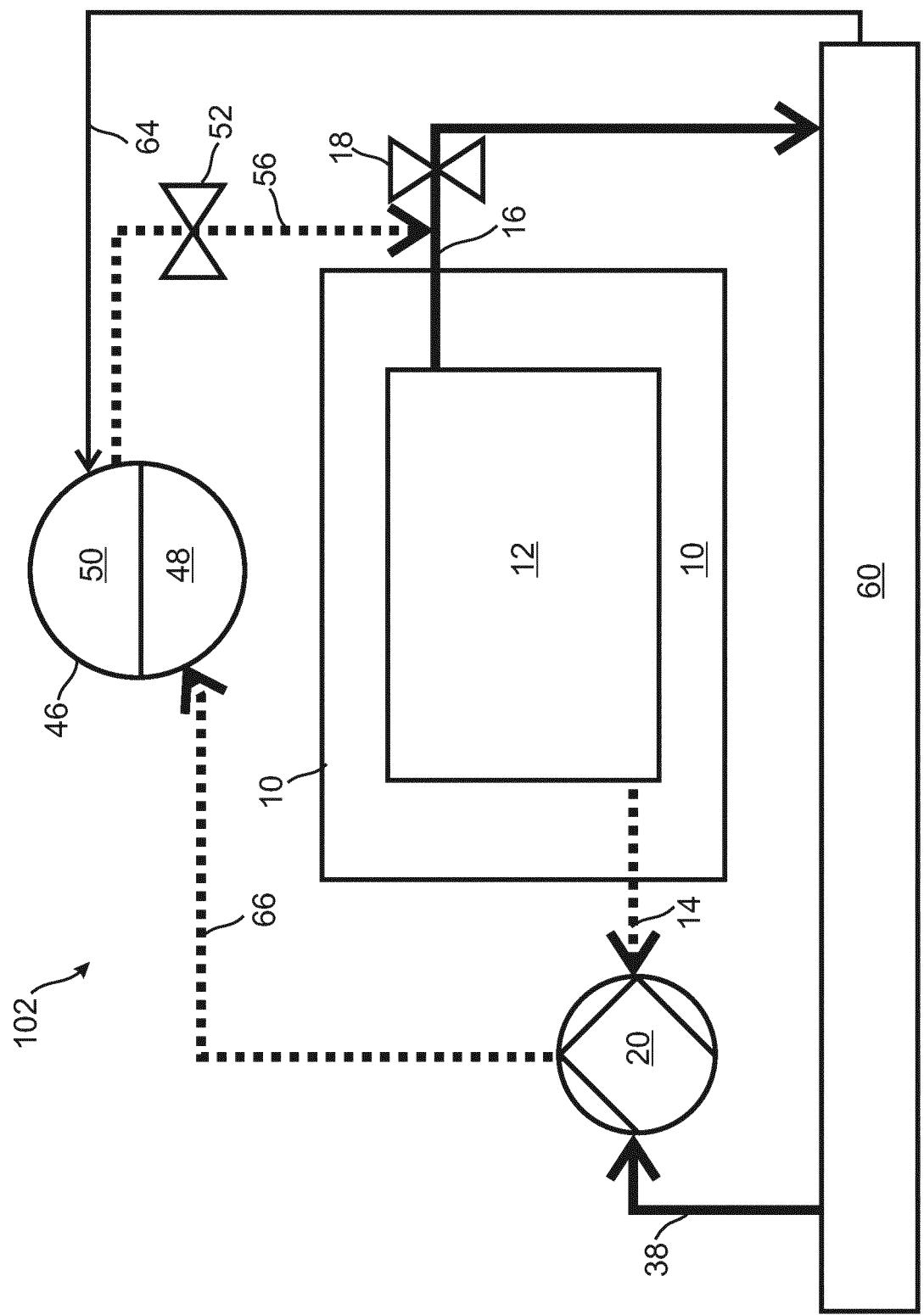
Figure 4C:
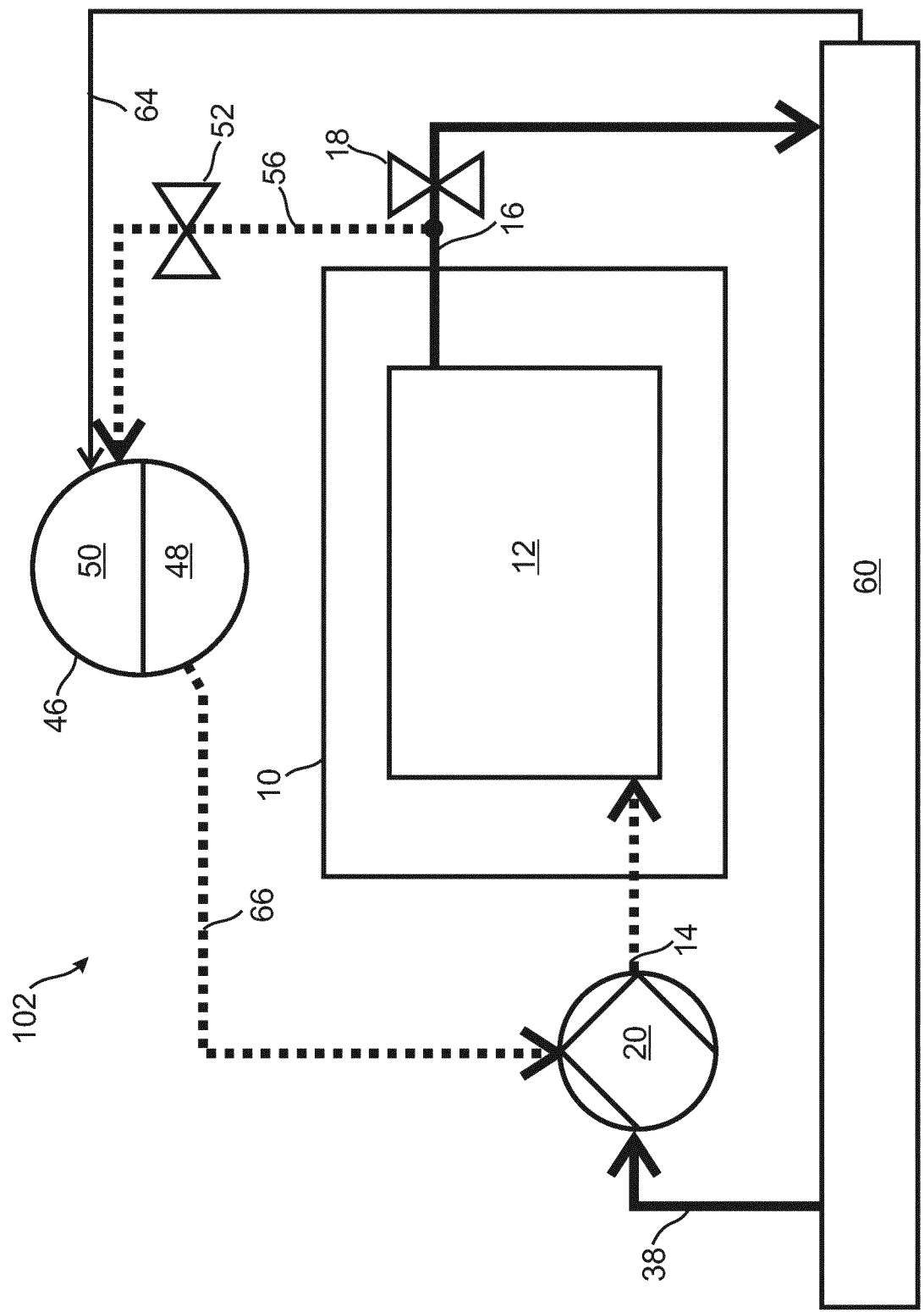

In the FIGS. 4a to 4c, different operational phases of the thermal management system 102 represented in FIG. 3, are shown. FIG. 4a shows the normal operating sequence in which the first coolant fluid is withdrawn from the radiator 60 and/or the liquid side of the surge tank, supplied to the coolant delivery device 20, and introduced further into the fluid chamber via the fluid chamber inlet line 14, this is illustrated by the increased line width of the coolant fluid lines. The heated coolant fluid rises to the top of the fluid chamber 12 via the fluid chamber outlet line 16 with the first valve 18 open and is guided back into the radiator 60. Thus, the standard coolant circuit is closed, wherein depending on various engine conditions, the coolant output can be reduced or increased, firstly by the first valve 18, secondly by the output of the coolant delivery device 20.

FIG. 4b shows the extraction of the first coolant fluid from the fluid chamber. Here, it is assumed that the fluid chamber 12 is filled with the first coolant fluid, and for example, by switching the delivery direction of the coolant delivery device 20, the first coolant fluid from the fluid chamber 12 is returned via the line 14 via the coolant delivery device 20 and line 66 into the liquid side 48 of the surge tank. Thereby, the first valve 18 is closed. For pressure equalization, the compensation line 56 is opened by the third valve 52, so that the second coolant, a gas, is passed from the gas side 50 of the surge tank into the fluid chamber 12.

After sufficient extraction of the first coolant fluid from the fluid chamber, the third valve 52 is closed to avoid filling the fluid chamber with the first coolant fluid.

In FIG. 4c is shown, how the first fluid stored in the liquid side 48 of the surge tank 46, is introduced into the fluid chamber 12. Here, for example, controlled by a valve or by the mechanism of the coolant delivery device 20, the first coolant fluid is removed from the liquid side 48 of the surge tank via the discharge line 66 and introduced separately or along with the first coolant fluid from the coolant supply 38 by the coolant delivery device 20 into the fluid chamber 12. When the first valve 18 is closed, then the second coolant fluid can be returned into the gas side 50 of the surge tank 46, wherein a pressure equalization of the gas side 50 of the surge tank 46 occurs by means of an open third valve 52. Thus, the fluid chamber 12 can be temperature controlled either by the first coolant fluid or the second coolant fluid or by a mixture of first and second coolant fluids.

Thus, the first coolant fluid can be extracted from the fluid chamber 12 in the same way as it is introduced to enable a quick change in temperature.

Figure 5:
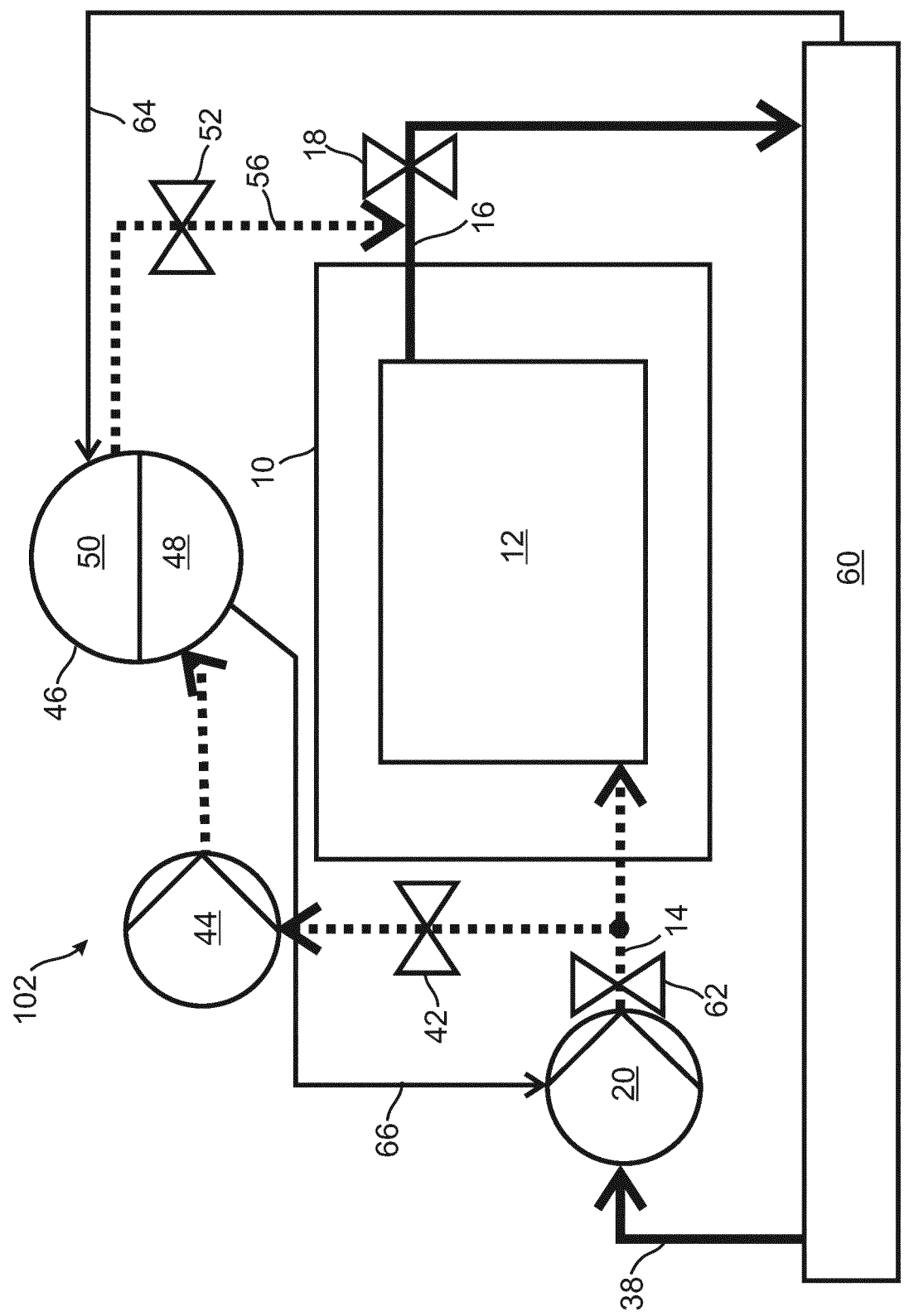

FIG. 5 shows an advanced embodiment of the thermal management system 102 shown in FIG. 3. In addition to the components already included in FIG. 2, the thermal management system 102 according to FIG. 5 comprises an inlet line valve 62 in the fluid chamber inlet line 14 and a second fluid delivery device 44, the inlet and outlet lines of which, controlled via a second valve 42, opens up the possibility of actively returning or introducing the second coolant fluid from the fluid chamber 12 into the gas side 50 of the surge tank 46. For this purpose, the gas side 50 of the surge tank 46 can again be connected via the third valve 52 to the outlet side 16 of the fluid chamber 12 for venting. The first inlet line valve 62 and the second valve 42 can preferably be configured as a structurally combined 3/2-way valve, which alternately controls the supply of the first or second coolant fluid. The second fluid delivery device 44 can be configured as bidirectional pump and, particularly can automatically open the second valve 42 and close the inlet line valve 62 with decreasing engine load, so that the second coolant fluid can be introduced into or extracted from the surge tank 46 from or into the fluid chamber, and can change the fluid chamber temperature there into another temperature range. Thus, the first and the second coolant fluid can be actively transferred to the surge tank and pumped back, so that the dynamics of the temperature change of the fluid chamber can be further increased.

Figure 6:
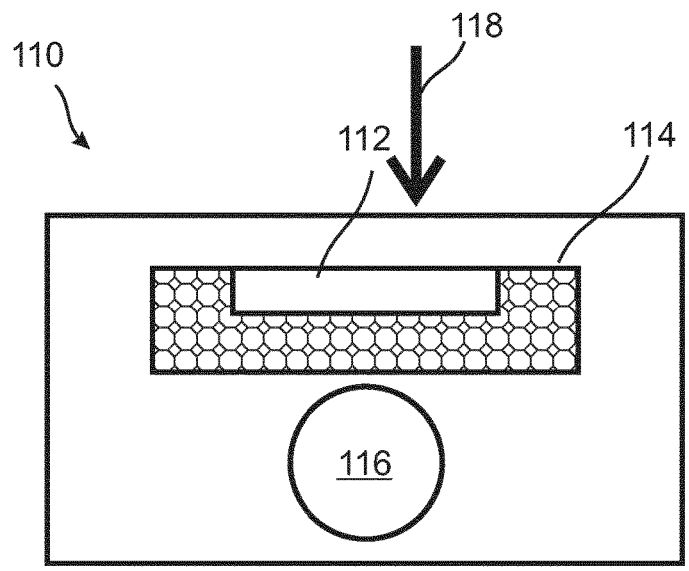

In FIG. 6 is shown a piston 110 for use in an exemplary embodiment of a thermal management system 100. The piston 110 comprises a piston crown with a connecting rod axis 116, in which a connecting rod for connection to a crankshaft can be disposed. An insulating layer 114 and a phase change material layer 112 is introduced in the piston 110, wherein the phase change material layer 112 has a melting temperature which is in the range of the piston temperature during the combustion cycle. By the action of a thermal heat input 118, as occurs in the combustion process in an internal combustion engine, the insulating layer 114 causes insulation of the lower portion of the piston crown and the phase change material layer 112 can store excess heat by a phase change, so that a thermal decoupling of piston occurs, and varying temperatures in the combustion chamber have little effect on the thermal state of the piston and the cylinder walls. As a result, an increased warming of the cylinder walls, particularly during engine high-load phases is reduced and the temperature variation is moderated, so that temperature peaks are reduced and pollutants formation, which occurs particularly at high temperatures, can be restricted thereby.

Figure 7A:
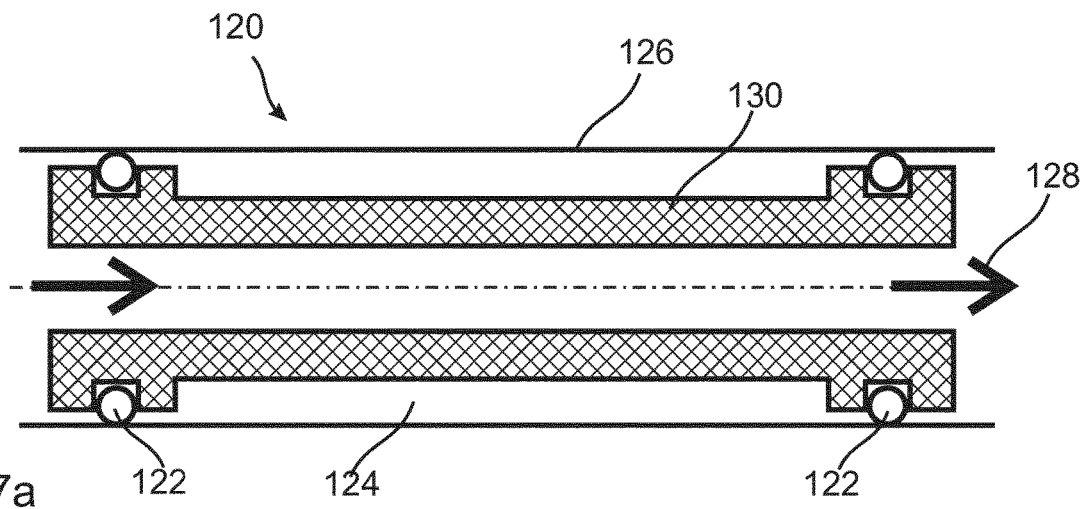
FIGS. 7a-7b show different coolant lines for use in an exemplary embodiment of the thermal management system.
Figure 7B:
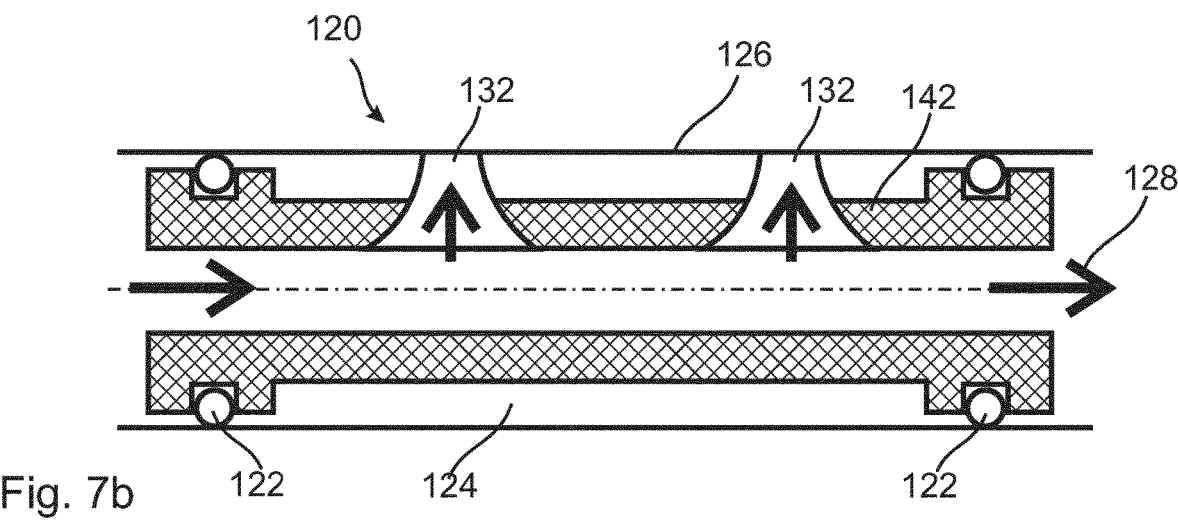

In FIGS. 7a and 7b, coolant lines or oil lines 120 are shown. The coolant or oil line 120 includes a boundary surface to a structural environment 126, such as a cold gallery wall, and an inner liner 130, preferably as an inner liner-insert, which can conduct the coolant fluid or lubricating fluid through gaskets 122 to the structural environment 126 in a sealing manner. Optionally, the inner liner-insert 130 can define a gas space 124 or air insulation, since air is an excellent thermal insulator. This enables to conduct the fluid flow 128 largely thermally insulated from the structure environment, so that no undesired coolant fluid heating or cooling occurs by the structural environment and thus the coolant fluid temperature is regulated better. In FIG. 7b is shown that for an outlet of lubricating fluid or even coolant fluid, particularly oil as lubricating fluid on the crank bearing, partial openings as crank bearing oil outlets 132 are provided through the inner insulation insert or the inner tube 142, via which the fluid can pour out to be able to reach the areas to be lubricated or cooled. Thus, an undesirable thermal contacting of the structural environment with the fluid flow is avoided, and yet lubricant can be conducted, for example to the crankshaft bearings aimed to be lubricated and to keep the oil as lubricant at a predeterminable temperature range. For this purpose, an effective thermal insulation by an air gap and/or by an insulating insert 130, 142 as inner wall insulation is advantageously possible. In particular, it is shown that an insulating insert 130 enables a chamfering or even rounding of the branch from the fluid flow 128 into the crank bearing-oil outlets 132, which would not be possible in drilled coolant or oil lines 120.

In FIGS. 8a to 8e are shown various options for dividing a multipart fluid chamber 12, particularly for the application in an air-cooled engine, which can extend over the valve cover 72, cylinder head 74 and cylinder wall of the cylinder 70. The aim is the different and variable temperature control of the cylinder regions for avoiding temperature peaks. A coolant fluid is introduced in a coolant supply 38 via a coolant delivery device 20 and a fluid chamber-inlet line 14 into the cylinder 70 and cylinder head 74 of the internal combustion engine 10. Generally, an internal combustion engine 10 comprises one or more cylinders 70, each having at least one cylinder bore of the cylinder 70, a valve cover 72 and a cylinder head 74. In all three regions of the internal combustion engine 10, a self-contained or interconnected fluid chambers 12, 12a, 12b can be provided. The one or more fluid chambers 12, 12a or 12b can be selectively insulated or jointly passed with the first coolant fluid.

Figure 8A:
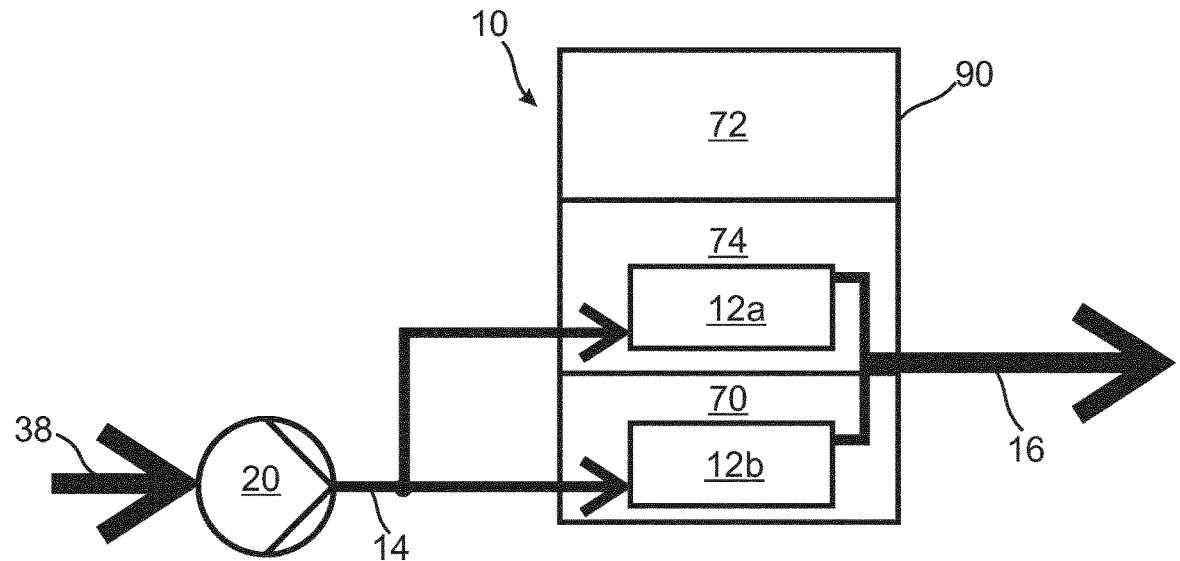
FIGS. 8a-8e show different variants of internal combustion engines with the thermal management system according to the invention.

For this purpose, in FIG. 8a is shown that an upper fluid chamber portion 12a and a lower fluid chamber portion 12b of the fluid chamber 12 are provided in parallel in or around the cylinder wall of the cylinder 70 and in the cylinder head 74, through which coolant fluid is passed, wherein the exiting coolant fluid is evacuated via the outlet line 16.

Figure 8B:
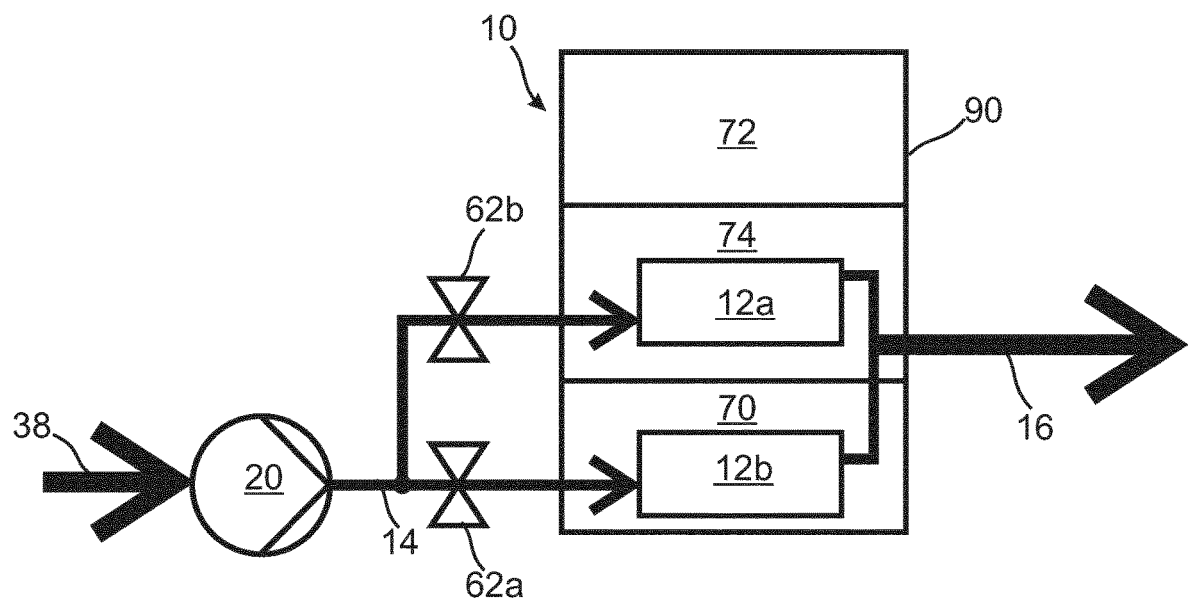

In FIG. 8b, a first and a second inlet line valve 62a, 62b is provided for selective temperature control in the two parallel branches of the inlet line 14, which can selectively control the coolant supply to the cylinder bore of the cylinder 70 and cylinder head 74 either binarily or proportionally.

Figure 8C:
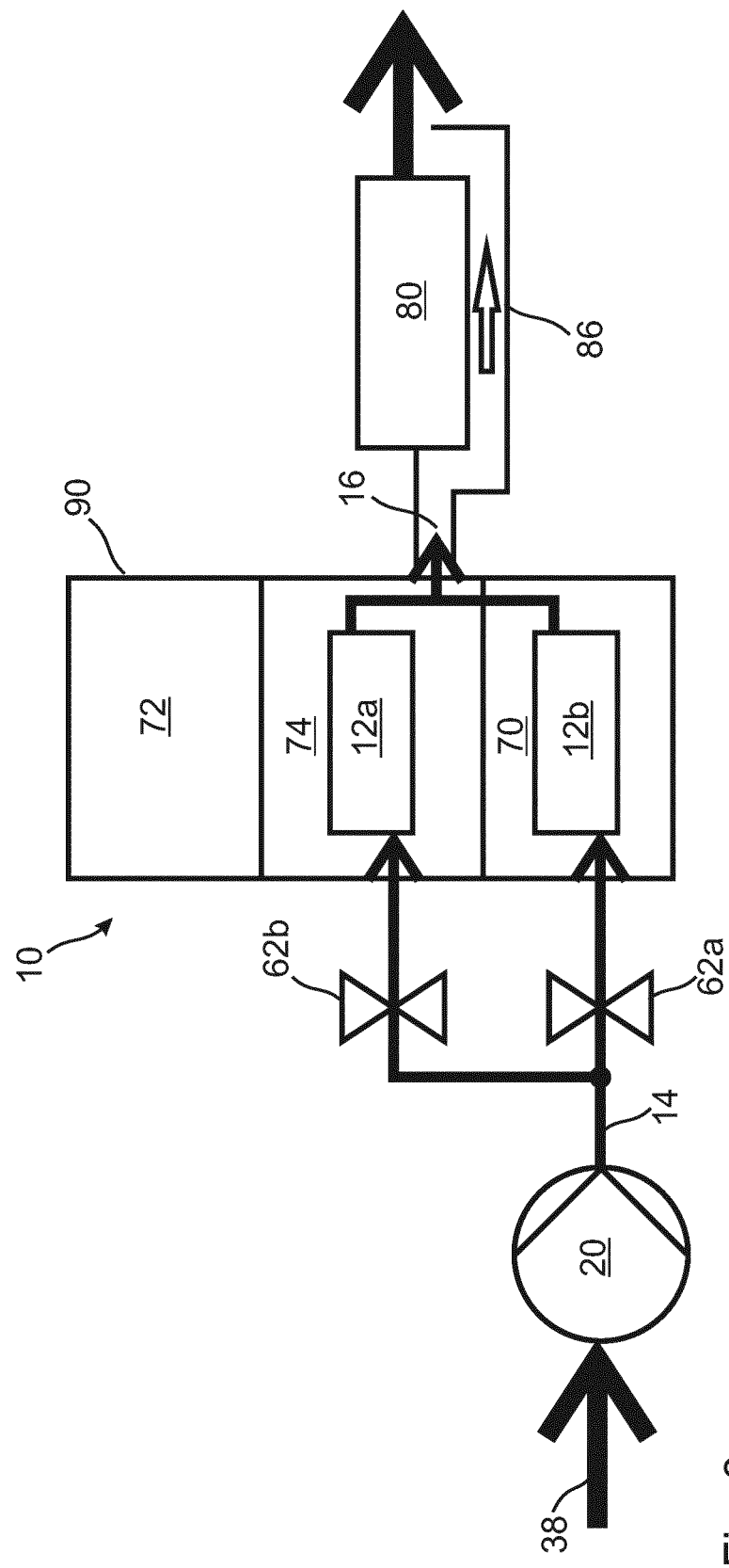

FIG. 8c illustrates another configuration of the fluid chamber division, which is based on the variation of FIG. 8b. The separately controllable coolant supply lines to the cylinder wall of the cylinder 70 and cylinder head 74 discharge the coolant fluid into a common fluid chamber outlet conduit 16, which can be conducted into a transmission 80, particularly at the bottom of an oil sump of the transmission through a transmission cover 86 disposed on the transmission 80, for example glued. The transmission cover 86 can be configured, for example as a transmission oil heat exchanger and at least for the surfaces not in contact with the gear, is made of plastic and glued to the gearbox housing from the outside. As a result, thermal energy can be supplied to the transmission 80 or the coolant fluid temperature can be further manipulated by the transmission.

Figure 8D:
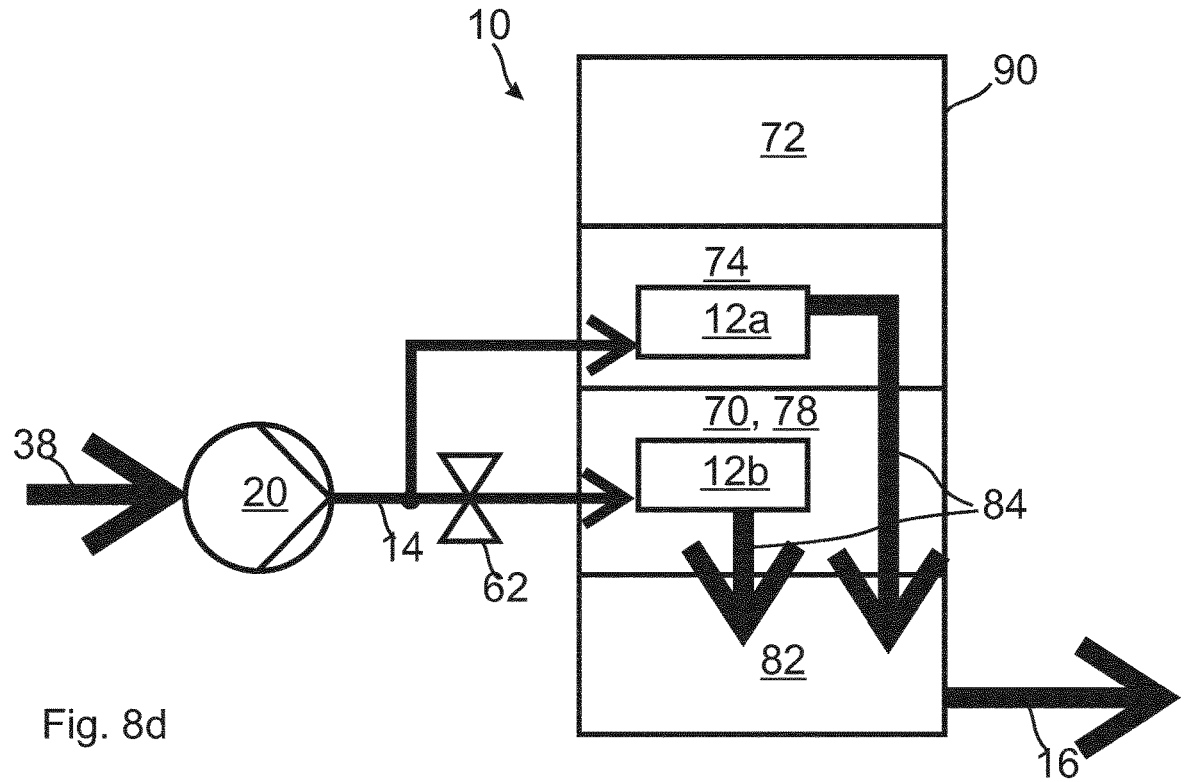

FIG. 8d shows another variant of interconnected fluid chambers 12a, 12b, however for oil lubrication and cooling, wherein the fluid chamber 12a of the cylinder head 74 is connected to the fluid chamber 12b of the cylinder wall of the cylinder 70 and further with another fluid chamber, which is disposed in the crankshaft portion 82. So for example, coolant fluid from the cylinder head 74 can flow down into fluid chamber regions of the crankshaft 82 and likewise coolant from a fluid chamber on the cylinder 70, particularly in the piston bore region 78, can also be conducted into the crankshaft region 82. For this purpose, coolant return lines 84 are provided to interconnect the coolant of the individual fluid chamber regions 12a, 12b.

In the following FIGS. 8d and 8e, oil is used as the coolant fluid, which is collected at the outlet in the crankshaft portion 82. In FIG. 8d, the supply of the first coolant fluid into the cylinder walls of the fluid chamber 12b can be controlled by an inlet line valve 62, which is particularly a pressure relief valve, particularly of a piston nozzle cooling. The fluid chamber of the cylinder head 74 is continuously flown with and cooled by coolant.

Figure 8E:
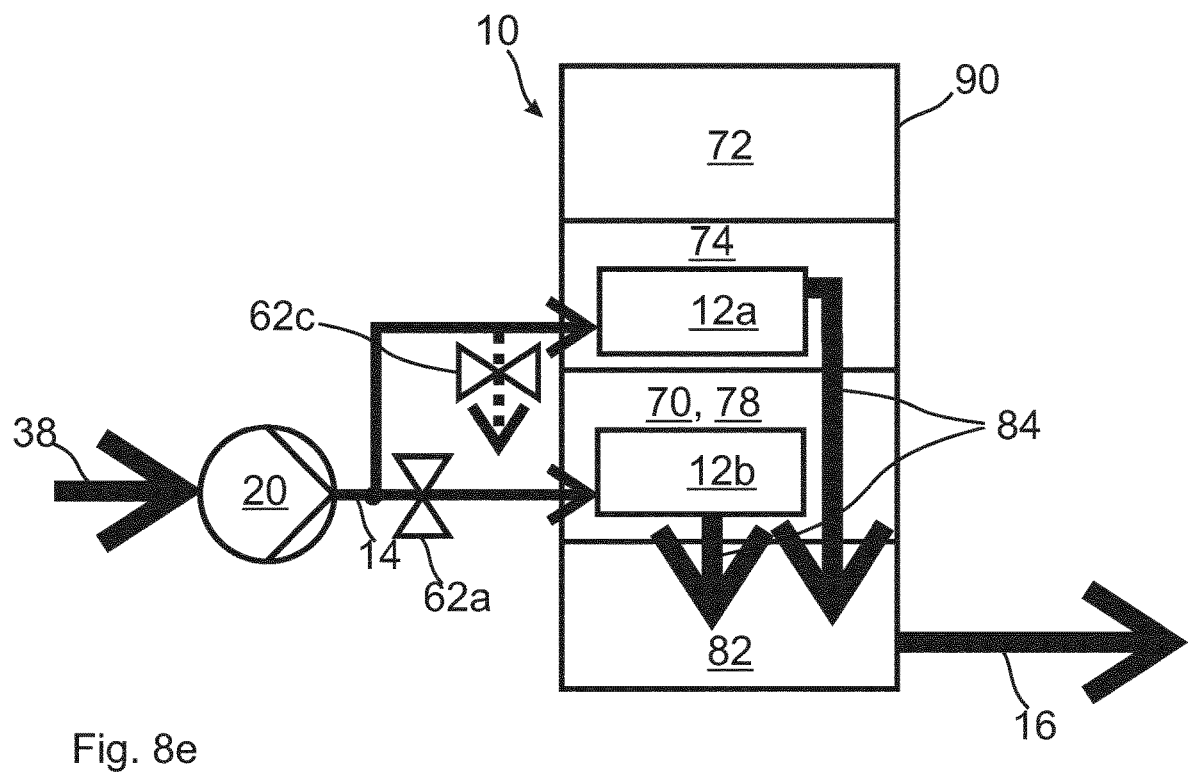

In FIG. 8e, which in turn draws on the structure of FIG. 8d, a bypass line of the supply lines of the upper and lower fluid chambers 12a, 12 is provided with another third inlet line valve 62c, in which coolant fluid can directly be transferred from the cylinder head 74 into the cylinder bore fluid chamber of the cylinder 70. Preferably, the third inlet line valve 62c and the first inlet line valve 62a are configured as 3/2-way valve.

Coolant supply: FIG. 8a shows a normal coolant supply particularly for a fan-cooled internal combustion engine 10. The cool air conveyed by the fan 20 via a coolant supply 38 is passed through a fluid chamber-inlet duct 14 simultaneously around a cylinder head 74 and a cylinder 70 for cooling these. In certain operating conditions, such as during warm-up or at low engine loads, this coolant supply results in temperatures lower than required for optimal operation, particularly for the cylinder 70, whereby higher piston friction and higher wall heat loss result.

FIG. 8b shows how this can be improved e.g. with two simple butterfly valves in the fluid chamber-inlet lines 14, a second inlet line valve 62b to control the coolant flow rate through the cylinder head 74 and another inlet line valve 62a to control the coolant flow rate through the cylinder 70. During a cold start, both valves are closed. The opening can be controlled e.g. by a connection with the throttle cable. When a certain accelerator pedal position is exceeded, the coolant flow around the cylinder head 74 is released by opening the second inlet line valve 62b. When the accelerator pedal or throttle grip is further opened, the coolant flow around the cylinder 70 is released by opening the inlet line valve 62a. During cold temperatures, both valves 62 can also additionally be kept closed by a thermostat. This can be e.g. a wax thermostat, which is connected to the cylinder. The best opening strategy for valves 62 may be determined by measuring the engine characteristic graphs, in which the valves are manually operated.

Advantages are:

Reduced wall heat losses in cylinder and cylinder head

Reduced piston friction in the cylinder

Reduced pumping losses of the fan 20

Gearbox: During a standard exhaust gas test, the gearbox temperature of a manual gearbox increases only by approx. 10° C. By heating oil up to 90° C. the consumption can be reduced by up to 2%. In FIG. 8*c* is shown, how the cooling air heated by the engine is conducted via the fluid chamber-outlet line 16 by a transmission cover 86 above a transmission 80.

A simpler embodiment is shown in FIG. 8*d*. Here, only the inlet line valve 62*a* is used for controlling the coolant flow rate through the cylinder, the coolant is permanently flown around the cylinder head and e.g. returned by a coolant return line through the cylinder.

Piston Nozzle Cooling: Normally, the piston nozzles are mostly open, wherein the piston is mostly over-cooled. FIG. 8*d* also shows an embodiment for lubricating oil cooling. Thereby, the lubricating oil is pumped by an oil pump 20 into a cooling spray nozzle 62, from where it returns into the engine. FIG. 8*e* shows an embodiment, in which, with cold piston, the oil is first heated above the cylinder head and then passed through a third inlet line valve 62*c* into the cylinder and from there via the cooling spray nozzle, it is sprayed on the piston. Once the piston is hot enough or needs to be further cooled, the first inlet line valve 62*a* is opened and the third inlet line valve 62*c* is closed. Thereby, the inlet line valves 62*a* and 62*c* can also be configured as 3/2 directional control valve. As in FIG. 8*e*, the version with only one inlet line valve 62*a* is also conceivable.

Fuel cut-off: FIG. 9 shows a simple solution for fuel cut-off in a carburettor. Thereby, a fuel flow 150 is mixed with an air flow 152 by an idling nozzle 154 at idle operation. Thereby, the fuel supply is interrupted by the idle valve by means of a vacuum valve 148, once the negative pressure in the air intake pipe 144 falls below a limit which is significantly lower than the intake manifold pressure at idle operation. Thus, a fuel carburettor 140 is used, which is suitable for an embodiment of the thermal management system 100, 102, 104. The carburettor 140 includes an air intake manifold 144 and a throttle device 28 through which fuel-air mixture 152 can be sucked in. A fuel flow 150 is supplied via an idling nozzle 154 which protrudes from a float chamber 146, wherein a vacuum valve 148 is provided. A large part of an exhaust gas test for cars or two-wheelers consists of braking processes. For example, over 30% of the total cycle time of an IDC drive cycle are deceleration movements. During deceleration, a complete shutdown of the fuel supply saves large amount of fuel. During deceleration, the intake pressure is much lower than even during idling, since the engine speed is higher during coasting than when idling. The fuel supply during deceleration is controlled by an idling nozzle 154. By a simple vacuum valve 148, the idling nozzle 154 can be closed, when the inlet pressure falls below a certain limit. This could be approx. 300 mbar.

EGR control by throttle slide valve: FIG. 10 shows a carburettor e.g. of a scooter, thereby an exhaust gas stream 162 flows via an exhaust gas recirculation line 168 into an exhaust gas recirculation carburettor 160, wherein the exhaust gas recirculation flow is controlled by the upper edge of the throttle slide valve 164, wherein the opening of the exhaust gas recirculation line at low loads can be greatest and thereby the exhaust gas flow rate and the exhaust gas recirculation rate can be very large and with the opening of the throttle slide valve, the exhaust gas recirculation rate is reduced. Thereby, the exhaust gas recirculation rate (EGR rate) can be adjusted as a function of the throttle slide valve position by the size, height and shape of the opening window which is released by the throttle slide valve. As a result, the throttle slide valve not only controls the engine load but simultaneously also controls EGR rate.

In carburettor 140, as shown in FIG. 10, fuel can be further saved by reducing throttle losses through modification of the exhaust gas recirculation carburettor 160. The exhaust gas recirculation carburettor 160 includes an air chamber 166, from which air flow 152 can be supplied controlled via an exhaust gas valve 164. Fuel 150 is introduced from float chamber 146 and vacuum valve 148 through an idling nozzle 154. By recycling the exhaust gas stream 162 in an exhaust gas recirculation line 168, the exhaust gas stream can be mixed in the exhaust gas-gas mixing chamber 170, wherein by adjusting the exhaust gas valve 164 which simultaneously functions as a throttle device 28, the amount of exhaust gas and amount of air or fuel can be changed proportionally. The exhaust gas valve 164/throttle valve 28 is configured as slide valve. The exhaust gas is conducted through the sliding channel, wherein this is completely open when throttle slide valve is closed. The size of the exhaust gas passage window through the exhaust gas valve 164 determines the effectiveness of the exhaust gas recirculation carburettor 160. When the slide valve 164 is in the lower position, the engine is idling, and when the slide valve is in the upper position, it is in full load.

In FIG. 11 is shown another embodiment 104 of the thermal management system 104. In principle, the thermal management system of FIG. 11 corresponds to that of FIG. 3, additionally an oil heat exchanger 180 is disposed on the surge tank 46 via an oil heat exchanger-outflow line 222. The oil heat exchanger 180 has an oil inlet 192 and an oil drain 194, by which heat can be exchanged between the lubricating oil circuit and the coolant fluid circuit. In the fluid chamber-inlet line 14, an oil heat exchanger-supply line 220 branches off, which leads to the oil heat exchanger 180. The fluid flow can be regulated via an oil heat exchanger valve 224. The branched coolant fluid then ends in the surge tank 46. The surge tank 46 is configured highly insulated and has a thermal insulation 184. Thereby, a labyrinthine fluid channel 186 can be provided in the liquid side 48 of the surge tank 46 to ensure a long flow time of the first coolant fluid. The labyrinthine fluid channel 186 in the liquid side 48 of the surge tank 46 is realized by partition walls 196, so that the longest possible channel is formed within the surge tank to enable a better control of the temperature distribution in the surge tank 46. Thus, it is possible with the first fluid present in the surge tank to heat or cool the oil heat exchanger, so that another variability of the heat manipulation remains. Here, a warm up process is shown, wherein the valves 18 and 52 are closed and the valve 224 is open. Thereby, first coolant stored in the surge tank 46 flows via a surge tank-fluid delivery device-exhaust gas line 66 into the coolant delivery device 20 and via the fluid chamber-inlet line 14 into the oil heat exchanger supply line 220 and into the oil heat exchanger 180 and from there again via the oil heat exchanger-discharge line into the surge tank 46, whereby the circuit is closed.

In FIGS. 12*a*, 12*b* is shown a cross-section through a cylinder 70 having a selective heat insulating layer 94 between cylinder block 90 and cylinder liner 88. The cylinder 70 is configured multi-walled and has an outer cylinder wall 92 which delimits the cylinder relative to the cylinder block 90. Inside, a cylinder liner 88 is disposed, wherein a fluid chamber 12 is at least partially disposed between cylinder liner 88 and cylinder wall 92, through which a coolant flow 98 can pass to cool the cylinder liner 88. The combustion chamber 76 is disposed within the cylinder liner 88. On the outer wall 92 of cylinder 70, insulating layers 94 are disposed on bimetallic supports 96, according to the temperature, which bring the insulating layers closer to cylinder outer wall 92 or guide towards cylinder liner 88, so that the coolant flow 98 is either shielded from the outer wall 92 as in FIG. 12*a* during a cold start and a quicker heating occurs or flows directly past this, aimed at better cooling as shown in FIG. 12*b* for high temperatures. As a result, a temperature-guided selective temperature control can be achieved in the cylinder liner 88. Thus, depending on the temperature ratio due to different curvature of the bimetal supports 96, the insulating layer 94 can be disposed positionally variable in the fluid chamber 12, and thus causes an automatic control of the coolant flow 98.

FIGS. 13*a*, 13*b* show a multi-part fluid chamber 12 disposed in a cylinder 70 of an internal combustion engine 10. The cylinder 70 comprises a cylinder head 74 and a cylinder block 90 enclosing the combustion chamber 76, wherein a fluid chamber 12 consists of sub-chambers 12*a* and 12*b*. The fluid chamber 12*a* is housed in the cylinder head 74 and the fluid chamber region 12*b* in the cylinder block 90. The upper cylinder chamber 12*a* is also referred to as cylinder head-fluid chamber 200 and the lower fluid chamber regions 12*b* as the cylinder block fluid chamber 202. The fluid chamber 12*b* is referred to as a cylinder block-fluid chamber 202 and is in turn divided into an upper cylinder block fluid chamber region 204 and a lower cylinder block-fluid chamber region 206. In FIG. 13*a*, the upper fluid chamber 204 of cylinder 70 is in fluid exchangeable contact with the upper fluid chamber 200, in FIG. 13*b* also, both these fluid chamber regions are separated to enable further variability and to enable the adjustment in temperatures of the fluid chambers 200 and 204 independent of each other. Thus, the cooling capacity can be effective in the cylinder head 74 in the upper region of cylinder 70, wherein other lower cylinder regions of the cylinder block 90, particularly along the piston bore through the fluid chamber 206 can be temperature-controlled independently. As a result, different temperature ratios and cooling fluid flows can be adjusted in the critical region of the cylinder head and cylinder block, so that selective cooling capacities can be introduced, particularly as a function of the crankshaft angle. Thus, for example, it is conceivable that the cylinder head-fluid chamber 200 has a separate inlet and outlet and the cylinder block-fluid chamber 202 can be temporarily filled with gas. Different coolant fluids cna be employed in the different fluid chambers 12*a*, 12*b*, 200, 202, 204, 206, and the temperature levels of the individual coolant fluids in the fluid chambers can be configured different. In particular, both separate fluid chamber regions 204 and 206 of the cylinder block can be divided such that the lower fluid chamber regions 206 are guided along the cylinder stroke to enable selectively cooling this, and the upper region 204 of the fluid chamber 202 is connected to the cylinder head-fluid chamber 200. The lower cylinder block fluid chamber regions 206 can be disposed radially around the upper cylinder block fluid chamber regions 204 as shown in the upper region. However, it is also conceivable that these are disposed only below the upper cylinder block fluid chamber regions 204 and are not disposed radially around the upper cylinder block fluid chamber regions 204.

In FIGS. 14*a* and 14*b* is illustrated an embodiment of the piston 110 which can be advantageously used in an embodiment of the thermal management system 100. The piston 110 comprises a piston crown with a connecting rod axis 116 and an insulating layer 114. Disposed above the insulating layer is an expansion chamber 134 which is connected to the surface of the piston 110 by a mass inertia expansion chamber valve 136 and a pressure compensating valve 138. By supplying heat, a thermal load 118 is generated on the surface of the piston 110. By increasing the combustion chamber pressure, gas can escape from the combustion chamber into the expansion chamber 134 through the pressure compensating valve 138, which is enclosed while reducing the combustion chamber pressure after the pressure compensating valve 138 has closed again, wherein the expansion chamber valve 138 can be opened and closed by inertia, particularly can be opened after up to 90° crank angle after the top dead centre, so that hot gas can again return from the expansion chamber 134 into the combustion chamber. The expansion chamber 134 is insulated by the thermal insulation 114 on the underside of the piston by underlying regions of the piston and the connecting rod to minimize the wall heat loss.

In the diagram 14*b* is shown the opening and closing of the inertia expansion chamber valve 136 (IV) and the pressure compensating valve 138 (PRV) as a function of the crankshaft angle CRA (Crankshaft Rotation Angle). First, the pressure compensating valve 138 opens after the top dead centre, and about 90° later, the inertia expansion chamber valve 136 opens to dynamically cool the combustion chamber such that elevated temperatures are avoided, and NOx formation is reduced.

In FIGS. 15*a* and 15*b* are schematically shown other options for controlling the temperature of piston 110 for use in an exemplary embodiment of the thermal management system. The piston 110 shown in FIG. 15 comprises a piston crown with a connecting rod axis 116. An expansion chamber 134 is disposed in the upper region of the piston crown. In the expansion chamber 134, a gas insulating layer 210 is provided in a sub-region 134*a* and a cooling medium layer 212 is provided in another sub-region 134*b*.

FIG. 15*a* shows the situation during the expansion after the end of combustion. The thermal load 118 decreases and by the inertia forces acting on the piston, the cooling medium layer 212 is moved downwards at least after 90° crank angle after the top dead centre and is exchanged with the gas insulating layer 210 which is displaced upwards. As a result, the instantaneous wall heat loss is reduced, and the heat absorbed in the cooling medium layer 212 is dissipated to the piston bottom. During the combustion phase, which is shown in FIG. 15*b*, the thermal load 118 is high. By the inertia, the cooling medium layer 212 abuts the piston crown and absorbs heat to reduce the maximum temperature of the piston crown. By the combination of heat conduction, convection and exchange of the cooling medium, an improved heat dissipation result. This likewise results in a thermal insulation and temperature levelling in the power stroke, so that the cylinder bore, and the piston are selectively temperature-controlled to reduce temperature peaks.

In diagram of FIG. 16 is shown a variable adjustment of the coolant flow rate CFR between a lower coolant flow rate CFR and a higher coolant flow rate as a function of the crank angle CRA. According to the diagram, the delivery rate of the coolant delivery device 20 or the first valve 18 or the exchange of first and second coolant fluid can be adjusted. From the top dead centre (shown here at 360° crank angle), a high coolant flow rate is provided for the first 90°, which is reduced in the rest of the curve. Thus, while generating high thermal load, a higher cooling capacity is demanded, which can then be reduced again afterwards. Even here, thermal peaks are better absorbed, wherein a quick response of the heat management system is required.

In particular, a glow plug can be provided in the combustion chamber to increase the combustion chamber temperature after the end of combustion phase. It is quite conceivable, as shown in the diagram of FIG. 17 that the glow plug is switched on as a function of the crankshaft angle CRA, particularly in a range between 360° and 540° or in the working range (switching curve GP) and switched off again in the remaining regions, so that the temperature difference between the glow plug and the combustion chamber $\Delta T_{GB-CC}$ increases during this period and then drops again afterwards. As a result, an optimized combustion can be achieved, and so pollutant emissions, particularly particles, HC and CO, but even NOx is reduced by adjusting the combustion process.

In FIGS. 18a, 18b and 18c are shown the optional arrangements of coolant passageways between adjacent cylinders 70 or through a cylinder head 74.

In FIG. 18a, two cylinders 70 are disposed directly adjacent and show combustion chambers 76. In the cylinder block 90 between both cylinders 70, a first coolant passage opening 270 is provided between webs 274 of adjacent cylinders, through which a coolant flow 98 can pass to enable cooling of the cylinder walls better and to avoid exceeding the maximum allowable material temperature.

In FIG. 18b is shown a cylinder head 74 with two exhaust gas outlet valves 266. Here also, a coolant passage opening 272 can be disposed between both exhaust gas valves 266 of the cylinder head 74 for passing the coolant flow between two valves 266. As a result, the cylinder jacket or the cylinder head 74 in the engine block can be effectively cooled, wherein possible coolant flows are shown in FIG. 8.

FIG. 18c illustrates an overview of coolant flows 98 between two cylinders 70 and through a cylinder head 74, which are shown individually in FIGS. 18a and 18b. The web region 274 is located around the passage opening 270. In the cross-section, the water jacket formed by the fluid chamber 12 around the cylinders 70 is clearly visible. Between the webs 274 of the combustion chambers 76 of adjacent cylinders 70, a plurality of first coolant passage openings 270 are disposed for coolant exchange between the side facing the cylinder block 90 and cylinder head 74 of the respective pressure and counter-pressure sides of the piston 110. In the cylinder head 74 of one, generally all cylinders 70, a second coolant passage opening 272 is disposed in the middle between two adjacent outlet valves 266 in the plane through the centre lines of both exhaust valves 266. The flow velocity in at least one of the coolant passage openings 270, 272 can be increased by reducing at least one of the flow cross-section of the cylinder head fluid chamber 12a or the cylinder block fluid chamber 12b in a direction parallel to the coolant passage opening 270, 272. Thereby, the cross-section of the coolant passage openings 272 is at least 10% of the minimum total cross-section of the cylinder head fluid chamber 12a in the plane through the centre lines of both outlet valves 266.

In FIG. 19 is shown another exemplary embodiment of the heat management system 102, which essentially stems from the thermal management system 102 shown in FIG. 3 in combination with the transmission oil heat exchanger 86 of the transmission 80 shown in FIG. 8c. Starting from the internal combustion engine 10, the fluid chamber outlet line 16 is passed through a transmission 80, wherein the transmission 80 comprises a transmission mechanism 240, a transmission oil sump 242 and a transmission oil heat exchanger 244 and an outer insulation 250. The coolant fluid stream passes through the transmission oil heat exchanger 244 and can be returned via a switchable radiator bypass valve 248 either into the radiator 60 through a radiator return line 252 or directly into the coolant supply 38 of the coolant delivery device 20 through the radiator bypass line 246. Thermal energy can be introduced into or removed from the transmission by the transmission oil heat exchanger 244, and thus a higher temperature variability can be achieved in the thermal management system.

FIGS. 20a to 20c show an exemplary embodiment of the thermal management system 100, 102 or 104 according to the invention, thereby an exhaust gas recirculation cooler 260 is located in the upper region of the cylinder head 74 of the cylinder 70. The exhaust gas recirculation cooler 260 is passed with a coolant fluid through a cooling line 168. Exhaust gas, as shown in FIG. 20a, exits the combustion chamber 76 through an outlet valve 266 and is conducted along an exhaust gas duct 264, wherein a branching of the exhaust gas duct 264 in the direction of the exhaust gas recirculation cooler 260 occurs at an exhaust gas duct removal point 262. The exhaust gas passing through the exhaust gas recirculation cooler 260 can thus be cooled, wherein the flow rate in the exhaust line 168 can be regulated by an exhaust gas recirculation valve 164. By the cooling effect in the exhaust gas recirculation cooler 260, condensate of the exhaust gas is separated, which flows downwards by gravity and is collected above the valve when the outlet valve 266 is closed, see FIG. 20b. When the valve 266 is opened, as shown in FIG. 20c, the exhaust gas condensate flows back into the combustion chamber 76, where it evaporates again and thus cools the combustion chamber and the intake air.

In the FIG. 21 is shown a coolant thermostat switching hysteresis by the coolant temperature $T_{coolant}$ on X-axis and the coolant flow rate $V_{coolant}$ which approximately corresponds to the opening cross-section of the coolant thermostat or of the first valve 18, is shown on Y-axis, wherein the coolant flow is controlled depending on the temperature. Firstly, a conventional hysteresis is represented by a solid line, which controls the coolant flow in a range between 75° C. and 100° C. to a small leakage current between 0 and a maximum coolant flow in a narrow hysteresis window of approx. 3° C. In a first improved embodiment shown in a dashed line (option 1 hysteresis), this hysteresis is significantly increased, so that the hysteresis covers a range between 40° C. and 100° C. of the cooling temperature, in other coolant temperature ranges, the temperature can vary without switching off the coolant flow rate. Alternatively, a second hysteresis characteristic shown in a dash/dot line (option 2 hysteresis) can also be considered by decreasing the flow rate proportional to a decreasing temperature, wherein the thermostat opening stroke is now just proportional to the flow rate flowing through the radiator 60, wherein a proportional effect of the valve 18 or the coolant thermostat is assumed. As a result, an improved coolant capacity control can be achieved.

In FIGS. 22a and 22b is shown the temperature distribution on the cylinder head 74 and cylinder wall of the cylinder 70. FIG. 22a shows the prior art, in which, the cylinder head component peak temperatures up to 700° C. can occur at the outlet valves (close hatching). While the piston is located shortly after about 0° of the crankshaft angle CRA, the combustion chamber temperature itself is highest. When the pistons are at about 90° CRA, the combustion chamber temperatures drop significantly. The temperatures of the cylinder wall can be about 110° C., at part load (wide shading). This results in a temperature gradient which has the value shown in the diagram.

In FIG. 22b is shown that the temperature gradient is significantly flattened by using a proposed exemplary embodiment, so that a lower peak temperature prevails, particularly in the cylinder head and possibly also in the combustion chamber and a higher temperature prevails on the cylinder wall, wherein the total amount of thermal energy is more uniformly distributed and the production of exhaust gases, which depends on the temperature, can thereby be reduced significantly. The temperature gradient in the cylinder is significantly flattened over the power stroke. Such a flatter curve of the temperature distribution in the cylinder head and cylinder wall is achieved by the proposed means of the thermal management system according to the invention.

FIG. 23 shows another exemplary embodiment of an internal combustion engine 10 with a thermal management system 100. The thermal management system 100 comprises a fluid chamber 12, of which only the upper fluid chamber region 12a in the region of the cylinder heads and the lower fluid chamber region 12b in the region of the cylinder walls can be seen. Coolant fluid is pumped through a coolant delivery device 20 into the upper and lower fluid chamber regions 12a and 12b of the engine block and exits into the outlet line 16, where it is returned to the radiator 60. In the outlet line 16, the first valve for load-dependent coolant fluid control is disposed. The pressure compensation line 56 of the gas side of surge tank 46 ends in the region of the outlet line 16. The liquid side of surge tank 46 is conducted to the coolant supply 38 of coolant delivery device 20. A second outlet region 16a returns the coolant fluid via a transmission oil heat exchanger 244, an oil heat exchanger 180, an oil filter and oil cooler 226, and an additional heating core 178 likewise to the fluid delivery device 20, wherein the first valve 18 is provided in this train which can control the coolant flow through the transmission oil heat exchanger 244 and the electric additional heating core 178. At the outlet region 16, another branching occurs, wherein exhaust gas can also return to the fluid delivery device 20 through an exhaust gas recirculation cooler 260 and a heat exchanger 176. Thus, there are three independent return flows, wherein a cooling or Heating device is provided in each return flow to additionally heat or cool the coolant fluid. By suitable switching means (not all shown) such as a first valve 18 and an inlet line valve 62, the individual return lines can be opened or closed, so that the coolant fluid can be maintained at a predeterminable temperature.

Finally, FIG. 24 shows another exemplary embodiment of the heat management system 100 for an internal combustion engine 10. The internal combustion engine 10 comprises a cylinder block 90 with four cylinders 70, in which pistons 110 of the internal combustion engine 10 move. Combustion air is introduced into the cylinders 70 via an air intake pipe 144. Lower fluid chamber regions 12b are disposed around the cylinders 70 and upper fluid chamber regions 12a are disposed in the cylinder head 74, not shown. The fluid chambers 12a and 12b are supplied with coolant via fluid chamber inlet line 14 through a coolant delivery device 20. The coolant is supplied from a radiator 60 via a coolant supply 38 of the fluid delivery device 20. The coolant contained in the fluid chamber 12 in the engine block exits the cylinder block 90 from a fluid chamber outlet line 16. The outlet line 16 splits, wherein a first valve 18 controls the coolant recirculation via a radiator 60 and an oil heat exchanger thermostat 254 enables a coolant recirculation via an oil heat exchanger 180 and a transmission oil heat exchanger 244 connected to a heating core 176. A radiator bypass valve 248 enables a coolant recirculation while bypassing the radiator 60. The various heat exchangers can ensure selective coolant heating or cooling.

A surge tank 46 with a gas side 50 and a liquid side 48 can store and release coolant, which can be removed or recycled from the coolant circuit via a second fluid delivery device 44. The surge tank 46 is connected by its gas side through an outlet side equalization line 56 to the coolant outlet line 16. A third valve 52 is disposed in the connecting line 56 between the gas side 50 and the outlet 16 of the fluid chamber 12. The third valve 52 can control the flow of coolant fluid stored in the surge tank 50 during pumping or delivery. Thus, the third valve 52 can be closed after filling the fluid chamber 12 with gas, for example, after a time delay, to store gas in the fluid chamber 12 and to store coolant in the surge tank 50. A surge tank fluid delivery device discharge line 66 connects the liquid side 48 via the second fluid delivery device 44 to the fluid delivery device 20 for recovery of coolant fluid.

Furthermore, a low-temperature cooling circuit of an intercooler 312 and a turbocharger 300 is connected to the surge tank 46 via the fluid delivery device discharge line 66. This low temperature cooling circuit includes a low temperature coolant pump 304 and an intercooler 312 for cooling the air compressed by the turbocharger 300. A cooler 302 serves to cool the coolant fluid in the low-temperature cooling circuit, wherein a throttle element 308 and a check valve 306 are provided in the low-temperature coolant circuit of the intercooler 312 and the turbocharger 300 for venting by returning the coolant into the surge tank 46. Thus, coolant fluid can be exchanged between the cylinder block cooling and the intercooling and can be used by the thermal management system according to the invention for temperature control. As a result, a common surge tank for both cooling circuits can be used, whereby components and space requirements can be reduced.

The illustrated thermal management system enables dynamic and ultra-quick adjustment of cooling and heating of various engine regions for reducing harmful emissions as well as fuel consumption and for reducing thermal loads.

LIST OF REFERENCE NUMBERS

10 Internal combustion engine
12 Fluid chamber
12a Upper fluid chamber region
12b Lower fluid chamber region
14 Fluid chamber inlet line
16 Fluid chamber outlet line
18 First valve
20 Coolant delivery device
22 Intake duct
24 Exhaust gas duct
26 Engine load setting unit
28 Throttle device
30 Engine load valve control line
32 Engine load control line
34 Power stroke detection device
36 Power stroke valve control line
38 Coolant supply
40 Power stroke sensor
42 Second valve
44 Second fluid delivery device
46 Surge tank
48 Liquid side of surge tank
50 Gas side of surge tank 52 Third valve
54 Coolant return valve
56 Outlet side compensation line
58 Fluid chamber temperature sensor
60 Radiator
62 Inlet line valve
62a First inlet line valve
62b Second inlet line valve
62c Third inlet line valve
64 Ventilation line to the radiator
66 Surge tank fluid delivery device exhaust gas line
70 Cylinder
72 Valve cover
74 Cylinder head
76 Combustion chamber
78 Piston region
80 Transmission
82 Crankshaft region
84 Coolant return
86 Transmission cover
88 Cylinder liner
90 Cylinder block
92 Cylinder wall
94 Insulating layer
96 Bimetal support
98 Coolant flow
100 Thermal management system
102 Thermal management system
104 Thermal management system
110 Piston
112 Phase change material layer
114 Insulation layer
116 Connecting rod axis
118 Thermal load
120 Coolant line
122 Gasket
124 Gas chamber/air insulation
126 Structural environment—oil gallery wall
128 Coolant flow direction/oil flow direction
130 Inner insulation insert
132 Crank bearing oil outlet
134 Expansion chamber
136 Inertia expansion chamber valve
138 Pressure compensating valve
140 Carburettor
142 Inner pipe
144 Air intake pipe
146 Float chamber
148 Vacuum valve
150 Fuel flow
152 Fuel-air flow
154 Idling nozzle
160 Exhaust gas recirculation carburettor
162 Exhaust gas flow
164 Exhaust gas valve
166 Air chamber
168 Exhaust gas recirculation line
170 Exhaust gas mixing chamber
176 Heating core
178 Electric additional heater
180 Oil heat exchanger
184 Highly insulating thermal insulation of the expansion vessel
186 Labyrinthine fluid channel
188 Inlet of the surge tank
190 Outlet of the surge tank
192 Oil supply
194 Oil drain
196 Partition walls
200 Cylinder head fluid chamber
202 Cylinder block fluid chamber
204 Upper cylinder block fluid chamber regions
206 Lower cylinder block fluid chamber regions
208 Cylinder head gasket
210 Gas insulation layer
212 Cooling medium layer
220 Oil heat exchanger supply line
222 Oil heat exchanger discharge line
224 Oil heat exchanger valve
226 Oil filter & oil cooler
230 Thermal management system
240 Transmission mechanism
242 Transmission oil sump
244 Transmission oil heat exchanger
246 Radiator bypass line
248 Radiator bypass valve
250 Outer insulation
252 Transmission heat exchanger cooler return line
254 Transmission heat exchanger thermostat
260 Exhaust gas recirculation cooler
262 Exhaust gas duct removal point
264 Exhaust gas duct
266 Exhaust gas outlet valve of the cylinder
268 Exhaust gas recirculation cooler coolant line
270 First coolant passage opening
272 Second coolant passage opening
274 Web
280 Coolant condensate
300 Turbocharger
302 Cooler for turbocharger
304 Low-temperature coolant pump
306 Check valve for low-temperature cooling circuit
308 Throttling element for low-temperature cooling circuit
312 Intercooler

The invention claimed is:

1. Thermal management system of an internal combustion engine that comprises at least one fluid chamber disposed at least partially around the cylinder of the internal combustion engine, having at least one inlet line and at least one outlet line, wherein the fluid chamber is connected to at least one coolant delivery device for supplying a coolant and connected to at least one heat sink, wherein the heat sink is an air-cooled radiator, and that the coolant flow rate supplied by the coolant delivery device can be varied by a throttle device independent of the engine speed; wherein the throttle device consists of at least one first valve, wherein the first valve is coupled with a load-setting unit for adjusting the engine load, wherein the first valve can be controlled by the load-setting unit such that the fluid flow rate through the fluid chamber is increased, when the engine load is increased, and is reduced when the engine load is reduced; wherein a cylinder head temperature sensor or a fluid chamber temperature sensor is included; wherein the flow rate of the coolant delivery device can be controlled depending on the engine speed, or the fluid chamber temperature and the engine load, by operating at least the first valve for controlling the coolant flow rate through at least one of the fluid chambers.

2. A thermal management method for operating a thermal management system of an internal combustion engine, comprising:

a fluid chamber and disposed at least partially within or around a cylinder head of the internal combustion engine, the fluid chamber comprising an inlet line and an outlet line, the fluid chamber being connected to at least one coolant delivery device for supplying a coolant and is connected to at least one heat sink, and an upper fluid chamber region formed as a cylinder head fluid chamber, a lower fluid chamber region formed as a cylinder block fluid chamber, a cylinder head gasket seperating the upper fluid chamber region and the lower fluid chamber region and configured so that the volume flow of the coolant through the lower fluid chamber region can be adjusted independently of the volume flow of the upper fluid chamber region, wherein with an increasing temperature of the fluid chamber, after a warm-up phase at a constant or decreasing engine speed, the coolant flow rate through the heat sink is at least temporarily increased; and at constant engine speed or at engine speed increasing at a maximum 100 revolutions per minute and with a load change reducing an engine load, the coolant flow rate through the heat sink stays constant or is increased, and after at least one minute after the load change, the coolant flow rate through the heat sink stays constant or is increased within a temperature range of 60° C. to 100° C. of the fluid chamber.

3. Thermal management method of claim 2, wherein the lower fluid chamber region comprises a first cylinder block fluid chamber region and a second cylinder block fluid chamber region, and wherein with increasing engine load, the coolant flow rate through the second cylinder block fluid chamber region that is at least partially disposed within or around at least one cylinder is increased;

and with decreasing engine load, the coolant flow rate through the lower fluid chamber region is reduced.

4. The thermal management method of claim 3, wherein, for during the warm-up phase warming up, a first valve for controlling the coolant flow rate through at least one of the fluid chambers by at least partial opening, the coolant is introduced into at least one of the fluid chambers, as soon as the engine load decreases, and falls below an operating point-dependent engine load and the inflowing a coolant temperature is higher than one of the fluid chamber temperatures, and that the first valve is at least partially closed as soon as the inflowing coolant temperature is lower than one of the fluid chamber temperatures, and that for cooling, the first valve is at least partially opened as soon as the engine load increases above an operating point-dependent engine load, and the inflowing coolant temperature is lower than one of the fluid chamber temperatures, and that the first valve is at least partially closed as soon as the inflowing coolant temperature is higher than the fluid chamber temperature.

5. The thermal management method of claim 2, wherein the coolant flow rate through the fluid chamber is increased and reduced during a working cycle.

6. The thermal management method of claim 2, wherein at least one exhaust gas valve is opened or closed for recirculating exhaust gas into the combustion chamber on the increasing or decreasing of the engine load by a predetermined difference more than a stationary operating point, at which the engine load corresponds to a respective instantaneous engine load during the engine load change.

7. The thermal management method of claim 2, wherein a dissipation constant for the coolant is diagnosed for a measured coolant characteristic, and an engine diagnosis indicator is activated as soon as the measured coolant characteristic deviates by a minimum amount from a predetermined threshold value, wherein the threshold value varies depending on the coolant temperature.

8. Thermal management method according to claim 2, wherein with a positive change in the engine load, the electric load of the alternator is reduced at least for a limited time and is switched off.

9. A thermal management system of an internal combustion engine, comprising:

a fluid chamber and disposed at least partially within or around a cylinder head of the internal combustion engine, the fluid chamber comprising an inlet line and an outlet line, the fluid chamber being connected to at least one coolant delivery device for supplying a coolant and being connected to at least one heat sink a plurality of fluid chamber regions including:

an upper fluid chamber region formed as a cylinder head fluid chamber, and a lower fluid chamber region formed as a cylinder block fluid chamber, and a cylinder head gasket separating the upper fluid chamber region and the lower fluid chamber region and configured so that the volume flow of the coolant through the lower fluid chamber region can be adjusted independently of the volume flow of the upper fluid chamber region;

the thermal management being configured to after a warm-up phase at a constant or decreasing engine speed, temporarily increase the coolant flow rate through the heat sink with an increasing temperature of the fluid chamber, and at constant engine speed or at engine speed increasing at a maximum 100 revolutions per minute and with a load change reducing an engine load, keep constant or increase the coolant flow rate through the heat sink, and after at least one minute after the load change, keep constant or increase the coolant flow rate through the heat sink within a temperature range of 60° C. to 100° C. of the fluid chamber, wherein the fluid chamber is divided into an upper fluid chamber region and a lower fluid chamber region, the upper fluid chamber region being formed as a cylinder head fluid chamber, and the lower fluid chamber region being formed as a cylinder block fluid chamber, is separated by a cylinder head gasket so that the volume flow of the coolant through one of the two fluid chambers, the cylinder block fluid chamber, can be adjusted independently of the volume flow of the other fluid chamber, the cylinder head fluid chamber.

10. The thermal management system of claim 9, wherein the cylinder block fluid chamber of the lower fluid chamber region comprises at least one separate inlet or outlet, wherein the cylinder block fluid chamber is configured to be temporarily filled with gas by pumping out a coolant.

11. The thermal management system of claim 9, wherein the system is configured so that at an ambient pressure of one bar, the coolant in the fluid chamber has a boiling temperature of above 130° C. and a freezing temperature of—30° C. or lower, and has a specific heat capacity of greater than 2.4 kJ/(kg K);

wherein the coolant includes at least less than 30% water and comprises:
   94% propylene glycol, or
   up to at least 80% ethylene glycol, propylene glycol, glycerine or any mixture of these substances; and
wherein the system comprises at least one fluid chamber temperature sensor for detecting the coolant temperature in the fluid chamber and the first valve is disposed to reduce the coolant flow rate through at least one of the fluid chambers when, after exceeding a temperature limit ≥120° Celcius, the fluid chamber temperature again falls below this temperature limit.

12. The thermal management system of claim 9, wherein the lower fluid chamber region is connected to a surge tank having a liquid side which is at least partially filled with a first liquid and a gas side which is filled with a second gaseous fluid, wherein the gas side of the surge tank and the liquid side of the surge tank are respectively connected to the fluid chamber via a connecting line, wherein the system is configured so that with at least one of a decreasing engine load, on falling below a predetermined engine load, an operating point—dependent engine load, or on falling below the engine temperature, the first fluid is at least partially displaced from the fluid chamber into the surge tank, so that the second fluid from tank is at least partially displaced into the fluid chamber.

13. The thermal management system according to claim 12, further comprising:
   the liquid side of the surge tank 46 being connected, via a second valve and a second fluid delivery device, to an inlet line valve and to the inlet line of the fluid chamber,
   at least the coolant delivery device and the second fluid delivery device being a bidirectional pump, and the system is configured to:
      with a decreasing engine load, on falling below a predetermined operating point-dependent engine load or on falling below an engine temperature, the second valve is at least partially opened, and the inlet line valve is at least partially closed for controlling the coolant flow rate through the fluid chamber, and the first fluid is pumped from the fluid chamber into the surge tank until the fluid chamber is at least partially filled with the second fluid, and
      with an increasing engine load, on exceeding a predetermined operating point-dependent engine load, the second valve is at least partially closed and the inlet line valve is at least partially opened.

14. The thermal management system of claim 12, further comprising:
   a third valve disposed in the connecting line between the gas side and the outlet line of the fluid chamber through, the third valve being configured to:
   open on pumping the first fluid from the fluid chamber into the surge tank so that the fluid flow of the second fluid or on filling the fluid chamber with the first fluid; and
   after filling the fluid chamber with the first fluid, the third valve is configured to be at least partially closed.

15. The thermal management system of claim 9, wherein at least partial regions of the surface of the fluid chamber are delimited and outwardly directed by the coolant from a cylinder wall of the cylinder, and the at least partial regions of the surface of the fluid chamber are provided with an inner insulating layer, wherein the insulating layer:
   at least partially abuts an outwardly directed surface of the fluid chamber, or
   is spaced inwardly with respect to the cylinder wall by dotted spacers.

16. The thermal management system of claim 9, further comprising a coolant heat accumulator connected to the fluid chamber and connected to an oil heat exchanger, and configured to, on a cold start, supply hot coolant from the coolant heat accumulator via the oil heat exchanger, and in a warm operating state, supply hot coolant from the fluid chamber into the coolant heat accumulator.

17. The thermal management system of claim 9, wherein, in a web between combustion chambers of adjacent cylinders,
   at least one first coolant passage opening is disposed for coolant exchange between each of the pressure side and counter-pressure side of the piston facing side in the cylinder block or cylinder head, or
   a second coolant passage opening is disposed in the middle between two adjacent outlet valves of the cylinder in the plane through the centerlines of both outlet valves,
   wherein the system is configured so that a flow velocity in at least one of the first coolant passage opening or the second cooling passage opening is increased in the direction parallel to the coolant through-opening by reducing at least one flow cross-section of the cylinder head fluid chamber or the cylinder block fluid chamber.

18. The thermal management system of claim 9, further comprising:
   a surge tank of the cooling system configured as a highly insulated heat accumulator and filled with coolant and gas; and
   an outlet of the surge tank disposed at the bottom and horizontally arranged partition walls are disposed, which alternatively opens a flow opening on one side, from the bottom to the top, so that a labyrinthine coolant fluid channel is defined from the surface downwards.

19. A thermal management method for operating a thermal management system of an internal combustion engine, comprising:
   at least one fluid chamber with at least one inlet line and at least one outlet line, disposed at least partially within or around a cylinder head of an internal combustion engine; wherein the fluid chamber is connected to at least one coolant delivery device for supplying a coolant and is connected to at least one heat sink, wherein with increasing temperature of the fluid chamber the coolant flow rate through the heat sink is at least temporarily increased;
   at constant engine speed or at engine speed increasing at maximum 100 revolutions per minute and with reducing engine load, the coolant flow rate through the heat sink is not reduced; and
   with the exhaust gas flow through at least one controllable exhaust gas valve of the internal combustion engine in the direction of the combustion chamber of the cylinder at constant position of the load-setting unit,
      at a speed of 50% of the rated speed, the maximum opening cross-section of the exhaust gas valve is within a maximum tolerance of maximum 20% of the maximum opening cross-section during a respective working cycle;
      at increased speed, is maintained above the engine speed of at least 0.5 times the rated speed; or
      at constant speed and increased engine load, is maintained within a load range of between 50% to 75% of the maximum engine load of the respective speed within a tolerance of maximum 20% of the maximum opening cross-section of the exhaust gas valve.

* * * * *